(12) United States Patent
Ohkawa et al.

(10) Patent No.: US 11,003,212 B2
(45) Date of Patent: May 11, 2021

(54) IMAGE DISPLAY DEVICE, DISPLAY DEVICE, AND ADJUSTMENT METHOD FOR DISPLAY DEVICE

(71) Applicant: SONY CORPORATION, Tokyo (JP)

(72) Inventors: Shingo Ohkawa, Kanagawa (JP); Katsuyuki Akutsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 309 days.

(21) Appl. No.: 16/316,765

(22) PCT Filed: May 17, 2017

(86) PCT No.: PCT/JP2017/018489
§ 371 (c)(1),
(2) Date: Jan. 10, 2019

(87) PCT Pub. No.: WO2018/016163
PCT Pub. Date: Jan. 25, 2018

(65) Prior Publication Data
US 2019/0155337 A1 May 23, 2019

(30) Foreign Application Priority Data
Jul. 20, 2016 (JP) .............................. JP2016-142352

(51) Int. Cl.
G06F 1/16 (2006.01)
G02B 5/32 (2006.01)
(Continued)

(52) U.S. Cl.
CPC ............. *G06F 1/1637* (2013.01); *G02B 5/32* (2013.01); *G02B 6/005* (2013.01); *G02B 6/0026* (2013.01);
(Continued)

(58) Field of Classification Search
USPC ......................................................... 359/19
See application file for complete search history.

(56) References Cited

U.S. PATENT DOCUMENTS

2012/0069448 A1 3/2012 Sugihara et al.
2012/0242561 A1 9/2012 Sugihara
2015/0277126 A1 10/2015 Hirano et al.

FOREIGN PATENT DOCUMENTS

JP 2001-004956 1/2001
JP 2002-162598 6/2002
(Continued)

OTHER PUBLICATIONS

International Search Report prepared by the Japan Patent Office dated Jul. 19, 2017, for International Application No. PCT/JP2017/018489.

Primary Examiner — Collin X Beatty
Assistant Examiner — Grant A Gagnon
(74) Attorney, Agent, or Firm — Sheridan Ross P.C.

(57) ABSTRACT

A display device includes: a frame to be mounted on a head of an observer; and an image display device attached to the frame. The image display device includes: an image forming device; a light guide plate; a support substrate; a first deflection unit; a second deflection unit; and an optical member attached to the support substrate, in which light from the image forming device is deflected at the first deflection unit, propagated inside the light guide plate by total reflection, deflected at the second deflection unit, and incident on the optical member, and the optical member emits the incident light toward a pupil of an observer. The display device further includes a movement device that moves the support substrate with respect to the light guide plate in order to change a relative positional relation between the second deflection unit and the optical member.

19 Claims, 29 Drawing Sheets

(51) Int. Cl.
*F21V 8/00* (2006.01)
*H04N 5/64* (2006.01)
*G02B 27/02* (2006.01)
*G02B 27/01* (2006.01)

(52) U.S. Cl.
CPC ............ G02B 27/02 (2013.01); G06F 1/163 (2013.01); H04N 5/64 (2013.01); *G02B 27/0149* (2013.01); *G02B 2027/0159* (2013.01); *G02B 2027/0161* (2013.01)

(56) References Cited

FOREIGN PATENT DOCUMENTS

| | | |
|---|---|---|
| JP | 2012-042654 | 3/2012 |
| JP | 2012-063627 | 3/2012 |
| JP | 2012-203113 | 10/2012 |
| JP | 2015-184560 | 10/2015 |

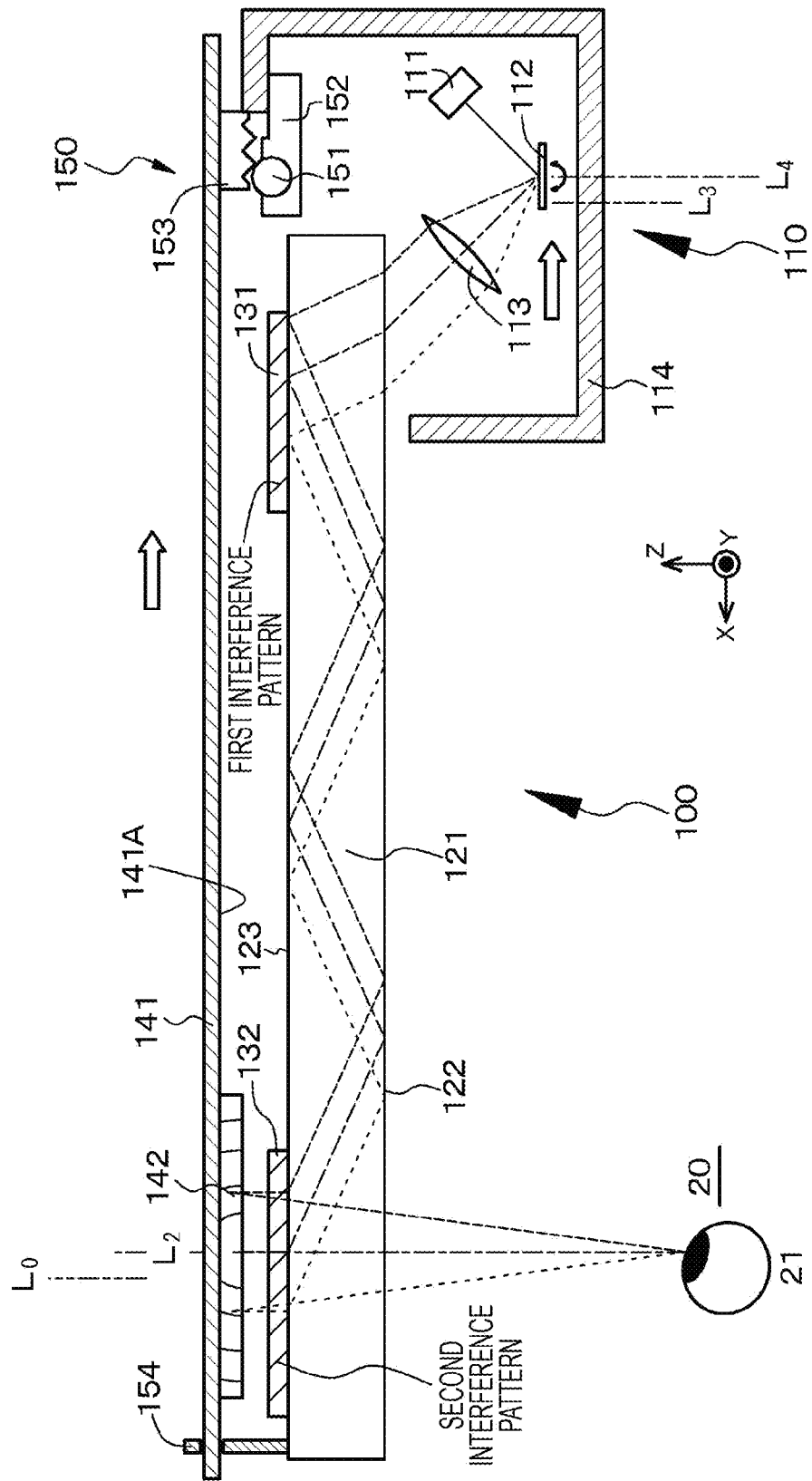

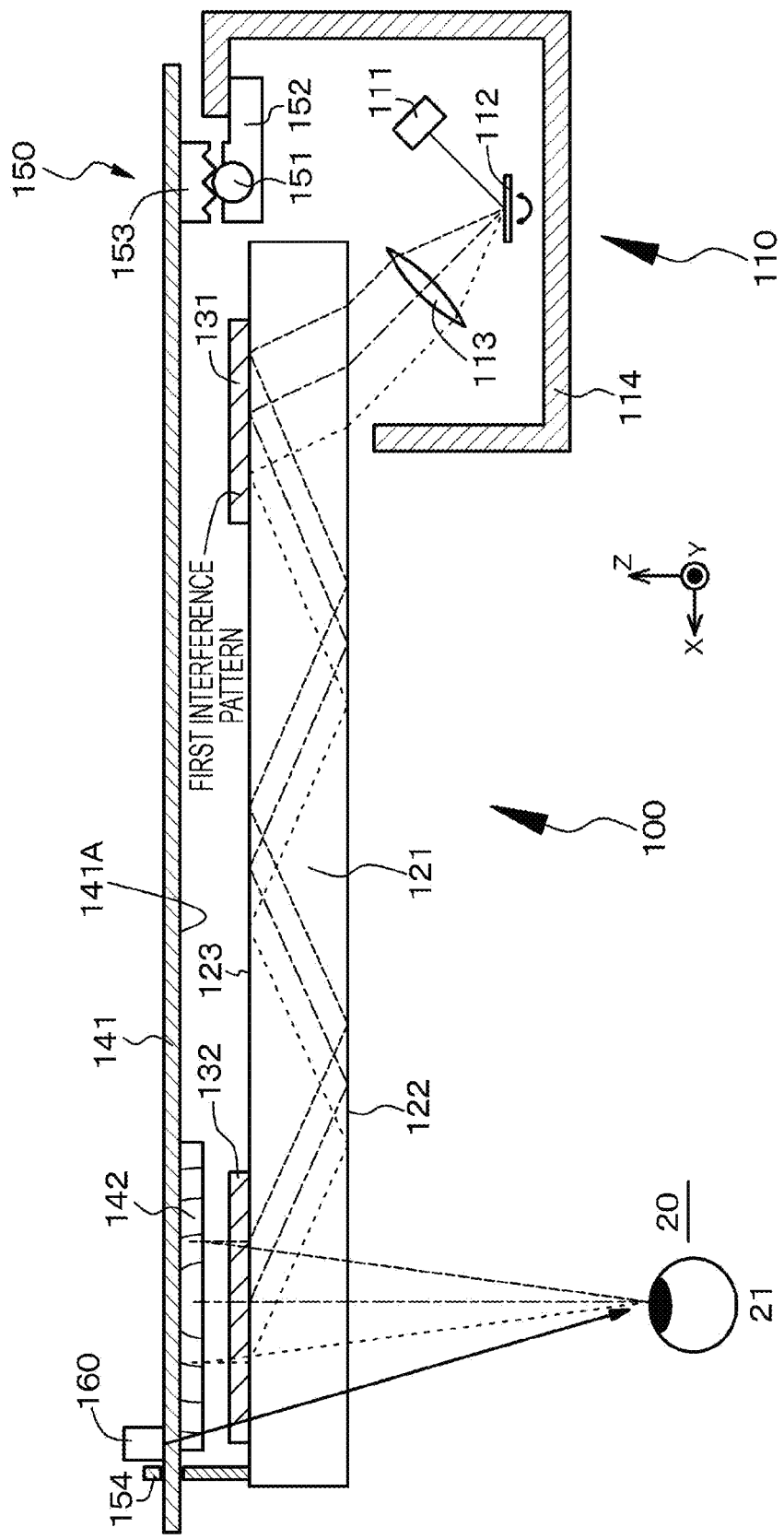

<OBSERVER SIDE>

IMAGE DISPLAY DEVICE, DISPLAY DEVICE, AND ADJUSTMENT METHOD FOR DISPLAY DEVICE

CROSS REFERENCE TO RELATED APPLICATIONS

This application is a national stage application under 35 U.S.C. 371 and claims the benefit of PCT Application No. PCT/JP2017/018489 having an international filing date of 17 May 2017, which designated the United States, which PCT application claimed the benefit of Japanese Patent Application No. 2016-142352 filed 20 Jul. 2016, the entire disclosures of each of which are incorporated herein by reference.

TECHNICAL FIELD

The present disclosure relates to an image display device, a display device including the image display device, and an adjustment method for a display device, and more specifically relates to an image display device used for a head mounted display (HMD), a display device including the image display device, and an adjustment method for a display device.

BACKGROUND ART

There is a known a virtual image display device (image display device) disclosed in, for example, Japanese Patent Application Laid-Open No. 2012-042654 in order to make an observer observe, by using a virtual image optical system, a two-dimensional image as an enlarged image formed by an image forming device.

As illustrated in a conceptual diagram of FIG. 29, an image display device 1100 basically includes: an image forming device 1110 that displays an image; a lens system 1115; and an optical unit 1120 that receives incident light displayed on the image forming device 1110 and guides the incident light to a pupil 21 of an observer 20. Here, the optical unit 1120 includes: a light guide plate 1121; and a first diffraction grating member 1131 and a second diffraction grating member 1132 each of which includes a reflective volume hologram diffraction grating provided on the light guide plate 1121. Then, light emitted from each pixel of the image forming device 1110 is made incident on the lens system 1115, parallel light is generated therefrom by the lens system 1115, and the parallel light is made incident on the light guide plate 1121 from a first surface 1122 of the light guide plate 1121, and then emitted from the first surface 1122. The first diffraction grating member 1131 and the second diffraction grating member 1132 are attached to a second surface 1123 of the light guide plate 1121 that is parallel to the first surface 1122 of the light guide plate 1121.

The image forming device 1110 includes: a light source 1111; a collimate optical system 1112 that converts light emitted from the light source 1111 into parallel light; and a scanning unit 1114 that scans the parallel light emitted from the collimate optical system 1112. Note that the entire image forming device 1110 is housed inside a casing 1116 (indicated by an alternate long and short dash line). The light source 1111 includes a light-emitting element that emits white light, and the light emitted from the light source 1111 is incident on the collimate optical system 1112 having positive optical power as a whole, and is emitted as the parallel light. Then, the parallel light is reflected at a total reflection mirror 1113, and the light from the light source 1111 is subject to horizontal scanning and vertical scanning by the scanning unit 1114 including a MEMS mirror in which a micro mirror can be freely rotated in a two-dimensional direction and can two-dimensionally scan the incident parallel light, thereby forming a kind of two-dimensional image.

Furthermore, the image display device disclosed in this patent publication further includes a movement device that relatively moves an optical axis of the image forming device 1110 and an optical axis of the lens system 1115 in the horizontal direction. Additionally, a convergence angle is adjusted by relatively moving the optical axis of the image forming device and the optical axis of the optical system in the horizontal direction by the movement device.

There is a known head-mounted display of a direct drawing type, for example, Japanese Patent Application Laid-Open No. 2001-004956, in which an image is directly drawn on a pupil of an observer.

CITATION LIST

Patent Document

Patent Document 1: Japanese Patent Application Laid-Open No. 2012-042654
Patent Document 2: Japanese Patent Application Laid-Open No. 2001-004956

SUMMARY OF THE INVENTION

Problems to be Solved by the Invention

By the way, a state in which an observer 20 wears a display device or a state in which the observer wearing is often changed in actual use of the display device. In other words, a relative positional relation between a position of a pupil 21 of the observer 20 and a second diffraction grating member 1132 is changed or likely to be changed. Additionally, when such a change occurs, there is a problem that an image formed in an image forming device 1110 does not reach the pupil 21 of the observer 20 properly. Especially, in a case of assuming a system in which light emitted from the second diffraction grating member 1132 is made incident on the pupil 21 of the observer 20, there is a possibility that the image formed in the image forming device 1110 does not reach the pupil 21 of the observer 20 properly even when the relative positional relation between the position of the pupil 21 of the observer 20 and the second diffraction grating member 1132 is slightly changed. However, nothing is described about such a problem in the above-described patent publications.

Therefore, the present disclosure is directed to providing an image display device having a configuration and a structure capable of easily handling a change in a state in which an observer wears (is wearing) a display device, a display device including the image display device, and an adjustment method for the display device.

Solutions to Problems

An image display device of the present disclosure in order to achieve the above-described object is an image display device including:

an image forming device;
a light guide plate;
a support substrate arranged apart from the light guide plate;

a first deflection unit attached to the light guide plate;
a second deflection unit attached to the light guide plate; and
an optical member attached to the support substrate in a manner facing the second deflection unit,
in which
light from the image forming device is deflected at the first deflection unit, propagated inside the light guide plate by total reflection, deflected at the second deflection unit, and incident on the optical member,
the optical member emits the incident light toward a pupil of an observer, and
further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

A display device of the present disclosure in order achieve the above-described object is a display device that includes (A) a frame to be mounted on a head of an observer, and (B) an image display device attached to the frame,
the image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
in which
light from the image forming device is deflected at the first deflection unit, propagated inside the light guide plate by total reflection, deflected at the second deflection unit, and incident on the optical member,
the optical member emits the incident light toward a pupil of an observer, and
further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

An adjustment method for a display device of the present disclosure in order to achieve the above-described object is an adjustment method for a display device that includes
(A) a frame to be mounted on a head of an observer, and
(B) an image display device attached to the frame, the image display device including:
an image forming device;
a light guide plate;
a support substrate arranged apart from the guide plate;
a first deflection unit attached to the light guide plate;
a second deflection unit attached to the light guide plate; and
an optical member attached to the support substrate in a manner facing the second deflection unit,
the display device further including a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction,
the adjustment method including:
deflecting light from the image forming device at the first deflection unit, propagating inside the light guide plate by total reflection, deflecting the light at the second deflection unit, making the light incident on the optical member, and causing light emitted from the optical member to be incident on a pupil of an observer by moving the support substrate with respect to the light guide plate in the X direction or in the X direction and Y direction by using the movement device.

Effects of the Invention

In the image display device of the present disclosure, the image display device provided in the display device of the present disclosure, and the image display device in the adjustment method for the display device of the present disclosure, provided is the movement device that moves the support substrate with respect to the light guide plate in order to change the relative positional relation between the second deflection unit and the optical member, and therefore, a change in a state in which an observer wears (is wearing) the display device can be easily handled. Note that the effects recited in the present specification are only examples and not limited thereto, and furthermore, an additional effect may also be provided.

BRIEF DESCRIPTION OF DRAWINGS

FIG. 11 is a conceptual diagram of an image display device of Example 4.
FIG. 12 is a conceptual diagram of an image display device of Example 5.

MODE FOR CARRYING OUT THE INVENTION

Figure 1:
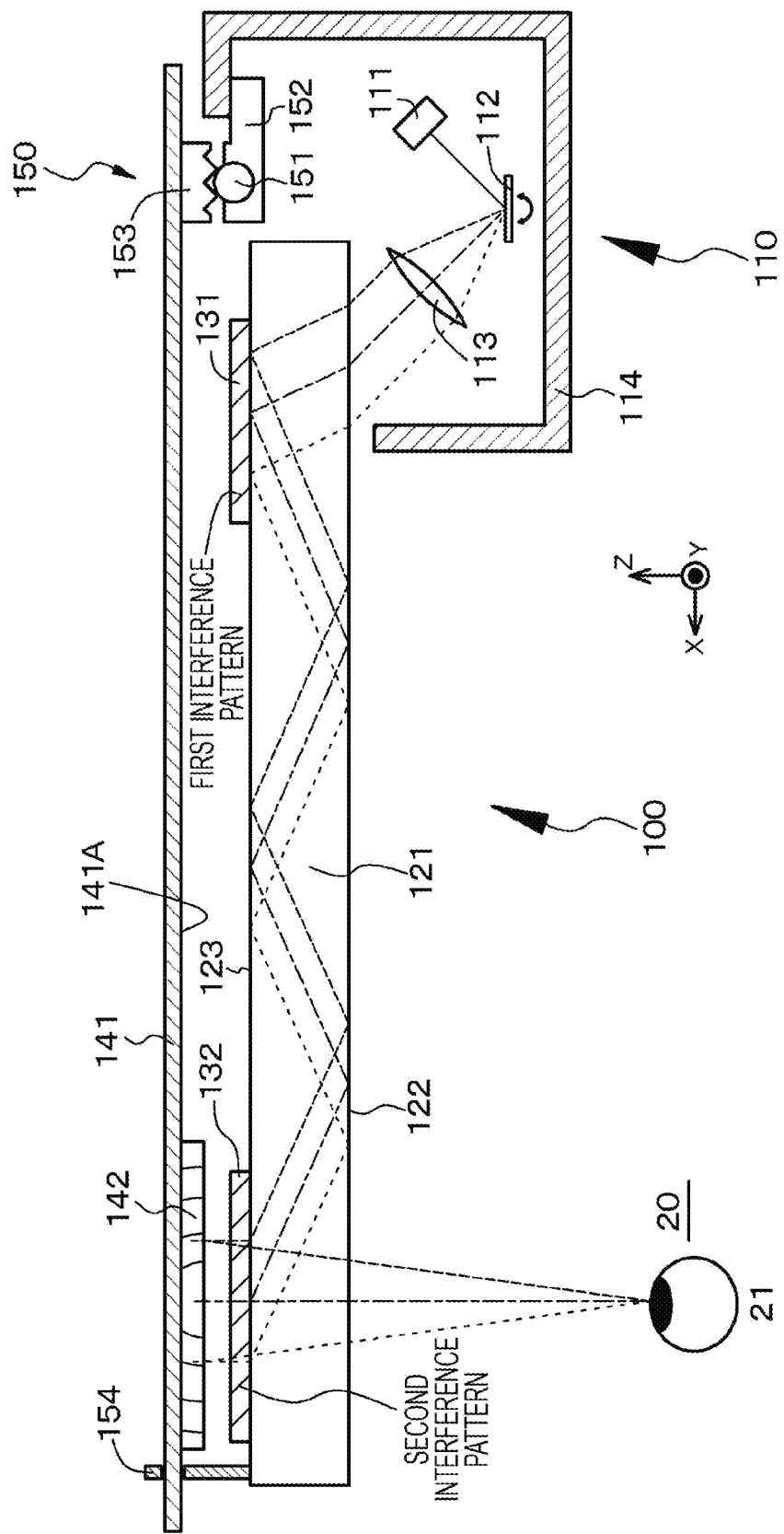
FIG. 1 is a conceptual diagram of an image display device of Example 1.

In the following, the present disclosure will be described with reference to the drawings on the basis of Examples, but note that the present disclosure is not limited to such Examples and various values and materials in Examples are examples. Note that descriptions will be provided in the following order.

1. General Description of Image Display Device of Present Disclosure, Display Device of Present Disclosure, and Adjustment Method for Display Device of Present Disclosure 2. Example 1 (Image Display Device of Present Disclosure, Display Device of Present Disclosure, and Adjustment Method for Display Device of Present Disclosure)
3. Example 2 (Modification of Example 1)
4. Example 3 (Modification of Example 1 to 2)
5. Example 4 (Modification of Examples 1 to 3)
6. Example 5 (Modification of Examples 1 to 4)
7. Example 6 (Modification of Examples 1 to 2 and Examples 4 to 5)
8. Example 7 (Modification of Examples 1 to 6)
9. Example 8 (Modification of Examples 1 to 7)
10. Example 9 (Modification of Example 8)
11. Example 10 (Another Modification of Example 8)
12. Others General Description of Image Display Device of Present Disclosure, Display Device of Present Disclosure, and Adjustment Method for Display Device of Present Disclosure In an adjustment method for a display device of the present disclosure, it is possible to have a mode in which light intensity of an image emitted from an optical member and incident on a pupil of an observer optimized (specifically, light intensity of an image incident on a pupil of an observer is maximized, for example) by moving a support substrate with respect to a light guide plate in an X direction or in the X direction and a Y direction by the movement device. Furthermore, in the adjustment method for a display device of the present disclosure including this preferable mode, it is possible to have a mode in which the support substrate is moved by the movement device on the basis of a position of an image of the pupil of the observer.

When a state in which an observer wears (is wearing) the display device is changed, an image formed by the image forming device does not become incident on a pupil of the observer (or an incident state is displaced), in other words, an image formed by the image forming device does not form an image on a retina of the observer (or an image formed state is displaced), and therefore, the support substrate is moved with respect to the light guide plate by the movement device, and it is possible to have a mode in which such a movement is performed on the basis of a command of the observer (adjustment by an observer). Alternatively, as described above, it is possible to have a mode in which the support substrate is moved on the basis of a position of an image of the pupil of the observer.

In the image display device of the present disclosure, the image display device constituting the display device of the present disclosure, the image display device constituting the display device in the adjustment method for the display device of the present disclosure (these will be collectively referred to as "image display device and the like of the present disclosure"), it is possible to have a mode in which the movement device further moves the support substrate in a Z direction when a direction orthogonal to the X direction and the Y direction is defined as a Z direction.

In the image display device and the like of the present disclosure including the above preferable modes, it is possible to have a mode in which the optical member emits incident light to a pupil of an observer by moving the support substrate with respect to the light guide plate in the X direction or in the X direction and the Y direction by movement of the support substrate.

In the image display device and the like of the present disclosure including the above-described various preferable modes, it is possible to have a mode in which the number of times of total reflection inside the light guide plate for the light to be propagated inside the light guide plate by total reflection is not changed regardless of movement of the support substrate. For example, the number of times of total reflection (the number of times the light deflected at a first deflection unit collides with an inner surface of the light guide plate before colliding with a second deflection unit) can be, for example, twice to four times. By setting the number of times of total reflection to such small number of times, required accuracy in a parallel plate state of the light guide plate described later can be decreased, and a selection range of a material constituting the light guide plate is broadened. Additionally, in each deflection unit, the light incident on each deflection unit is not deflected a plurality of times inside the deflection unit, and therefore, it is possible to avoid degradation of displayed image quality. Note that the term "total reflection" means internal total reflection or total reflection inside the light guide plate.

Furthermore, in the image display device and the like of the present disclosure including the above-described various preferable modes, it is possible to have a mode in which an image moving unit to control light that travels from the image forming device to the light guide plate is further provided. Additionally, in this case, it is possible to have a mode in which the image moving unit relatively moves the image forming device with respect to the light guide plate in the X direction, in the X direction and the Y direction, or moves the image forming device inside an XY plane. Alternatively, in this case, it is possible to have a mode in which the image moving unit changes an emission position of the light emitted from the image forming device.

Furthermore, in the image display device and the like of the present disclosure including the above-described various preferable modes, it is possible to have a mode in which each of the first deflection unit and the second deflection unit includes a hologram diffraction grating.

Furthermore, in the image display device and the like of the present disclosure including the above-described various preferable modes, it is possible to have a mode in which the optical member includes a hologram lens.

Furthermore, in the image display device and the like of the present disclosure including the above-described various preferable modes, it is possible to have a mode in which the image forming device includes a light source and a scanning unit that scans the light emitted from the light source to form an image.

Specifically, it is possible to have a mode in which the image forming device includes a laser light source and a MEMS mirror, but not limited to this mode. Specific description will be described later.

Furthermore, in the image display device and the like of the present disclosure including the above-described various preferable modes, it is possible to have a mode in which the light guide plate includes: a first surface on which light from the image forming device is incident; and a second surface facing the first surface, the first deflection unit is arranged on the first surface or the second surface of the light guide plate, the second deflection unit is arranged on the first surface or the second surface of the light guide plate, and the optical member is arranged in a manner facing the first surface or the second surface of the light guide plate. Note that the surface of the support substrate facing the light guide plate will be referred to as the first surface, and the surface facing the first surface will be referred to as the second surface. The support substrate is arranged in a manner facing the first surface of the light guide plate, and the optical member is arranged on the first surface or the second surface of the support substrate. Alternatively, the support substrate is arranged in a manner facing the second surface of the light guide plate, and the optical member is arranged on the first surface or the second surface of the support substrate. In other words, there are sixteen ways of arrangement of the first deflection unit, the second deflection unit, and the optical member.

Furthermore, in the image display device and the like of the present disclosure including the above-described various preferable modes, it is possible to have a mode in which the movement device moves the support substrate on the basis of a position of an image of a pupil of an observer. Additionally, in this case, it is possible to have a mode in which an imaging device that is located adjacent to the support substrate and captures an image of the pupil of the observer is further provided. Since the position of the pupil of the observer is thus detected, the image formed by the image forming device can be more surely made incident on the pupil of the observer. Specifically, the imaging device may include, for example, a solid-state imaging device including a CCD or CMOS sensor and a lens and the imaging device is attached to the support substrate, for example. When the imaging device is thus attached to the support substrate, the imaging device is moved integrally with the support substrate, and therefore, a movement amount with respect to the pupil of the observer is reduced and the pupil of the observer can be detected with higher accuracy. An output of the imaging device is transmitted to a control device (control circuit) described later.

Furthermore, in the image display device and the like of the present disclosure including the above-described various preferable modes, it is possible to have a mode in which the optical member has positive optical power.

Moreover, in the image display device and the like of the present disclosure including the above-described various preferable modes, it is possible to have a mode in which the movement device includes a rack-and-pinion, a piezoelectric element, a voice coil motor, or an ultrasonic motor. Note that these devices can be used in combination as the movement device.

Additionally, the support substrate may be attached to a rack gear portion, a pinion gear portion may be attached to the support member, and a support member may be attached to, for example, a frame or a casing of an image forming device described later. With this structure, the rack gear portion screwed with the pinion gear portion is moved by rotating the pinion gear portion, and the support substrate can be moved in the X direction or in the X direction and Y direction. Alternatively, a piezoelectric element, a voice coil motor, or an ultrasonic motor may be arranged between the support substrate and the support member, and the support member may be attached to, for example, the frame or the casing of the image forming device.

As a lens system, it is possible to exemplify an optical system that includes any individual lens out of a convex lens, a concave lens, a free-form surface prism, and a hologram lens or includes combination thereof, and has positive optical power as a whole. It is possible to have a mode in which a value of the positive optical power held by the lens system is larger than a value of the positive optical power held by the optical member. Stated differently, it is possible to have a mode in which a focal length of the optical member is longer than a focal length of the lens system because the optical power is a reciprocal of a focal length. In some cases, an aperture is arranged at a position of a front focal point (focal point on a side of the image forming device) of the lens system. In some cases, the optical member constitutes a kind of concave mirror, and a pupil of an observer (specifically, crystalline lens of observer) is located at a position of a back focal point of the optical member.

In some cases, the lens system can also include a liquid lens. Such a liquid lens may include a known liquid lens utilizing an electrowetting phenomenon. With actuation of the liquid lens, an optical axis of the lens system can be horizontally moved or an angle of an optical axis of the lens system with respect to the XY plane can be changed. Additionally, in some cases, the lens system can also include a liquid prism. Such a liquid prism may include a known liquid prism utilizing the electrowetting phenomenon. With actuation of the liquid prism, the angle of the optical axis of the lens system with respect to the XY plane can be changed, for example.

In the image display device and the like of the present disclosure including the above-described various preferable modes and configurations, it is possible to have a mode in which the image forming device further including a light source and a scanning unit that scans light from the light source to form an image. Note that such an image forming device will be referred to as "image forming device of a first configuration" for convenience.

In the image forming device of the first configuration, a light-emitting element can be exemplified as the light source, specifically, a red light-emitting element, a green light-emitting element, a blue light-emitting element, and a white light-emitting element can be exemplified, and alternatively, white light may be obtained by: mixing red light, green light, and blue light respectively emitted from the red light-emitting element, the green light-emitting element, and the blue light-emitting element by using a light pipe; and uniforming the luminance. Examples of the light-emitting element can include a semiconductor laser element, a solid-state laser, and an LED. The number of pixels (virtual pixels) in the image forming device of the first configuration may be determined on the basis of specifications required in the image display device, and examples of specific values of the number of pixels (virtual pixels) can include 320×240, 432×240, 640×480, 854×480, 1024×768, 1920×1080, and the like. Additionally, in a case where the light source includes the red light-emitting element, green light-emitting element, and blue light-emitting element, color synthesis is preferably performed by using a cross prism, for example. Examples of the scanning unit can include a micro electro mechanical systems (MEMS) mirror and a galvanometer mirror each including a micro mirror rotatable in a two-dimensional direction and adapted to perform horizontal scanning and vertical scanning for the light emitted from the light source, for example. Note that the MEMS mirror or the galvanometer mirror corresponds to an image emission unit from which an image is emitted from the image forming device.

However, the image forming device is not limited to the above-described image forming device, and may also be, for example: an image forming device including a reflective spatial light modulation device and a light source; an image forming device including a transmissive spatial light modulation device and a light source; and an image forming device including light-emitting elements such as an organic electro luminescence (EL), an inorganic EL, a light emitting diode (LED), and a semiconductor laser element. Note that these image forming devices will be referred to as "image forming device of a second configuration" for convenience. Among the mentioned image forming devices, it is preferable to use the image forming device including an organic EL light-emitting element and the image forming device including a reflective spatial light modulation device and a light source. As the spatial light modulation device, a transmissive or reflective liquid crystal display device using a light valve for example, a liquid crystal on silicon (LCOS) or the like, and a digital micromirror device (DMD) can be exemplified, and a light-emitting element can be exemplified as the light source. Furthermore, the reflective spatial light modulation device can have a configuration including a liquid crystal display device and a polarized beam splitter that reflects and guides a part of light to the liquid crystal display device from the light source, and transmits a part of light reflected at the liquid crystal display device and guides the light to the light guide plate. Examples of the light-emitting elements constituting the light source include a red light-emitting element, a green light-emitting element, a blue light-emitting element, and a white light-emitting element. Alternatively, white light may also be obtained by: mixing red light, green light, and blue light respectively emitted from the red light-emitting element, the green light-emitting element, and the blue light-emitting element by using a light pipe; and uniforming the luminance. Examples of the light-emitting element can include a semiconductor laser element, a solid-state laser, and an LED. The number of pixels may be determined on the basis of the specifications required for the image display device, and examples of specific values of the number of pixels can include 320×240, 432×240, 640×480, 854×480, 1024×768, 1920×1080, and the like. Note that, the image forming device of the second configuration has an aperture arranged at a position of a front focal point (focal point on the side of the image forming device) of the lens system, and the aperture corresponds to an image emission unit from which an image is emitted from the image forming device.

In a case where the first deflection unit includes a hologram diffraction grating, the first deflection unit diffracts and reflects light incident on the light guide plate, and the second deflection unit diffracts and reflects light propagated inside the light guide plate by total reflection. The hologram diffraction grating can include a reflective hologram diffraction grating or can include a transmissive hologram diffraction grating, or one hologram diffraction grating can include a reflective hologram diffraction grating and the other hologram diffraction grating can include a transmissive hologram diffraction grating. Note that a reflective volume hologram diffraction grating can be exemplified as the reflective volume hologram diffraction grating. The reflective volume hologram diffraction grating represents a hologram diffraction grating that diffracts and reflects only plus primary diffraction light. Note that the first deflection unit including a hologram diffraction grating may be referred to as a "first diffraction grating member" and the second deflection unit including a hologram diffraction grating may be referred to as a "second diffraction grating member" for convenience. For example, light diffracted and reflected by the second deflection unit is incident on the optical member, subsequently emitted from the optical member, passes through the second deflection unit, and is made incident on a pupil of an observer. Note that a portion corresponding to light which is emitted from the optical member and also is the light at the time of passing through the second deflection unit is incident on the pupil of the observer without being diffracted and reflected at the second deflection unit because the light does not satisfy diffraction conditions in the second deflection unit.

Alternatively, the first deflection unit can include, for example, a light reflection film (a kind of mirror) that includes a metal containing an alloy and reflects light incident on the light guide plate, and also can include a multi-layer lamination structure in which a plurality of dielectric lamination films is laminated, a half mirror, and a polarized beam splitter.

A single color (e.g., green) image can be displayed by the image display device and the like of the present disclosure. Additionally, in this case, the first deflection unit can include one hologram diffraction grating. Furthermore, in a case of performing color image display, the first diffraction grating member or the second diffraction grating member can have a configuration in which P layers of hologram diffraction gratings are laminated in order to handle diffraction and reflection for P kinds of light having different P kinds of wavelength bands (or wavelengths) (for example, P=3 and three kinds of colors of red, green, and blue). In each of the hologram diffraction gratings, an interference pattern corresponding to one kind of wavelength band (or wavelength) is formed. Alternatively, P kinds of interference patterns can be formed in one the hologram diffraction grating in order to handle diffraction and reflection for the P kinds of light having the different P kinds of wavelength bands (or wavelengths). Alternatively, for example, it may be possible to adopt a structure in which a hologram diffraction grating that diffracts and reflects light having a red wavelength band (or wavelength) is arranged on a first light guide plate, a hologram diffraction grating that diffracts and reflects light having a green wavelength band (or wavelength) is arranged on a second light guide plate, and a hologram diffraction grating that diffracts and reflects light having a blue wavelength band (or wavelength) is arranged on a third light guide plate, and the first light guide plate, second light guide plate, and third light guide plate are laminated interposing a space therebetween. Alternatively, it is possible to have a configuration in which one kind of wavelength is divided into, for example, three, and the first diffraction grating member or the second diffraction grating member is formed by laminating respective hologram diffraction gratings corresponding to the respective three divided wavelength bands, or it is possible to have a configuration in which interference patterns of the respective three divided wavelength bands are formed in one hologram diffraction grating. Furthermore, by adopting these configurations, it is possible to improve diffraction efficiency, increase a diffraction reception angle, and optimize a diffraction angle when the light of each wavelength band (or wavelength) is diffracted and reflected by the first diffraction grating member or the second diffraction orating member.

As an exemplary material constituting a diffraction grating member, a photopolymer material can be exemplified. The constituent material and the basic structure in the first diffraction grating member and the second diffraction grating member each including a hologram diffraction grating may be the same as a constituent material and a structure of a conventional hologram diffraction grating. The diffraction grating member has an interference pattern formed from the inside to a surface thereof, and a method of forming the interference pattern may be the same as a conventional forming method. Specifically, for example, object light is emitted from a first predetermined direction on one side to a member (e.g., photopolymer material) constituting a diffraction grating member, and at the same time, reference light is emitted from a second predetermined direction on the other side to the member constituting the diffraction grating member, and an interference pattern formed by the object light and the reference light may be recorded inside the member constituting the diffraction grating member. By appropriately selecting the first predetermined direction, second predetermined direction, and wavelengths of the object light and reference light respectively, a desired pitch of the interference pattern on the surface of the diffraction grating member and a desired inclination angle (slant angle) of the interference patterns can be obtained. The inclination angle of the interference pattern represents an angle formed between the surface of the diffraction grating member and the interference pattern. In a case of forming the first diffraction grating member and the second diffraction grating member from the laminated structure including the P layers of hologram diffraction gratings, the P layers of hologram diffraction gratings may be laminated (bonded) by using, for example, an ultraviolet curable adhesive after individual manufacture of the respective P layers of hologram diffraction gratings. Additionally, after manufacture of one layer of hologram diffraction grating by using a photopolymer material having an adhesive property, the P layers of hologram diffraction gratings may be manufactured by manufacturing a hologram diffraction grating by sequentially bonding the photopolymer material having the adhesive property onto the manufactured single hologram diffraction grating. A monomer contained inside the photopolymer having remained without being polymerized during irradiation of the hologram diffraction grating with the object light and the reference is polymerized and fixed by irradiating the manufactured hologram diffraction grating with energy rays as necessary. Additionally, heat treatment is performed for stabilization as necessary.

As an exemplary material constituting the hologram lens, a photopolymer material can be exemplified. The constituent material and the basic structure of the hologram lens may be the same as a constituent material and a structure of a conventional hologram lens. The hologram lens has an interference pattern formed thereon to exert a function as a lens (more specifically, as a concave mirror), but a method of forming the interference patterns may be same as a conventional forming method. Specifically, for example, object light is emitted from a first predetermined direction on one side to a member (e.g., photopolymer material) constituting a hologram lens, and at the same time, reference light is emitted from a second predetermined direction on the other side to the member constituting the hologram lens, and an interference pattern formed by the object light and the reference light may be recorded inside the member constituting the hologram lens. For example, one of the object light and the reference light is a divergent beam, and the other one is a focused beam. By appropriately selecting the first predetermined direction, second predetermined direction, and wavelengths of the object light and reference light respectively, an appropriate interference pattern can be formed in the hologram lens, thereby applying desired positive optical power.

To protect each of the diffraction grating member and the hologram lens, a transparent protective member may be provided. Specifically, each of an outer edge portion of the light guide plate and an outer edge portion of the transparent protective member may be sealed with a sealing member or bonded. As the sealing member also referred to as a sealing agent, it is possible to use various resins of a thermosetting type, a photocuring type, a moisture curing type, an anaerobic curing type, and the like, such as an epoxy type resin, an urethane type resin, an acrylic type resin, a vinyl acetate type resin, an ene-thiol series resin, a silicone series resin, and a modified polymer resin.

In the display device of the present disclosure including the above-described various preferable modes and configurations, it is preferable that at least a portion of the image display device facing a pupil of an observer be semi-transparent (see-through) such that an external view can be seen through this portion. Specifically, it is a preferable to have a mode in which the optical member and the second deflection unit are semi-transparent type (see-through type), and it is preferable that the support substrate include a transparent material.

The light guide plate has two parallel surfaces (first surface and second surface) extending parallel to an axial line of the light guide plate (corresponding to longitudinal direction, horizontal direction, and X direction). Note that a width direction (height direction and vertical direction) of the light guide plate corresponds to the Y direction. When a surface of the light guide plate on which light is incident is defined as a light guide plate incident surface and a surface of the light guide plate from which light is emitted is defined as a light guide plate emission surface, the light guide plate incident surface and the light guide plate emission surface may include the first surface, or the light guide plate incident surface may include the second surface and the light guide plate emission surface may include the first surface. The interference pattern of the hologram diffraction grating extends substantially parallel to the Y direction. Examples of a material constituting the light guide plate and the support substrate (support plate), examples of a material constituting the transparent protective member, and examples of a material constituting a first substrate and a second substrate of a dimming device described later can include optical glass such as quartz glass and BK7, soda lime glass, glass containing white sheet glass, and plastic materials (e.g., PMMA, polycarbonate resin, laminated structure obtained by laminating polycarbonate resin and acrylic resin, acrylic resin, cycloolefin polymer, amorphous polypropylene resin, styrene series resin including AS resin). A shape of the light guide plate or the like is not limited to a flat plate and may have a curved shape.

In the display device of the present disclosure, it is possible to have a configuration in which a light shielding member is arranged on outer side of the second surface of the light guide plate so as to cover the first deflection unit. Furthermore, in this case, it is possible to have a configuration in which an orthogonal projection image of the first deflection unit onto the light guide plate is included in an orthogonal protection image of the light shielding member onto the light guide plate.

Alternatively, in the display device of the present disclosure, it is possible to have a configuration in which a light shielding member that shields incidence of external light on the first deflection unit is arranged in a region of the first deflection unit on which the light emitted from the image forming device is incident. Since the light shielding member that shields incidence of external light on the region of the light guide plate is arranged in the region of the light guide plate on which the light emitted from the image forming device is incident, the external light is prevented from being incident on the region of the light guide plate on which the light emitted from the image forming device is incident, and therefore, image display quality on the display device is prevented from being degraded by generation of undesirable stray light or the like. Note that it is preferable to have a mode in which the region of the light guide plate on which the light emitted from the image forming device is incident is included inside the orthogonal projection image of the light shielding member onto the light guide plate.

Specifically, it is possible to have a configuration in which the light shielding member is arranged apart from the light guide plate on the side opposite to the side of the light guide plate where the image forming device is arranged. In the display device having such a configuration, the light shielding member may be manufactured of, for example, an opaque plastic material. Additionally, it is possible to have a mode in which such a light shielding member integrally extends from the casing of the image forming device, is attached to the casing of the image forming device, integrally extends from a frame, or is attached to the frame. Alternatively, it is also possible to have a configuration in which the light shielding member is attached to or arranged on the light guide plate or a configuration in which the light shielding member is arranged on the dimming device described next. In this case, it is preferable to have a configuration in which an orthogonal projection image of an end portion of the dimming device onto the light guide plate is included inside the orthogonal projection image of the light shielding member onto the light guide plate. For example, the light shielding member including an opaque material may be formed, for example, on the surface of the light guide plate on the basis of a physical vapor deposition method (PVD method) or a chemical vapor deposition method (CVD method), may be formed by a printing method or the like, or may be formed by pasting a film, a sheet, or a foil including an opaque material (plastic material, metal material, alloy material, or the like).

The dimming device may be arranged on the second surface side of the light guide plate. For example, it is possible to have a mode in which the dimming device includes:

a first substrate;

a second substrate facing the first substrate;

a first transparent electrode provided on a surface of the first substrate facing the second substrate;

a second transparent electrode provided on a surface of the second substrate facing the first substrate; and a light adjustment layer interposed between the first transparent electrode and the second transparent electrode. Additionally, in this case, it is possible to have a mode in which, for example, the first transparent electrode includes a plurality of strip-shape first transparent electrode segments extending in a first direction, the second transparent electrode includes a plurality of strip-shape second transparent electrode segments extending in a second direction different from the first direction, and a light shielding rate in a portion of the dimming device corresponding an overlapping region of the first transparent electrode segment and the second transparent electrode segment (minimum unit region where the light shielding rate in the dimming device is changed) is controlled on the basis of controlling voltage applied to each of the first transparent electrode segment and the second transparent electrode segment. In other words, the light shielding rate can be controlled on the basis of a simple matrix method. It is possible to exemplify a mode in which the first direction and the second direction are orthogonal to each other.

Alternatively, a thin film transistor (TFT) may also be provided in each minimum unit region in order to control a light shielding rate in the minimum unit region in which the light shielding rate in the dimming device is changed. In other words, the light shielding rate may be controlled on the basis of an active matrix method. Alternatively, at least one of the first transparent electrode or the second transparent electrode may be a so-called solid electrode (electrode not patterned).

It is possible to have a configuration in which the light guide plate functions also as the first substrate, and with this form, the weight of the entire display device can be reduced and there is no possibility that a user (observer) of the display device feels discomfort. The second substrate may have a configuration thinner than the first substrate. In the display device including the dimming device, a size and a position of an actual light adjustment region of the dimming device are determined on the basis of a signal to display an image in the image forming device. The dimming device may have a size same as a size of the light guide plate or a size larger or smaller. In short, the size may be any size as far as the second deflection unit and the optical member (or a virtual image forming region) are located inside the orthogonal projection image of the dimming device.

It is possible to have a configuration in which a maximum light transmittance of the dimming device is 50% or more and a minimum light transmittance of the dimming device is 30% or less. Note that an exemplary upper limit of the maximum light transmittance of the dimming device can be 99%, and an exemplary lower limit of the minimum light transmittance of the dimming device can be 1%. Here, the following relation is satisfied:

(Light transmittance)=1−(Light shielding rate).

In some cases, it is possible to have a configuration in which the light that passes through the dimming device is colored in a desired color by the dimming device. Additionally, in this case, it is possible to have a mode in which a color to be colored by the dimming device is variable or a color to be colored by the dimming device is fixed. Note that, in the former case, a mode in which, for example, a dimming device coloring the light in red, a dimming device coloring the light in green, and a dimming device coloring the light in blue are laminated may be adopted. Additionally, in the latter case, brown can be exemplified as a color to be colored by the dimming device although the color is not to be limited.

Furthermore, in some cases, it is possible to have a mode in which the dimming device is detachably arranged. To detachably arrange the dimming device, for example, a dimming device is attached to a frame by using, for example, a screw manufactured from transparent plastic, or the dimming device can be attached to the frame by preliminarily cutting a groove in the frame and fitting the dimming device in this groove, or the dimming device can be attached to the frame by attaching a magnet to the frame, or the dimming device may be fitted in a slide portion by providing the slide portion in the frame. Furthermore, a connector may be attached to the dimming device, and the dimming device may be electrically connected, via the connector and wiring, to a control circuit (for example, included in a control device to control the image forming device and the movement device) to control the light shielding rate (light transmittance) of the dimming device. The dimming device may be curved.

In the display device of the present disclosure including the dimming device, it is possible to have a mode in which an environment illuminance measurement sensor that measures illuminance of an environment where the display device is placed is further provided, and the light shielding rate in the dimming device is controlled on the basis of a measurement result of the environment illuminance measurement sensor. Alternatively, it is possible to have a mode in which an environment illuminance measurement sensor that measures illuminance of an environment where the display device is placed is further provided, and luminance of an image formed by the image forming device is controlled on the basis of a measurement result of the environment illuminance measurement sensor. These modes may be combined.

Alternatively, in the display device of the present disclosure including the dimming device, it is possible to have a mode in which a transmitted light illuminance measurement sensor that measures illuminance based on light transmitted from an external environment through the dimming device is further provided, and the light shielding rate in the dimming device is controlled on the basis of a measurement result of the transmitted light illuminance measurement sensor. Alternatively, it is possible to have a mode in which a transmitted light illuminance measurement sensor that measures illuminance based on light transmitted through the dimming device from the external environment is further provided, and luminance of an image formed by the image forming device is controlled on the basis of a measurement result of the transmitted light illuminance measurement sensor. Note that it is desirable to have a mode in which the transmitted light illuminance measurement sensor be arranged closer to an observer side than the light guide plate is. At least two transmitted light illuminance measurement sensors may be arranged, and may perform: measurement of illuminance based on light having passed through a portion with a high light shielding rate; and measurement of illuminance based on light having passed through a portion with a low light shielding rate. These modes may be combined. Furthermore, these modes may be combined with the mode in which control is performed on the basis of a measurement result of the above-described environment illuminance measurement sensor.

Each of the environment illuminance measurement sensor and the transmitted light illuminance measurement sensor may include a known illuminance sensor, and each of the environment illuminance measurement sensor and transmitted light illuminance measurement sensor may be controlled on the basis of a known control circuit.

As described above, the light guide plate is a semi-transparent type (see-through type) Specifically, at least a portion of the light guide plate facing an eyeball (pupil) of an observer is formed semi-transparent (see-through), and the external view can be seen through this portion of the light guide plate (also can be seen through the dimming device in a case where the dimming device is arranged). The display device of the present disclosure may have one image display device (monocular type) or two display devices (binocular type). As for the binocular type, in the case where the dimming device is arranged, light transmittance at a part of the dimming device may be changed in both of the image display devices, or light transmittance at a part of the dimming device may be changed in one of the image display devices on the basis of a signal to display an image.

In the present specification, the term "semi-transparent" does not mean that a half (50%) of incident light is transmitted or reflected but means that a part of the incident light is transmitted and a remaining part thereof is reflected.

The frame includes a front portion arranged in front of an observer and two temple portions pivotally attached to both ends of the front portion via hinges. Note that a temple tip portion is attached to a distal end portion of each temple portion. The front portion may also have a rim. The image display device is attached to the frame, and specifically, an image forming device may be attached to each temple portion, for example. Also, it is possible to have a configuration in which the front portion and the two temple portions are integrated. In other words, the frame has a structure substantially same as that of ordinarily eye glasses at the time of viewing the entire display device of the present disclosure. A material constituting the frame including a pad portion can be a material same as a material constituting the ordinary eyeglasses, such as a metal, an alloy, plastic, or a combination thereof. Furthermore, it is possible to have a configuration in which a nose pad is attached to the front portion. In other words, an assembly of the frame (including the rim in some cases) and the nose pad has a structure substantially same as the ordinary eyeglasses at the time of viewing the entire display device of the present disclosure. The nose pad can also have a configuration and a structure which are already known.

In the case where the dimming device is provided, the dimming device may be arranged at the front portion. Additionally, it is possible to have a mode in which the light guide plate is attached to the dimming device. Note that the light guide plate may be attached to the dimming device with a gap provided therebetween. Additionally, it is possible to have a mode in which the dimming device is fitted in the rim. Alternatively, at least one of the first substrate or the second substrate may be attached to the frame, for example. However, examples are not limited thereto. The light guide plate and the dimming device may be arranged in this order from an observer side, or the dimming device and the light guide plate may be arranged in this order from the observer side.

Due to a design of the display device, it is desirable to have a mode in which wiring (signal line, power supply line, and the like) from one or two image forming devices extends from a distal end portion of each temple tip portion to the outside via the inside of both of the temple portion and the temple tip portion and is connected to a control device (control circuit or control unit). Additionally, each of the image forming devices includes a headphone portion, and it is more desirable to have a mode in which headphone portion wiring from each of the image forming devices is connected to the headphone portion from the distal end portion of the temple tip portion via the inside of both of the temple portion and the temple tip portion. Examples of the headphone portion can include an inner ear type headphone portion and a canal type headphone portion. More specifically, it is preferable to have a mode in which the headphone portion wiring extends from the distal end portion of the temple tip portion to the headphone portion in a manner passing around the back side of an auricle (ear conch).

Alternatively, in a case where the display device of the present disclosure is the binocular type, it is possible to have a configuration in which the light guide plate is arranged, as a whole, closer to a center side of a surface of an observer than the image forming device is, a coupling member to couple the two image display devices is further provided, the coupling member is attached to a side that is positioned at a center portion of the frame positioned between two pupils of the observer and faces the observer, and a projection image of the coupling member is included in a projection image of the frame.

Since provided is the structure in which the coupling member is attached to the center portion of the frame positioned between the two pupils of the observer, in other words, in a case of not having the structure in which the image display devices are directly attached to the frame, the image forming devices or the light guide plate are/is prevented from being displaced (positionally changed) or displacement is little even when there is displacement by frame deformation that is caused by the temple portions being widened outward when the observer wears the frame on the head. Therefore, a convergence angle in each of left and right images can be surely prevented from being changed. Additionally, since there is no need to increase rigidity of the front portion of the frame, weight increase of the frame, deterioration of a design property, and increase in a cost are not incurred. Additionally, since the image display devices are not directly attached to the frame, a frame design, a color, and the like can be freely selected in accordance with preference of an observer, there are few restrictions on the frame design, and freedom in design is high. Furthermore, the coupling member is arranged between the observer and the frame, and the projection image of the coupling member is included in the projection image of the frame. Stated differently, the coupling member is hidden by the frame when a head mounted type display is viewed from the front of the observer. Therefore, a high design property and a design effect can be provided to the head mounted type display.

Note that it is preferable to have a configuration in which the coupling member is attached to the side that is positioned at the center portion of the front portion positioned between two pupils of an observer (corresponding to a bridge portion of ordinary eyeglasses) and faces the observer.

The two image display devices are coupled by the coupling member, specifically, it is possible to have a mode in which the image forming devices are attached to respective end portions of the coupling member in a manner such that attachment state can be adjusted. Additionally, in this case, it is preferable to have a configuration in which each of the image forming devices is located more on an outer side than the pupils of the observer are. Furthermore, in this configuration, when a distance between a center of an attachment portion of one image forming device and one end portion of the frame (one end piece or elbow) is defined as α, a distance from the center of coupling member to one end portion of the frame (one end piece) of the frame is defined as a distance between the center of the attachment portion of the other image forming device and the one end portion of the frame (one end piece) is defined as γ, and a length of the frame is defined as L, it is desirable to satisfy $0.01 \times L \leq \alpha \leq 0.30 \times L$, preferably, $0.05 \times L \leq \alpha \leq 0.25 \times L$ and $0.35 \times L \leq \beta \leq 0.65 \times L$, preferably $0.45 \times L \leq \beta \leq 0.55 \times L$ and $0.70 \times L \leq \gamma \leq 0.99 \times L$, preferably $0.75 \times L \leq \gamma \leq 0.95 \times L$. Specifically, an image forming device is attached to each of the end portions of the coupling member by, for example, providing through holes at three places in each of the end portions of the coupling member and providing each image forming device with threaded portions corresponding to the through holes, inserting screws through the respective through holes and screwing the screws into the threaded portions provided in each image forming device. A spring is inserted between a screw and a threaded portion. With this structure, the attachment state of each image forming device (inclination of each image forming device with respect to the coupling member) can be adjusted in accordance with a tightened state of each screw.

Here, the center of the attachment portion of the image forming device represents a middle point in an axial line direction of the frame in an overlapping portion of a projection image of an image forming device and a projection image of the frame the time of projecting the image forming device and the frame onto a virtual plane in a state where the image forming devices are attached to the coupling member.

Additionally, the center of the coupling member represents a middle point in an axial line direction of the frame in a portion where the coupling member contacts the frame in a state that the coupling member is attached to the frame. A length of the frame represents a length of the protection image of the frame in a case where the frame is curved. Note that a projection direction is a direction perpendicular to a surface of an observer.

Alternatively, the two image display devices are coupled by the coupling member, and specifically, it is possible to have a mode in which the coupling member also couples two light guide plates. Note that there may be a case where the two light guide plates are manufactured integrally, and in this case, the coupling member is attached to the light guide plates manufactured integrally, but this mode is also included in the mode in which the coupling member couples the two light guide plates. When a distance between a center of one image forming device and one end portion of the frame is defined as $\alpha'$ and a distance between a center of the other image forming device and one end portion of the frame is defined as $\gamma'$, it is desirable that values of $\alpha'$ and $\gamma'$ be values similar to the values of $\alpha$ and $\gamma$ described above. Note that the center of each image forming device represents a middle point in the axial line direction of the frame in an overlapping portion of the projection image of the image forming device and the projection image of the frame at the time of projecting the image forming device and the frame on a virtual plane in a state where the image forming device is attached to the light guide plate.

As far as the projection image of the coupling member is included inside the projection image of the frame, the coupling member has a substantially arbitrary shape, and for example, a bar-like shape and a thin long shape can be exemplified. A material constituting the coupling member can also be a metal, an alloy, plastic, or a combination thereof.

In the display device of the present disclosure, it is possible to have a mode in which a signal to display an image on the image display device (signal to form a virtual image on the light guide plate) is received from the outside. In this mode, information and data associated with an image to be displayed on the image display device are recorded, stored, and saved in, for example, a so-called cloud computer or a server, and the display device includes a communication unit such as a mobile phone or a smartphone, or the display device is combined with the communication unit, thereby achieving transference and exchange of the various information and data between the cloud computer or server and the display device, and further achieving reception of a signal based on the various information and data, in other words, a signal to display an image on the image display device (signal to form a virtual image on the light guide plate). Alternatively, it is possible to have a mode in which a signal to display an image on the image display device (signal to form a virtual image in the light guide plate) is stored on the display device. Note that various information and various data are included in an image displayed on the image display device. Alternatively, the display device includes a camera, and an image captured by the camera is transmitted to a cloud computer or a server via a communication unit, and various information and data corresponding to the image captured by the camera is retrieved from the cloud computer or the server, and the retrieved various information and data are transmitted to the display device via the communication unit, and then the retrieved various information and data are displayed as an image on the image display device.

When an image captured by the camera is transmitted to the cloud computer or server via the communication unit, the image captured by the camera may be displayed on the image display device and confirmed on the light guide plate. Specifically, it is possible to have a mode in which an outer edge of a spatial region imaged by the camera is displayed in a frame shape at the dimming device. Alternatively, it is possible to have a mode in which a light shielding rate in a region of the dimming device corresponding to the spatial region imaged by the camera is set higher than a light shielding rate in a region of the dimming device corresponding to the outside of the spatial region imaged by the camera. In this mode, the spatial region imaged by the camera seems to an observer to be darker than the outside of the spatial region imaged by the camera. Alternatively, it is also possible to have a mode in which a light shielding rate in a region of the dimming device corresponding to the spatial region imaged by the camera is set lower than a light shielding rate in a region of the dimming device corresponding to the outside of the spatial region imaged by the camera. In this mode, the spatial region imaged by the camera seems to the observer to be brighter than the outside of the spatial region imaged by the camera. Furthermore, this enables the observer to easily and surely recognize which part of the outside is imaged by the camera.

Preferably, it is preferable to calibrate a position of the region of the dimming device corresponding to the spatial region imaged by the camera. Specifically, the display device includes, for example, a mobile phone or a smartphone, or the display device is combined with a mobile phone, a smartphone, or a personal computer, thereby enabling the spatial region imaged by the camera to be displayed on the mobile phone, smartphone, or personal computer. Additionally, in a case where there is a difference between the spatial region displayed on the mobile phone, smartphone, or personal computer and the region of the dimming device corresponding to the spatial region imaged by the camera, the difference between the spatial region displayed on the mobile phone, smartphone, or personal computer and the region of the dimming device corresponding to the spatial region imaged by the camera may be eliminated by moving and rotating or enlarging/reducing the region of the dimming device corresponding to the spatial region imaged by the camera by using a control circuit (that can also be substituted by the mobile phone, smartphone, or personal computer) to control the light shielding rate (light transmittance) of the dimming device.

The display device according to the present disclosure including the above-described various modifications can be used in, for example: receiving and displaying an electronic mail; displaying various information or the like on various sites of the Internet; displaying various descriptions, symbols, signs, marks, emblems, designs, and the like in run, operation, maintenance, disassembling, and the like of observation objects such as various devices; displaying various descriptions, symbols, signs, marks, emblems, designs, and the like associated with observation objects such as Persons and articles; displaying moving images and still images; displaying subtitles of a movie or the like; displaying descriptive text and closed captions associated with a moving picture synchronized with the moving picture; displaying various descriptions associated with observation objects in a play, a Kabuki play, a Noh play, a Kyogen play, an opera, a concert, a ballet, a variety of drama performances, a pleasure garden (amusement park), an art museum, a sightseeing place, a holiday resort, a sightseeing guide and the like; displaying descriptive text or the like to describe content, a progress state, backgrounds, and the like thereof; and displaying closed captions. In a play, a Kabuki play, a Nob play, a Kyogen play, an opera, a concert, a ballet, a variety of dramatic performances, a pleasure garden (amusement park), an art museum, a sightseeing place, a holiday resort, a sightseeing guide, and the like, characters as an image associated with an observation object may be displayed on the display device at appropriate timing Specifically, for example, an image control signal is transmitted to the display device and an image is displayed on the display device by operation of a worker or under the control of a computer or the like on the basis of a predetermined schedule and time allocation in accordance with a progress state of a movie or the like or a progress state of a play or the like. Additionally, various descriptions of observation objects such as various devices, persons, and articles are displayed, and the display device can display pre-created various descriptions associated with the observation objects such as various devices, persons, and articles by photographing (imaging) the observation objects such as the various devices, persons, and articles with a camera and analyzing the photographed (imaged) contents in the display device.

An image signal transmitted to the image forming device includes not only an image signal (e.g., character data) but also luminance data (luminance information) or chromaticity data (chromaticity information) associated with an image to be displayed, or both of the luminance data and the chromaticity data. The luminance data can be luminance data corresponding to luminance in a predetermined region including an observation object viewed through the light guide plate, and the chromaticity data can be chromaticity data of a predetermined region including an observation object viewed through the light guide plate. Since the luminance data associated with the image is thus included, luminance (brightness) of the image to be displayed can be controlled, and since the chromaticity data associated with the image is included, the chromaticity (color) of the displayed image can be controlled, and since both of the luminance data and chromaticity data associated with the image are included, the luminance (brightness) and chromaticity (color) of the image to be displayed can be controlled. In the case of luminance data corresponding to luminance in a predetermined region including an observation object viewed through the light guide plate, a value of the luminance data may be set such that the higher a luminance value in the predetermined region including the observation object viewed through the light guide plate is, the higher a luminance value of an image is (in other words, such that the image is displayed brighter). Additionally, in the case of chromaticity data corresponding to chromaticity in a predetermined region including an observation object viewed through the light guide plate, a value of chromaticity data is set such that chromaticity in the predetermined region including the observation object viewed through the light guide plate and chromaticity of an image to be displayed have a substantially complementary color relation. Complementary colors represent a set of colors positioned opposite to each other on the color circle. The complementary colors are represented by, for example, red versus green, yellow versus violet, and blue versus orange. The complementary color also represents a color that decreases chroma by mixing a certain color with another color at an appropriate proportion, such as white in the case of light and black in the case of an article, but complementarity in a visual effect when colors are placed side by side differs from complementarity when colors are mixed. The complementary colors are also called contrast colors and opposite colors. However, the opposite colors directly represent colors opposing to each other, whereas complementary colors represent a range slightly broader. A color combination of complementary colors brings a synergy effect in which one of two colors enhances the other color, and such an effect is called complementary color harmony.

The display device of the present disclosure including the above-described various preferable modes and configurations can be applied to a display device in the adjustment method for a display device of the present disclosure.

For example, a head mounted display (HMD) can include the display device of the present disclosure. Additionally, this can reduce the weight and a size of the display device and can remarkably reduce discomfort at the time of wearing the display device, and further can reduce a manufacturing cost. Alternatively, the display device of the present disclosure can also be used as a stereoscopic display device. In this case, a polarization plate or a polarization film may be detachably attached to the light guide plate, or a polarization plate or a polarization film may be pasted onto the light guide plate, as necessary. [Example 1]

Figure 4:
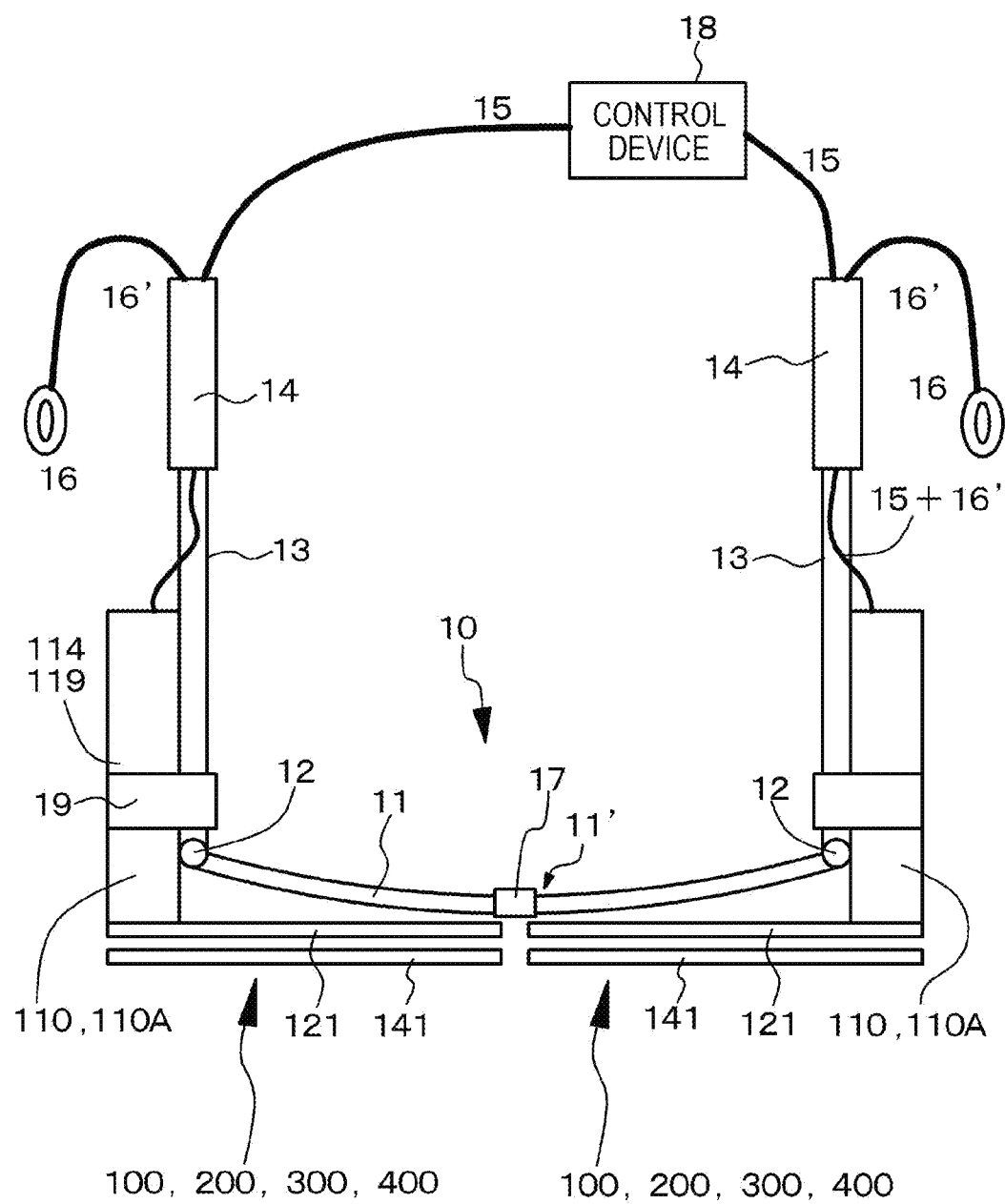
FIG. 4 is a schematic top view of the display device of Example 1.
Figure 5:
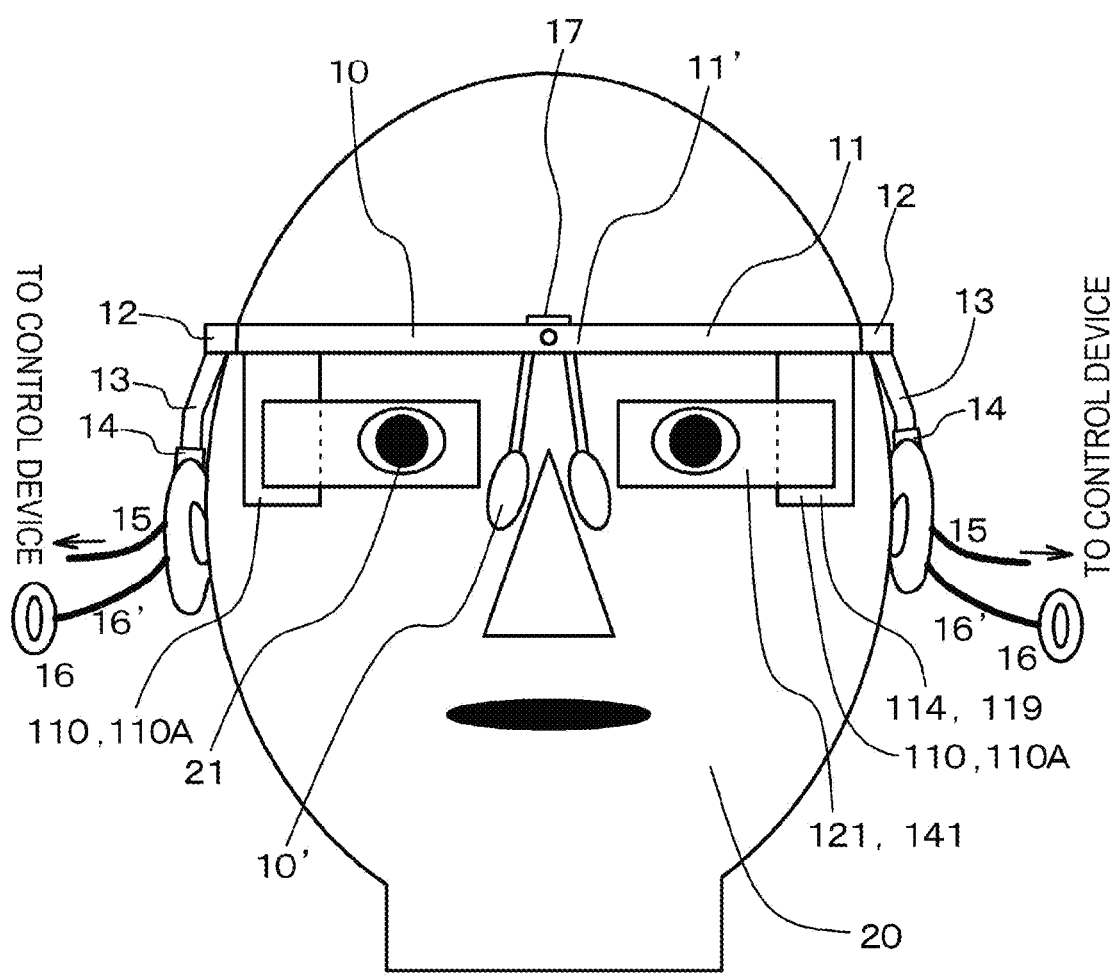
FIG. 5 is a schematic front view of the display device of Example 1.
Figure 6A:
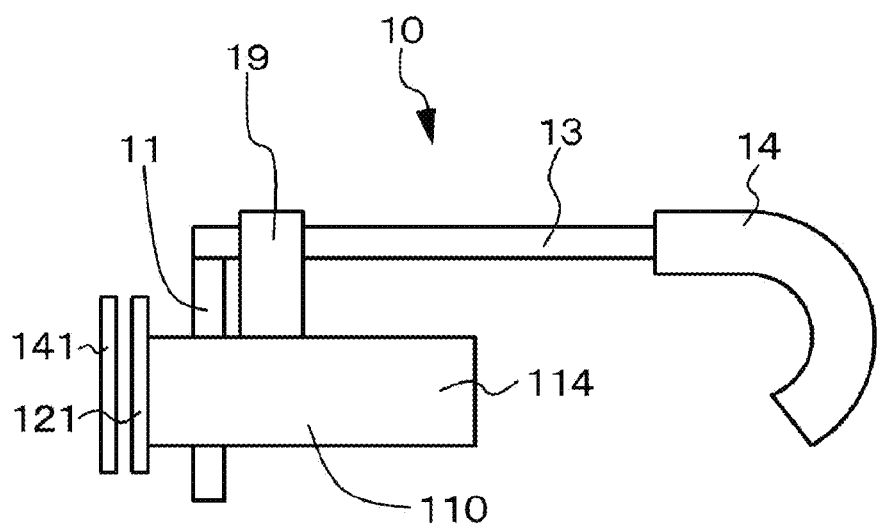
FIGS. 6A and 6B are respectively a schematic side view of the display device of Example 1 and a schematic enlarged cross-sectional view illustrating a part of a reflective volume hologram diffraction grating in the display device of Example 1.
Figure 6B:
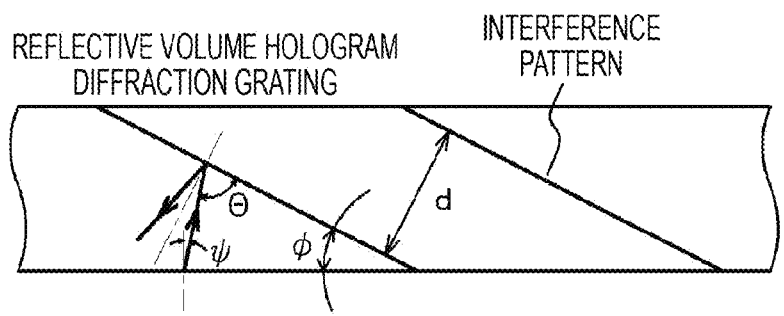
Figure 7:
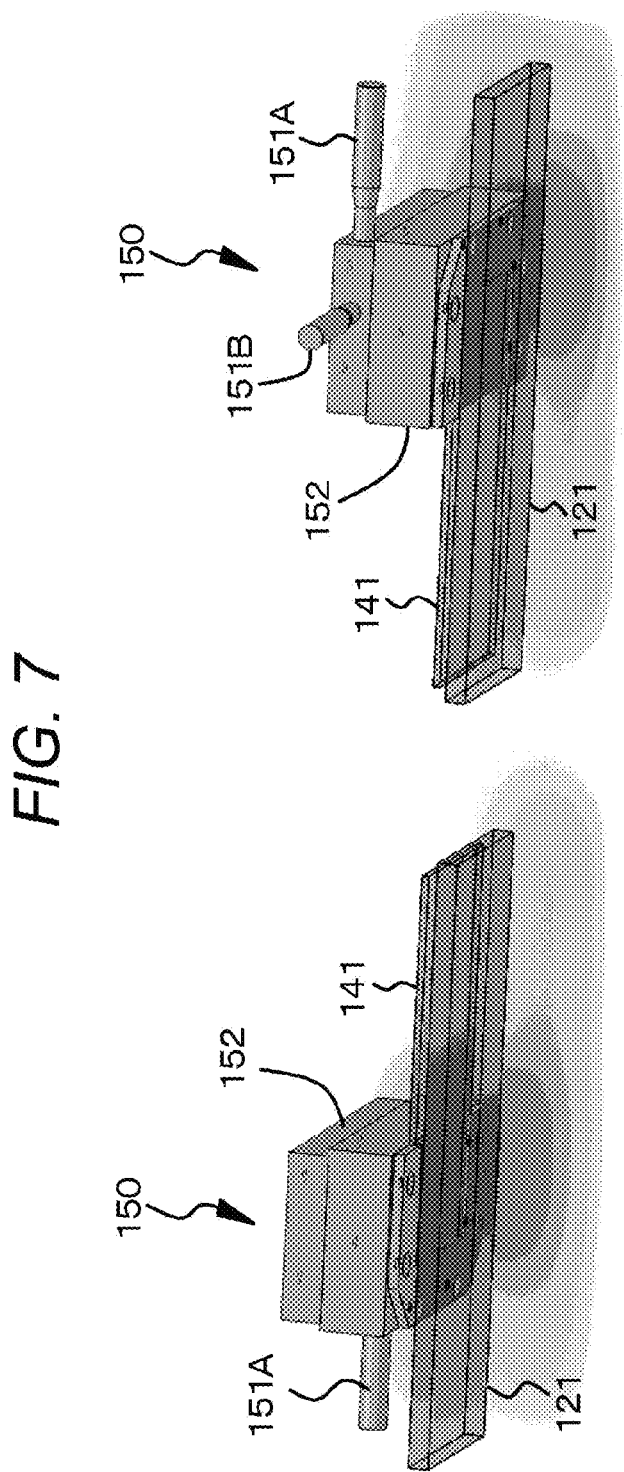
FIG. 7 is a schematic transparent perspective view of the light guide plate, the support substrate, and the like of Example 1.

Example 1 relates to an image display device of the present disclosure, a display device of the present disclosure (specifically, a head mounted display, HMD), and an adjustment method for the display device of the present disclosure. FIG. 1 illustrates a conceptual diagram of the image display device of Example 1, FIG. 4 illustrates a schematic top view of the display device of Example 1, FIG. 5 is a schematic front view, and FIG. 6A is a schematic side view thereof. Additionally, FIG. 6B is a schematic enlarged cross-sectional view illustrating a part of a reflective volume hologram diffraction grating in the display device of Example 1. Furthermore, FIG. 7 is a schematic transparent perspective view of a light guide plate, a support substrate, and the like of Example 1. In an image display device of a display device of Example 2, the image forming device includes an image forming device of the first configuration.

Each of image display devices 100, 200, 300, and 400 of Example 1 and Examples 2 to 10 described later includes:
an image forming devices 110 or 110A;
a light guide plate 121;
a support substrate (support plate) 141 arranged apart from the light guide plate 121;
first deflection units 131 or 133 attached to the light guide plate 121;
a second deflection unit 132 attached to the light guide plate 121; and
an optical member 142 attached to the support substrate 141 in a manner facing the second deflection unit 132. Additionally,
light from the image forming device 110 or 110A is deflected (or reflected) at the first deflection unit 131 or 133, propagated through the inside of the light guide plate 121 by total reflection, deflected at the second deflection unit 132, and incident on the optical member 142,
the optical member 142 emits the incident light toward a pupil 21 of an observer 20, and
further provided is a movement device 150 that moves the support substrate 141 with respect to the light guide plate 121 in an X direction or in the X direction and a Y direction in order to change a relative positional relation between the second deflection unit 132 and the optical member 142 when an axial line direction of the light guide plate 121 is defined as the X direction and a height direction of the light guide plate 121 is defined as the Y direction. Note that a direction orthogonal to the X direction and the Y direction is defined as a Z direction. Since a portion corresponding to light passing through the second deflection unit 132 does not satisfy diffraction conditions at the second deflection unit 132, the light is not diffracted and reflected at the second deflection unit 132 but incident on the pupil 21 of the observer 20.

Then, the support substrate 141 is moved with respect to the light guide plate 121 in the X direction or in the X direction and the Y direction by movement of the support substrate 141, and the optical member 142 emits the incident light toward the pupil 21 of the observer 20.

For example, each of the image forming devices 110 and 110A displays an image (virtual image) of a single color (for example, green). A system including the light guide plate 121, second deflection unit 132, optical member 142, and support substrate 141 is a semi-transparent type (see-through type).

More specifically, each of the display devices of Example 1 and Examples 2 to 10 described later is a head mounted display (HMD) and includes:

(A) a frame 10 (e.g., eyeglasses type frame 10) to be mounted on a head of the observer 20; and (B) an image display device attached to the frame 10. Additionally, the image display device includes the image display device 100, 200, 300, or 400 described above. Meanwhile, the display devices of Example 1 and Examples 2 to 10 described later are specifically described as the binocular type including two image display devices, but may also be the monocular type including one image display device. Each image display device 100, 200, 300, or 400 may be attached to the frame 10 in a fixed manner or detachably attached thereto. The display device is a display device of a direct drawing type that directly draws an image on the pupil 21 of the observer 20.

Additionally, the adjustment method for the display device of Example 1 is an adjustment method for the display devices of Example 1 and Examples 2 to 10 described later, and the method includes: deflecting light from the image forming device 110 or 110A at the first deflection unit 131 or 133, propagating the light inside the light guide plate 121 by total reflection, deflecting the light at the second deflection unit 132, making the light incident on the optical member 142, and causing light emitted from the optical member 142 to be incident on a pupil 21 of an observer 20 by moving the support substrate 141 with respect to the light guide plate 121 in the X direction or in the X direction and Y direction by using the movement device 150.

The light guide plate 121 includes: a first surface 122 on which light from the image forming device 110 or 110A is incident; and a second surface 123 facing the first surface 122. In other words, the light guide plate 121 including optical glass or plastic material includes two parallel surfaces (first surface 122 and second surface 123) extending parallel to a light propagation direction (X direction) by internal total reflection of the light guide plate 121. The first surface 122 and the second surface 123 face each other. Additionally, the first deflection unit 131 is arranged (specifically, pasted) on the second surface 123 of the light guide plate 121, and the second deflection unit 132 is arranged (specifically, pasted) on the first surface 122 of the light guide plate 121. Furthermore, the support substrate 141 is arranged apart from the light guide plate 121 in a manner facing a second surface 123 of the light guide plate 121, and the optical member 142 is arranged (specifically, pasted) on a first surface 141A of the support substrate 141 facing the light guide plate 121.

The first deflection unit (first diffraction grating member) 131 includes a hologram diffraction grating, specifically, a reflective volume hologram diffraction grating, and the second deflection unit (second diffraction grating member) 132 also includes of a hologram diffraction grating, specifically, a reflective volume hologram diffraction grating. A first interference pattern is formed inside the hologram diffraction grating constituting the first deflection unit 131, and a second interference pattern is formed inside the hologram diffraction grating constituting the second deflection unit 132. Additionally, the optical member 142 includes a hologram lens and has positive optical power.

The first deflection unit 131 diffracts and reflects the parallel light incident on the light guide plate 121 from the second surface 123 so as to be totally reflected inside the light guide plate 121. The second deflection unit 132 diffracts and reflects the light propagated inside the light guide plate 121 by total reflection, and guides the light to the optical member 142. A virtual image forming region in the light guide plate 121 includes the optical member 142 and the second deflection unit 132. Axial lines of the first deflection unit 131 and second deflection unit 132 are parallel to the X direction, and a normal thereof is parallel to the Z direction. In each reflective volume hologram diffraction grating including a photopolymer material, an interference pattern corresponding to one kind of wavelength band (or wavelength) is formed and manufactured by a conventional method. A pitch of the interference pattern formed on the reflective volume hologram diffraction grating is constant, and the interference pattern is linear and parallel to the Y direction.

Here, in the image display device of Example 1, the number of times of total reflection inside the light guide plate 121 for the light propagated inside the light guide plate 121 by total reflection is not changed regardless of movement of the support substrate 141. Additionally, the number of times of total reflection (the number of times the light deflected at the first deflection unit 131 collides with an inner surface of the light guide plate 121 before colliding with the second deflection unit 132) is three times in the illustrated example.

FIG. 6B illustrates the schematic partial sectional view in which a part of the reflective volume hologram diffraction grating is enlarged. In the reflective volume hologram diffraction grating, an interference pattern having an inclination angle (slant angle) $\varphi$ is formed. Here, the inclination angle $\varphi$ represents an angle formed between a surface of the reflective volume hologram diffraction grating and the interference pattern. The interference pattern is formed from the inside to the surface of the reflective volume hologram diffraction grating. The interference pattern satisfies the Bragg condition. Here, the Bragg condition represents a condition that satisfies the following Expression (A). In Expression (A), m represents a positive integer, Λ represents a wavelength, d represents a pitch on a grating surface (distance in normal direction on virtual plane including interference pattern), and e represents a complementary angle at which light is incident on the interference patterns. Additionally, a relation between the $\Theta$, inclination angle $\varphi$, and an incidence angle $\psi$ in a case where light enters a diffraction grating member at the incidence angle $\psi$ is as expressed in Expression (B).

$$m \cdot \lambda = 2 \cdot d \cdot \sin(\Theta) \tag{A}$$

$$\Theta = 90° - (\varphi + \psi) \tag{B}$$

In Example 1, the image forming device 110 includes the image forming device of the first configuration, and specifically includes a light source 111 and scanning unit 112 that scans light emitted from the light source 111 to form an image. More specifically, the image forming device 110 includes a laser light source 111 and a MEMS mirror 112. The light emitted from the MEMS mirror 112 passes through a lens system 113 and is incident on the light guide plate 121. Specifically, the laser light source 111 includes a light-emitting element that emits green light. Furthermore, the light emitted from the light source 111 is converted into parallel light by a lens not illustrated and subjected to horizontal scanning and vertical scanning by the scanning unit 112 including the MEMS mirror capable of freely rotating a micromirror in two-dimensional directions and two-dimensionally scanning the incident parallel light, and a kind of a two-dimensional image is formed, and then virtual pixels (e.g., 640×480) are formed. Then, the light from the virtual pixels (scanning unit 112 corresponding to an image emission unit) passes through the lens system 113 having positive optical power, and a light flux converted into the parallel light is incident on the light guide plate 121. Note that the entire image forming device 110 is housed inside a casing 114.

The frame 10 includes a front portion 11 arranged in front of the observer 20, two temple portions 13 pivotably attached to both ends of the front portion 11 via hinges 12, and temple tip portions (also called tip cells, earmuffs, and ear pads) 14 attached to tip portions of the respective temple portions 13. Also, a nose pad 10' is attached. In other words, an assembly of the frame 10 and the nose pad 10' basically has a structure substantially same as that of ordinary eyeglasses. Additionally, each casing 114 is attached to each temple portion 13 by an attachment member 19. The frame 10 is manufactured of a metal or plastic. Note that each casing 114 may be detachably attached to each temple portion 13 by an attachment member 19.

Additionally, for an observer who owns and wears eyeglasses, each casing 114 may be detachably attached, by the attachment member 19, to each temple portion 13 of the frame 10 of the eyeglasses owned by the observer. Each casing 114 may be attached to an outer side of the temple portion 13 or may be attached to an inner side of the temple portion 13. Alternatively, light guide plate 121 may be fitted in a rim provided in the front portion 11.

Furthermore, wiring (signal line, power supply lines, and the like) 15 extending from one image forming device 110 or 110A extends from a distal end portion of the temple tip portion 14 to the outside and is connected to a control device (control circuit, control unit) 18 via the temple portion 13 and the inside of the temple tip portion 14. Furthermore, each image forming device 110 or 110A includes a headphone portion 16, and headphone portion wiring 16' extending from each image forming device 110 or 110A extends to the headphone portion 16 from the distal end portion of the temple tip portion 14 via the temple portion 13 and the inside of the temple tip portion 14. More specifically, the headphone portion wiring 16' extends from the tip end portion of the temple tip portion 14 to the headphone portion 16 in a manner passing around the back side of an auricle (ear conch). With this configuration, the display device with orderly arrangement can be achieved without giving an impression that the headphone portion 16 and the headphone portion wiring 16' are arranged in a disordered manner.

As described above, the wiring (signal line, power supply line, and the like) 15 is connected to the control device (control circuit) 18, and processing to display an image is performed in the control device 18. The control device 18 can include a known circuit.

A camera 17 including a solid-state imaging device including a CCD or a CMOS sensor and a lens (not illustrated) is attached to a center portion 11' of the front portion 11 by an appropriate attachment member as necessary. A signal from the camera 17 is transmitted to the control device (control circuit) 18 via wiring (not illustrated) extending from the camera 17.

Additionally, in each of the image display devices 100, 200, 300, and 400 of Example 1 and Examples 2 to 10 described later, the support substrate 141 is moved by the movement device 150 with respect to the light guide plate 121 in the X direction or in the X direction and the Y direction in order to change a relative positional relation between the deflection unit 132 and the optical member 142 as described above. FIG. 7 is a schematic transparent perspective view of the light guide plate 121, the support substrate 141, and the like of Example 1, in which the view on the left hand side of FIG. 7 illustrates the movement device 150 to move the support substrate 141 in the X direction and the view on the right hand side of FIG. 7 illustrates the movement device 150 to move the support substrate 141 in the X direction and the Y direction. The movement device 150 includes a rack-and-pinion including a pinion gear portion 151 and a rack gear portion 153. One end of the support substrate 141 is supported by, for example, a guide portion 154 attached to the frame 10 or the light guide plate 121. Note that the one end of the support substrate 141 is supported by the guide portion 154, but the support substrate 141 can be freely moved in the X direction and the Y direction. Additionally, the rack gear portion 153 is attached to the other end (temple portion side) of the support substrate 141. Furthermore, the pinion gear portion 151 is attached to the support member 152, and the support member 152 is attached to the casing 114 or 119 of the image forming device 110 or 110A, for example. Additionally, when the observer 20 rotates the pinion gear portion 151 (actually rotates knobs 151A and 151B attached to the pinion gear portion 151), the rack gear portion 153 screwed with the pinion gear portion 151 is moved, and the support substrate 141 can be moved in the X direction or in the X direction and the Y direction. Alternatively, the movement device 150 may include a piezoelectric element, a voice coil motor, or an ultrasonic motor, the piezoelectric element, voice coil motor, or ultrasonic motor may be arranged between the support substrate 141 and the support member 152, and the support member 152 may be attached to the frame 10 or the casing 113 or 119 of the image forming device 110 or 110A, for example. Alternatively, coarse motion (coarse movement) of the support substrate 141 may be performed by using the rack-and-pinion, and micro motion (micro movement) of the support substrate 141 is performed by using the piezoelectric element, voice coil motor, or ultrasonic motor.

When the observer 20 wears the display device, in other words, when the display device of Example 1 is used, assume that a normal line $L_2$ (indicated by alternate long and two short dashes line) of the light guide plate 121 passing through a center of a light incidence region of an eyeball 21 (specifically, a cornea) is displaced to a temple portion side with respect to an optical line $L_1$ (indicated by alternate long and short dash line) of the optical member 142. This state is illustrated in the conceptual diagram of the image display device of FIG. 2. In this state, an image formed by the image forming device 110 is not incident on the pupil 21 of the observer 20. Alternatively, a displacement occurs in the incident state. In other words, the image formed by the image forming device 110 does not form an image on a retina of the observer 20, or is displaced toward the nose side in the imaging state. Stated differently, the image formed in the image forming device 110 does not reach the pupil 21 of the observer 20 in the worst case. Alternatively, even though the image formed by the image forming device 110 reaches the pupil 21 of the observer 20, the image is in a state of vignetting or in a dark state.

Figure 3:
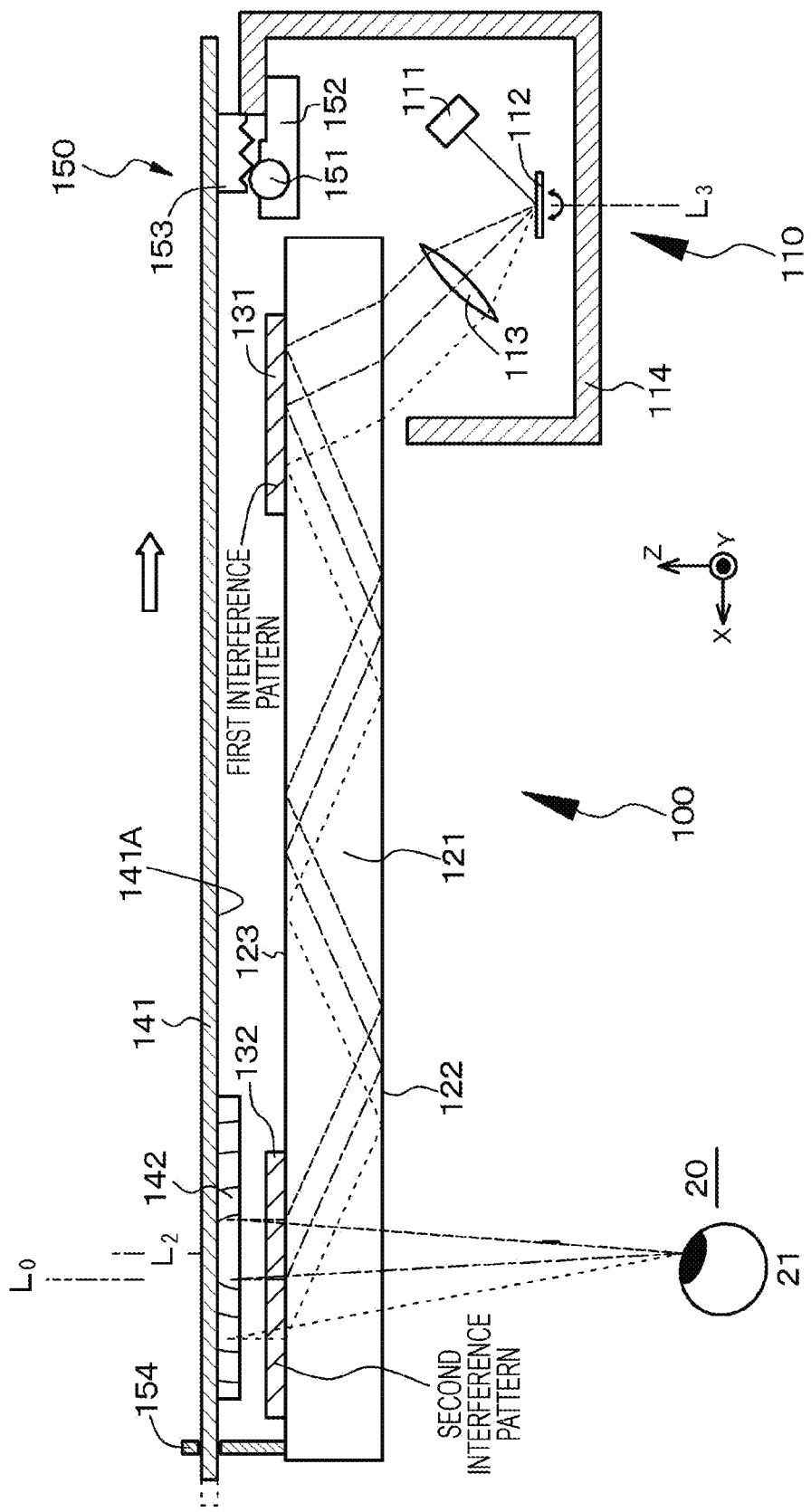
FIG. 3 is a conceptual diagram of an image display device, illustrating a state after a support substrate is moved with respect to a light guide plate in the display device of Example 1.

Here, light emitted from the optical member 142 is made incident on the pupil 21 of the observer 20 by the observer 20 operating the movement device 150, in other words, by moving the support substrate 141 with respect to the light guide plate 121 in the X direction or in the X direction and the Y direction by the movement device 150 on the basis of a command of the observer 20 (adjustment by the observer 20). Specifically, the support substrate 141 is moved with respect to the light guide plate 121 in the X direction or in the X direction and the Y direction by the movement device 150 while displaying a test pattern on the image forming device 110, and more specifically, the support substrate 141 is moved toward the temple portion side in the illustrated example. Note that the end portion of the support substrate 141 before movement is indicated by a dotted line in FIG. 3. Then, with this movement, light intensity of an image (test pattern) emitted from the optical member 142 and incident on the pupil 21 of the observer 20 is optimized. Specifically, the light intensity of an image (test pattern) incident on the pupil 21 of the observer 20 is maximized, for example. The conceptual diagram of FIG. 3 illustrates a state after the support substrate 141 is moved with respect to the light guide plate 121 in the display device of Example 1. In the illustrated example, in a case where the support substrate 141 is moved in the X direction, a position of the light emitted from the light guide plate 121 toward the optical member 142 is not changed on the second surface 123 of the light guide plate 121, but since the support substrate 141 is moved in the X direction toward the temple portion side with respect to the light guide plate 121, an image can be surely made incident on the pupil 21 of the observer 20 although the image is displayed, in the pupil 21 of the observer 20, in a direction slightly on the nose side. Note that, in FIG. 3, $L_0$ indicates the optical axis (i.e., $L_1$) of the optical member 142 before moving the support substrate 141 toward the temple portion side. Here, in the example Illustrated in FIG. 1, a light ray corresponding to a center of the image is emitted vertically from the light guide plate 121 and reaches the pupil of the observer 20, but in the example illustrated in FIG. 3, a light ray corresponding to the center of the image is emitted from the light guide plate 121 toward the temple portion side in a slightly inclined manner and reaches the pupil of the observer 20.

In the image display device of Example 1, a change in state in which the observer wears (is wearing) the display device can be easily handled because of further including the movement device that moves the support substrate with respect to the light guide plate in order to change a relative positional relation between the second deflection unit and the optical member.

Note that the movement device 150 can also move the support substrate 141 in the Z direction. Specifically, a guide portion (not illustrated) is provided such that the support substrate 141 can be moved in the Z direction, and the support substrate 141 may be moved in the Z direction by using, for example, a rack-and-pinion (not illustrated). By thus moving the support substrate 141 in the Z direction, a convergence point of an image formed by the image forming device 110 can be more surely made to coincide with the pupil 21 of the observer 20, and an image without vignetting can be obtained.

Figure 6C:
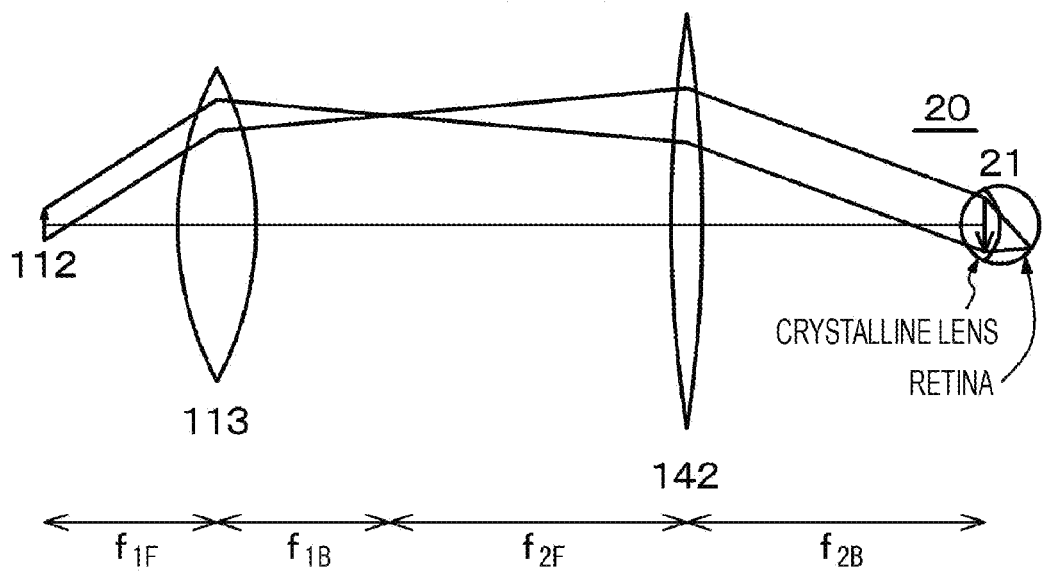
FIG. 6C is a conceptual diagram to describe an optical system in a modified example of the image display device of Example 1.

As illustrated in FIG. 6C that is the conceptual diagram to describe an optical system of the image display device of Example 1, light emitted from the light source 111 at a certain moment (for example, corresponding to a size of one pixel or one subpixel) is converted into parallel light as described above, and the parallel light is subjected to scanning by the scanning unit 112 and incident on the lens system 113 as the parallel light. The light emitted from the lens system 113 is once formed as an image at a rear focal point of the lens system 113 (that is also a front focal point of the optical member 142) and is incident on the optical member 142. The light emitted from the optical member 142 is changed into the parallel light and reaches the pupil 21 (specifically, crystalline lens) of the observer 20 as the parallel light. Then, the light having passing through the crystalline lens is finally formed as an image on the retina of the pupil 21 of the observer 20.

Example 2

Figure 8:
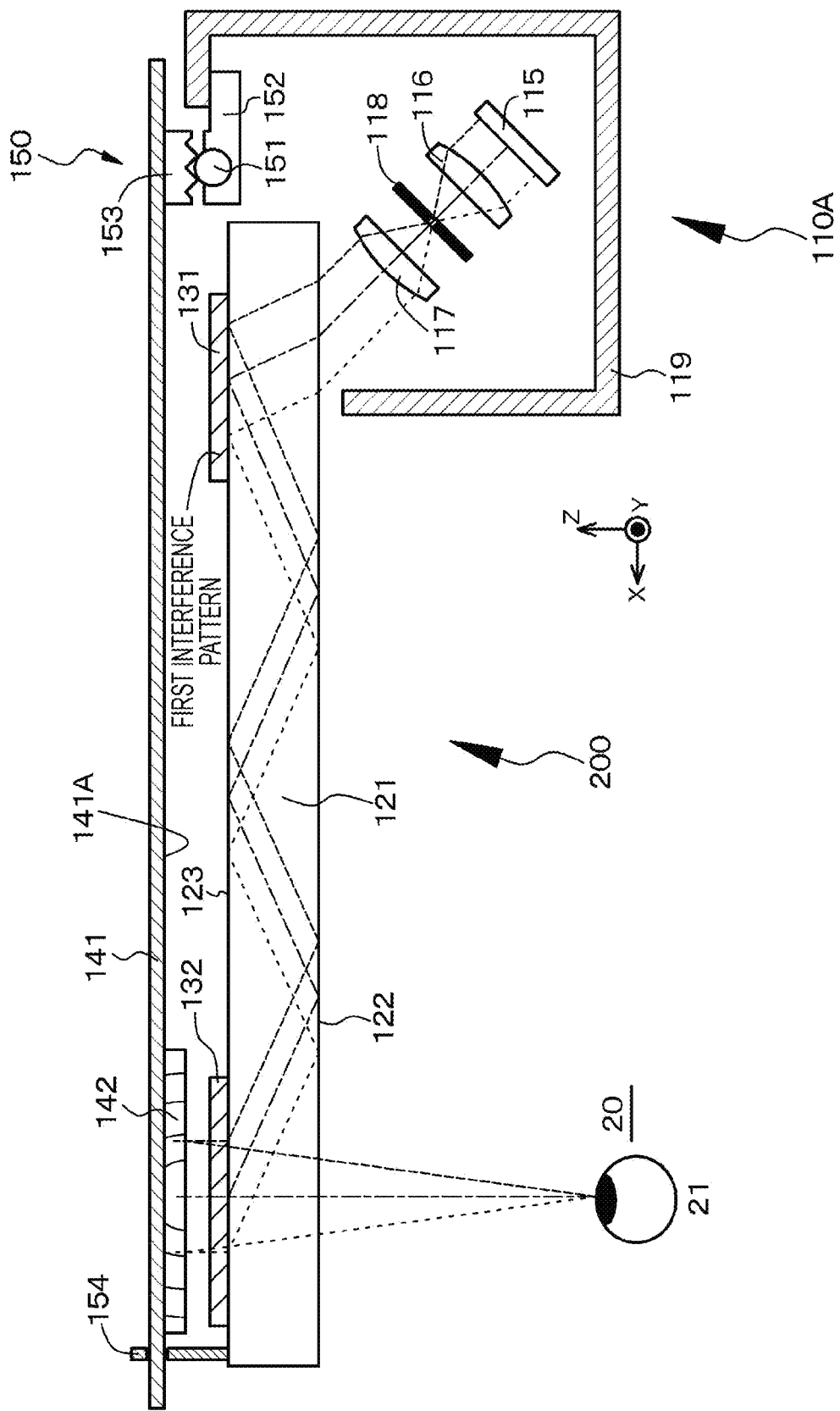
FIG. 8 is a conceptual diagram of an image display device of Example 2.

Example 2 is a modification of Example 1. As illustrated in a conceptual diagram of FIG. 8, the image forming device 110A includes an image forming device of the second configuration in the image display device 200 of the display device of Example 2.

Specifically, the image forming device 110A includes a spatial light modulation device 115 including an organic EL display device. An image emitted from the spatial light modulation device 115 passes through a first convex lens 116 constituting a lens system and further passes through a second convex lens 117 constituting the lens system, and is converted into parallel light, and then directed to the light guide plate 121. A front focal point $f_{2F}$ of the second convex lens 117 is positioned at a rear focal point $f_{1B}$ of the first convex lens 116. Additionally, an aperture 118 is arranged at the position of the rear focal point $f_{1B}$ of the first convex lens 116 (front focal point $f_{2F}$ of the second convex lens 117). The aperture 118 corresponds to an image emission unit. The entire image forming device 110A is housed inside the casing 119. The spatial light modulation device 115 includes a plurality of pixels (organic EL elements) arrayed in a two-dimensional matrix (e.g., 640×480).

Except for the above-described points, the display device of Example 2 can have a configuration and a structure similar to the configuration and structure of the display device of Example 1, and therefore, a detailed description thereof will be omitted.

Example 3

Figure 9:
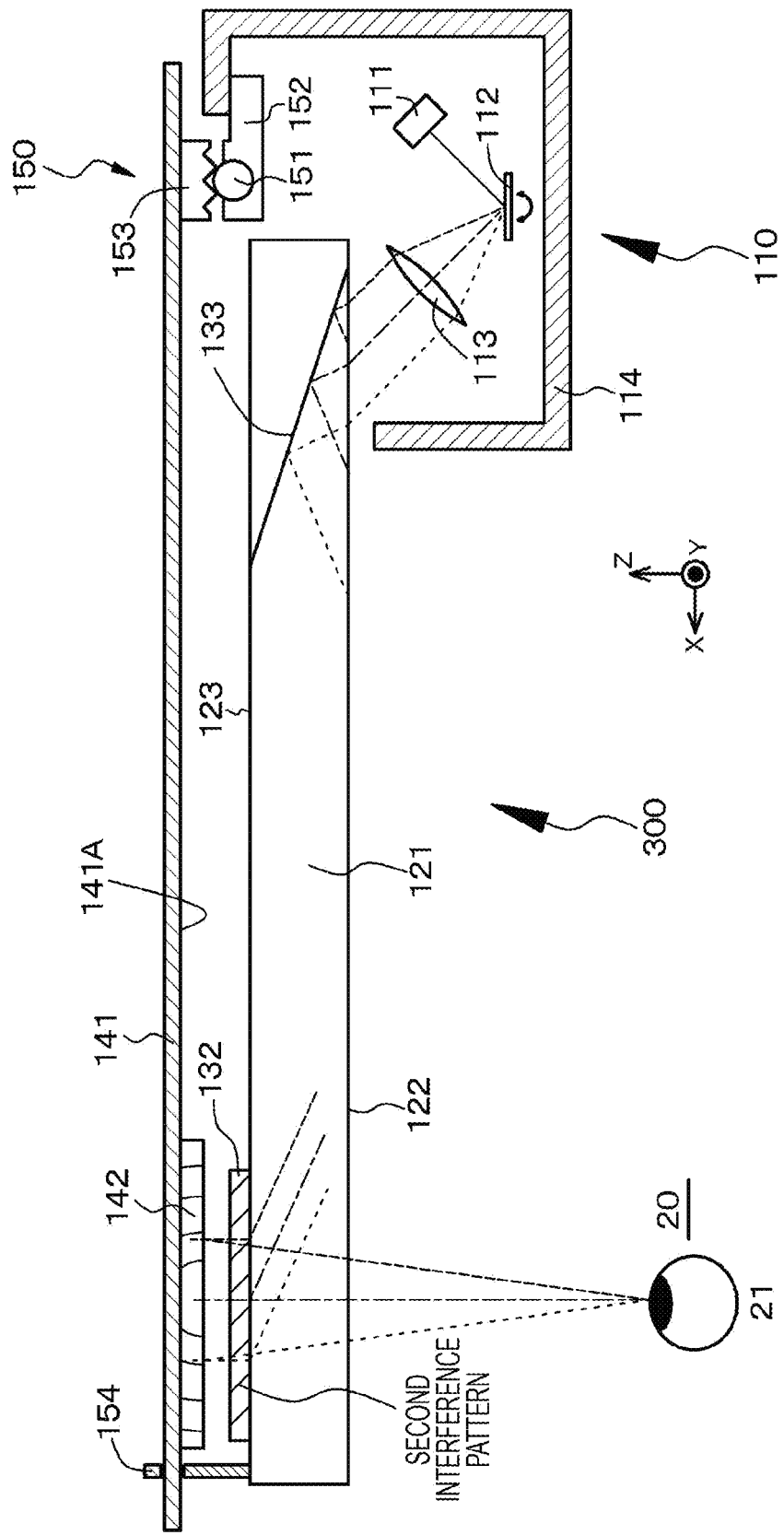
FIG. 9 is a conceptual diagram of an image display device of Example 3 (modification of Example 1).
Figure 10:
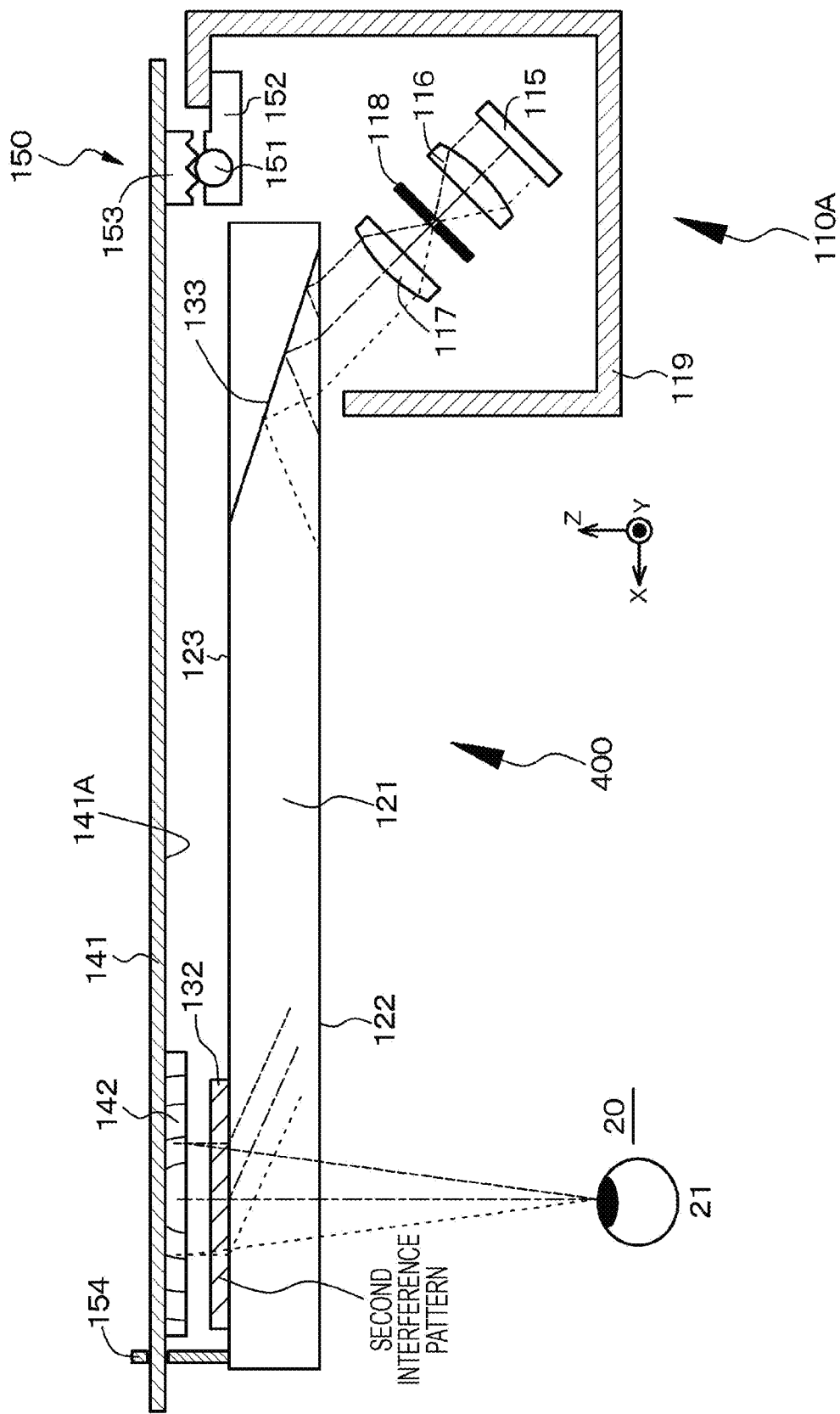
FIG. 10 is a conceptual diagram of the image display device of Example 3 (modification of Example 2).

Example 3 is a modification of Examples 1 to 2. In each of the image display devices 300 and 400 in the display device of Example 3, a configuration of the first deflection unit differs from those of Examples 1 to 2. As illustrated in conceptual diagrams in FIGS. 9 and 10, the first deflection unit 133 is arranged on the light guide plate 121 in each of the display devices 300 and 400 of Example 3. Specifically, the first deflection unit 133 is arranged inside the light guide plate 121. Additionally, the first deflection unit 133 reflects light incident on the light guide plate 121. In other words, the first deflection unit 133 functions as a reflection mirror. More specifically, the first deflection unit 133 provided inside the light guide plate 121 includes a light reflection film (a kind of mirror) that includes aluminum (Al) and reflects light incident on the light guide plate 121. In the first deflection unit 133, parallel light incident on the light guide plate 121 is reflected such that the parallel light incident on the light guide plate 121 is totally reflected inside the light guide plate 121.

The first deflection unit 133 may be formed by: cutting a portion of the light guide plate 121 where the first deflection unit 133 is to be provided so as to provide, in the light guide plate 121, an inclined surface where the first deflection unit 133 should be formed; depositing a light reflection film on the inclined surface by a vacuum evaporation process; and bonding the cutout portion of the portion of the light guide plate 121 to the first deflection unit 133.

Except for the above-described points, the display device of Example 3 can have a configuration and a structure similar to the configuration and structure in each of the display devices of Examples 1 and 2, and therefore, a detailed description thereof will be omitted.

Example 4

Example 4 is a modification of Examples 1 to 3 In Example 1, as illustrated in FIG. 3, when the support substrate 141 is moved with respect to the light guide plate 121, an image is displayed slightly toward the nose side at the pupil 21 of the observer 20. In this case, the image moving unit may be relatively move the image forming device 110 with respect to the light guide plate 121 in the X direction, in the X direction and the Y direction, or inside the XY plane. The image moving unit includes, for example, a support base and a device for movement (e.g., rack-and-pinion, piezoelectric element, voice coil motor, or ultrasonic motor) provided between the support base and the casing.

Figure 2:
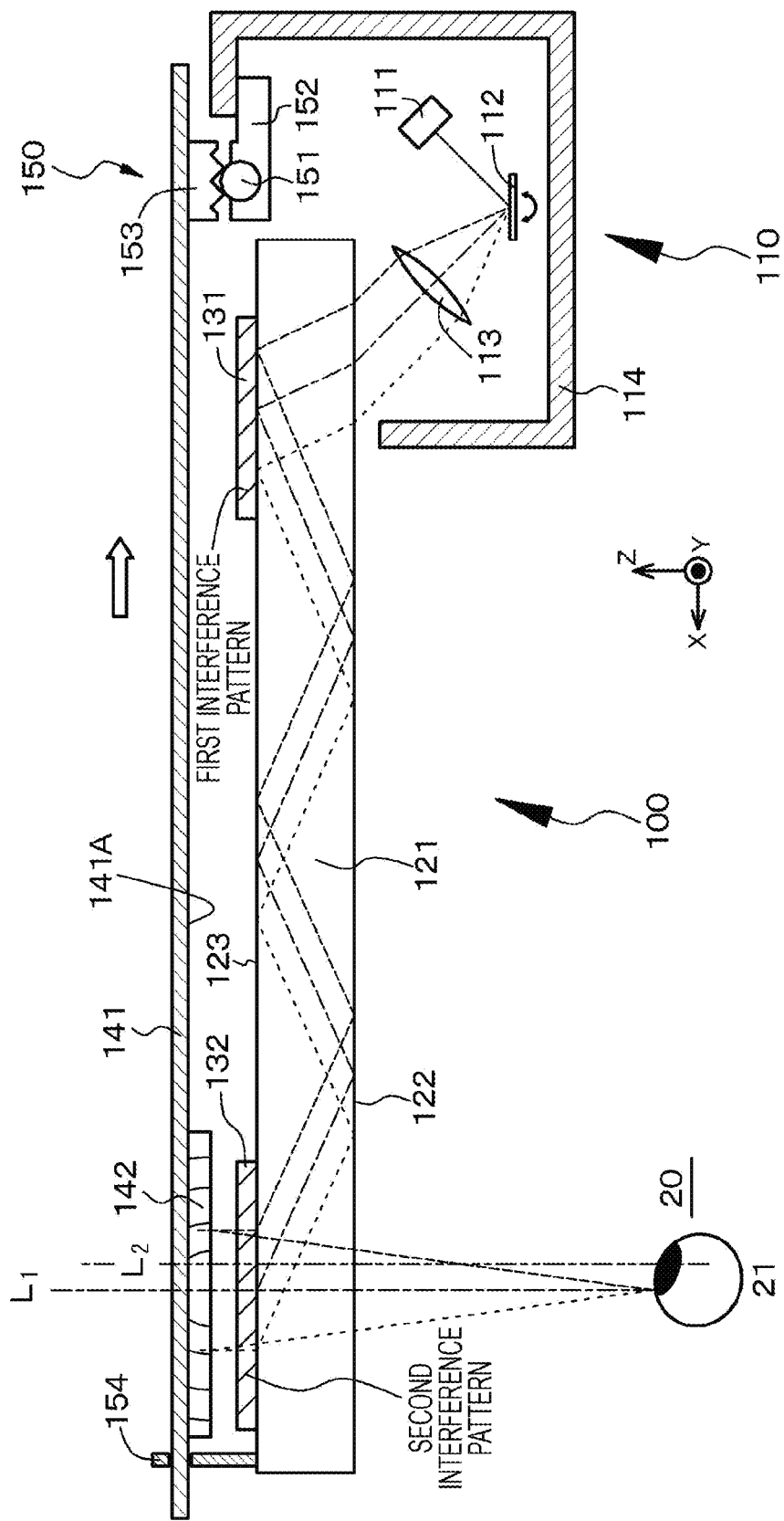
FIG. 2 is a conceptual diagram of an image display device when there is a deviation between an optical axis of an optical member and a visual axis of an eyeball in using the display device of Example 1.

Specifically, an entire portion including the light source 111, scanning unit 112, and lens system 113 arranged inside the casing 114 is placed on the support base (not illustrated), and the device for movement is provided between the support base and the casing 114, and the support base may be moved by correlating a moved amount of the support substrate 141 in the movement device 150 to a moved amount of the support base in the device for movement under the control of the control device 18. Specifically, the support base may be moved to a temple portion side in the examples illustrated in FIGS. 3 and 11. When a reference position of the support base before movement is defined as $L_3$ and a reference position of the support base after movement is defined as $L_4$, a displacement amount between the reference position $L_3$ and the reference position $L_4$ after movement illustrated in FIG. 11 coincides with a displacement amount between $L_1$ and $L_2$ as illustrated in FIG. 2. Here, in the example illustrated in FIG. 3, the light ray corresponding to the center of the image is emitted from the light guide plate 121 toward the temple portion in a slightly inclined manner and reaches the pupil of the observer 20, but in the example illustrated in FIG. 11, light ray corresponding to the center of the image is vertically emitted from the light guide plate 121 and reaches the pupil of the observer 20.

Furthermore, a convergence angle can be adjusted adjusting the reference position $L_3$ of the support base before movement and the reference position $L_4$ of the support base after movement in each of a right eye display device and a left eye display device, in other words, the convergence angle can be adjusted by simultaneously moving an incidence position on the first deflection unit 131 and an emission position from the second deflection unit 132 in order to adjust a relative display direction with respect to the pupil. Note that, not limited to adjustment of the convergence angle, the displacement amount between $L_3$ and $L_4$ can also be adjusted in order to arbitrarily adjust the display direction with respect to the pupil. In other words, when the displacement amount between $L_1$ and $L_2$ in FIG. 2 is made to coincide with the displacement amount between $L_3$ and $L_4$ in FIG. 3, there is no change in the display direction even in a case where a convergence point is moved in accordance with the position of the pupil 21 of the observer 20, whereas the display direction can be adjusted (convergence angle can be adjusted) by making a difference between the displacement amount between $L_1$ and $L_2$ in FIG. 2 and the displacement amount between $L_3$ and $L_4$ in FIG. 3.

Alternatively, the image moving unit may change an emission position of the light emitted from the image forming device 110. In this case, the image moving unit is included in the control device 18. Specifically, for example, horizontal scanning and vertical scanning are performed by the scanning unit 112 including the MENS mirror and a kind of two-dimensional image is formed, but the state of horizontal scanning and the state of vertical scanning are changed and the emission position of the light emitted from the image forming device 110 can be changed by controlling a swing angle range of the MEMS mirror by using the control device (image moving unit) 18. Alternatively, an image display position is controlled by controlling emission timing of light beams from the image forming device 110 by using the control device (image moving unit) 18 without changing the swing angle of the MEMS mirror, and as a result thereof, the emission position of the light emitted from the image forming device 110 can also be changed.

Example 5

Example 5 is a modification of Examples of 1 to 4. In the display device of Example 5, the movement device 150 moves the support substrate 141 on the basis of a position of an image of the pupil 21 of the observer 20 as illustrated in the conceptual diagram of FIG. 12. Alternatively, the support substrate 141 is moved by the movement device 150 on the basis of the position of the image of the pupil 21 of the observer 20. Specifically, an imaging device 160 that images an image of the pupil 21 of the observer 20 is further provided adjacent to the support substrate 141. By thus detecting the position of the pupil 21 of the observer 20, an image formed by the image forming device 110 can be more surely made incident on the pupil 21 of the observer 20. Specifically, the imaging device 160 may include, for example: a solid-state imaging device including a CCD or CMOS sensor; and a lens, and is attached to the support substrate 141, for example. Output of the imaging device 160, in other words, output related to the image of the pupil 21 of the observer 20 imaged by the imaging device 160 is transmitted to the control device (control circuit) 18. Then, image processing is performed in the control device 18, and a change amount of the position of the pupil 21 is determined. Specifically, a pupil position (pupil center position) is stored in the control device 18, and the stored pupil position and the pupil position (pupil center position) of the observer 20 detected by the imaging device 160 are compared, and in a case where a change amount of the pupil position (pupil center position) exceeds a predetermined value, the movement device 150 moves the support substrate 141 on the basis of the change amount of the position of the pupil 21 under the control of the control device 18. By thus detecting the position of the pupil 21 of the observer 20, the image formed by the image forming device 110 or 110A can be more surely made incident on the pupil 21 of the observer 20. In other words, the image formed by the image forming device 110 or 110A can be surely formed on the retina of the observer 20. Additionally, as described in Example 4, the image forming device 110 may be relatively moved by the image moving unit with respect to the light guide plate 121 in the X direction, in the X direction and the Y direction, or inside the XY plane on the basis of the change amount of the position of the pupil 21. Note that a new pupil position (pupil center position) may be stored in the control device 18.

The movement device 150 can move the support substrate 141 by: attaching a motor (not illustrated) to the pinion gear portion 151 of the rack-and-pinion constituting the movement device 150; and controlling actuation of the motor by using the control device (control circuit) 18. Alternatively, the movement device 150 can move the support substrate 141 by transmitting a control signal from the control device (control circuit) 18 to the piezoelectric element, voice coil motor, or ultrasonic motor constituting the movement device 150. Alternatively, coarse motion (coarse movement) of the support substrate 141 may be performed by using the rack-and-pinion, and micro motion (micro movement) of the support substrate 141 is performed by using the piezoelectric element, voice coil motor, or ultrasonic motor.

Except for the above-described points, the display device of Example 5 can have a configuration and a structure similar to the configuration and structure in each of the display devices of Examples 1 to 4, and therefore, a detailed description thereof will be omitted.

Example 6

Example 6 is a modification of the Examples 1 to 2 and Examples 4 to 5, and exhibits a modification in an arrangement state of the first deflection unit 131, second deflection unit 132, and optical member 142. However, the arrangement state of the first deflection unit 131, second deflection unit 132, and optical member 142 is not limited to these examples.

In Examples 1 to 5,
the first deflection unit 131 is arranged on the second surface 123 of the light guide plate 121,
the second deflection unit 132 is arranged on the second surface 123 of the light guide plate 121,
the support substrate 141 is arranged in a manner facing the second surface 123 of the light guide plate 121, and
the optical member 142 is arranged on the first surface 141A of the support substrate 141.

Figure 13A:
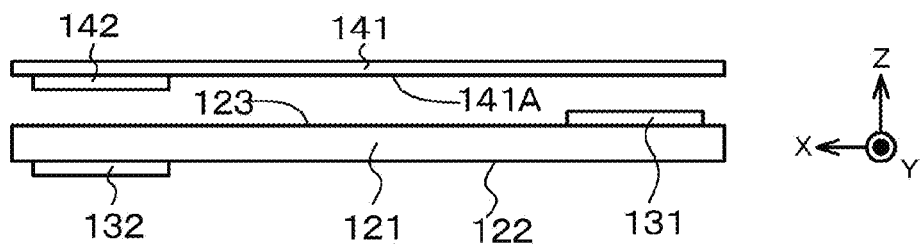
FIGS. 13A, 13B, 13C, and 13D are conceptual diagrams illustrating arrangement states of a first deflection unit, a second deflection unit, and an optical member in the image display device of Example 6.

On the other hand, as illustrated in FIG. 13A,
the first deflection unit 131 may be arranged on the second surface 123 of the light guide plate 121,
the second deflection unit 132 may be arranged on the first surface 122 of the light guide plate 121,
the support substrate 141 may be arranged in a manner facing the second surface 123 of the light guide plate 121, and
the optical member 142 may be arranged on the first surface 141A of the support substrate 141.

Figure 13B:
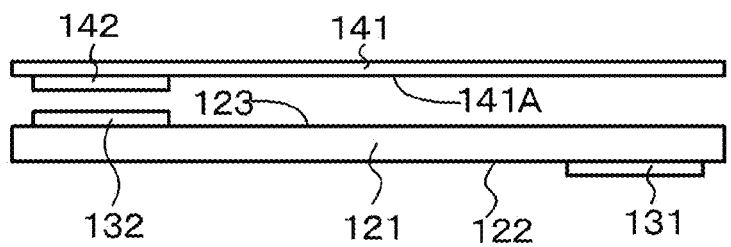

Alternatively, as illustrated in FIG. 13B,
the first deflection unit 131 may be arranged on the first surface 122 of the light guide plate 121,
the second deflection unit 132 may be arranged on the second surface 123 of the light guide plate 121,
the support substrate 141 may be arranged in a manner facing the second surface 123 of the light guide plate 121, and
the optical member 142 may be arranged on the first surface 141A of the support substrate 141.

Figure 13C:
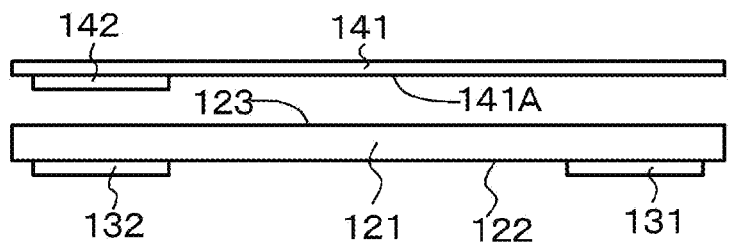

Alternatively, as illustrated in FIG. 13C,
the first deflection unit 131 may be arranged on the first surface 122 of the light guide plate 121,
the second deflection unit 132 may be arranged on the first surface 122 of the light guide plate 121,
the support substrate 141 may be arranged in a manner facing the second surface 123 of the light guide plate 121, and
the optical member 142 may be arranged on the first surface 141A of the support substrate 141.

Figure 13D:
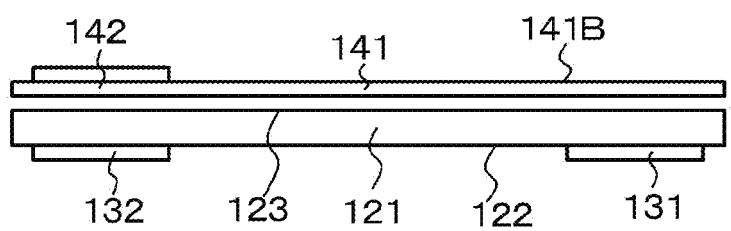

Alternatively, as illustrated in FIG. 13D,
the first deflection unit 131 may be arranged on the first surface 122 of the light guide plate 121,
the second deflection unit 132 may be arranged on the first surface 122 of the light guide plate 121,
the support substrate 141 may be arranged in a manner facing the second surface 123 of the light guide plate 121, and
the optical member 142 may be arranged on the second surface 141B of the support substrate 141. Since the optical member 142 is arranged on the second surface 141B of the support substrate 141, a distance between the light guide plate 121 and the support substrate 141 can be shortened, and an entire thickness can be reduced.

Figure 14A:
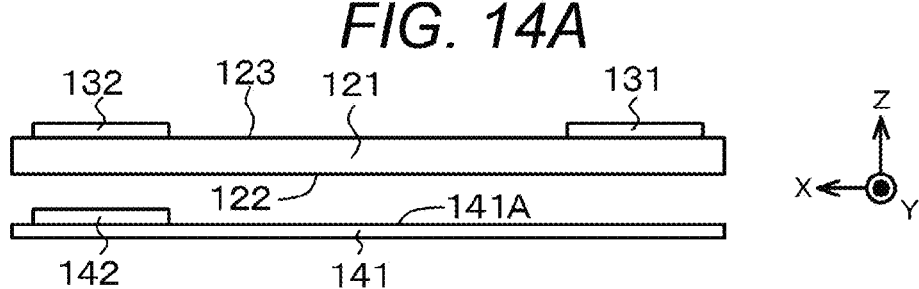
FIGS. 14A, 14B, 14C, 14D, and 14E are conceptual diagrams illustrating arrangement states of the first deflection unit, the second deflection unit, and the optical member in the image display device of Example 6.

Alternatively, as illustrated in FIG. 14A,
the first deflection unit 131 may be arranged on the second surface 123 of the light guide plate 121,
the second deflection unit 132 may be arranged on the second surface 123 of the light guide plate 121,
the support substrate 141 may be arranged in a manner facing the first surface 122 of the light guide plate 121, and
the optical member 142 may be arranged on the first surface 141A of the support substrate 141. Since the support substrate 141 is arranged in a manner facing the first surface 122 of the light guide plate 121, light directed from the second deflection unit 132 toward the optical member 142 can be prevented from being leaked to the outside.

Figure 14B:
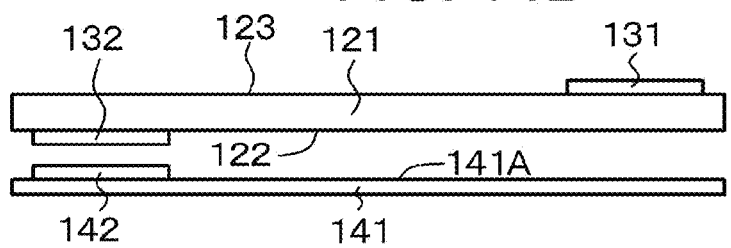

Alternatively, as illustrated in FIG. 14B,
the first deflection unit 131 may be arranged on the second surface 123 of the light guide plate 121,
the second deflection unit 132 may be arranged on the first surface 122 of the light guide plate 121,
the support substrate 141 may be arranged in a manner facing the first surface 122 of the light guide plate 121, and
the optical member 142 may be arranged on the first surface 141A of the support substrate 141.

Figure 14C:
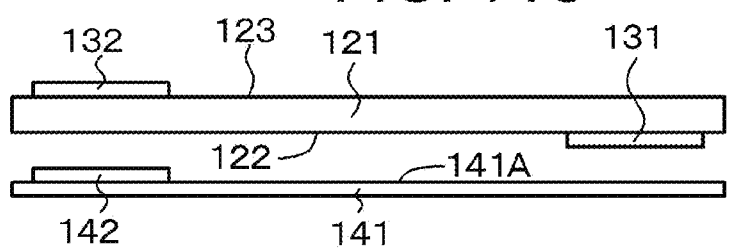

Alternatively, as illustrated in FIG. 14C,
the first deflection unit 131 may be arranged on the first surface 122 of the light guide plate 121,
the second deflection unit 132 may be arranged on the second surface 123 of the light guide plate 121,
the support substrate 141 may be arranged in a manner facing the first surface 122 of the light guide plate 121, and
the optical member 142 may be arranged on the first surface 141A of the support substrate 141.

Figure 14D:
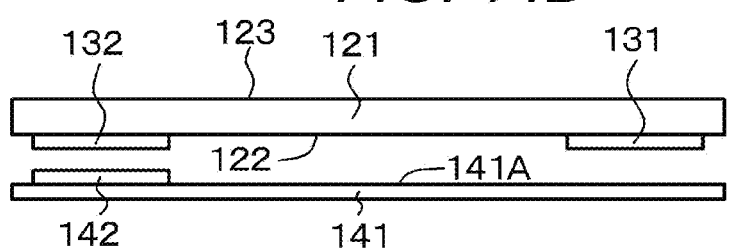

Alternatively, as illustrated in FIG. 14D,
the first deflection unit 131 may be arranged on the first surface 122 of the light guide plate 121,
the second deflection unit 132 may be arranged on the first surface 122 of the light guide plate 121,
the support substrate 141 may be arranged in a manner facing the first surface 122 of the light guide plate 121, and
the optical member 142 may be arranged on the first surface 141A of the support substrate 141.

Figure 14E:
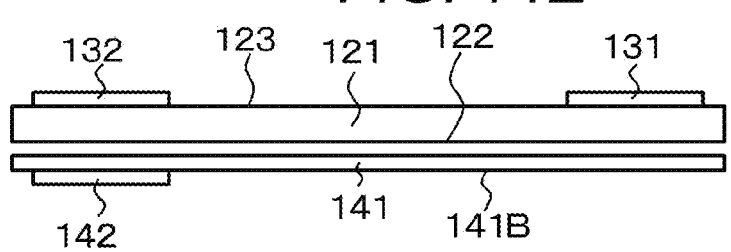

Alternatively, as illustrated in FIG. 14E,
the first deflection unit 131 may be arranged on the second surface 123 of the light guide plate 121, the second deflection unit 132 may be arranged on the second surface 123 of the light guide plate 121, the support substrate 141 may be arranged in a manner facing the first surface 122 of the light guide plate 121, and the optical member 142 may be arranged on the second surface 141B of the support substrate 141. Since the optical member 142 is arranged on the second surface 141B of the support substrate 141, the distance between the light guide plate 121 and the support substrate 141 can be shortened, and the entire thickness can be reduced.

Example 7

Figure 15:
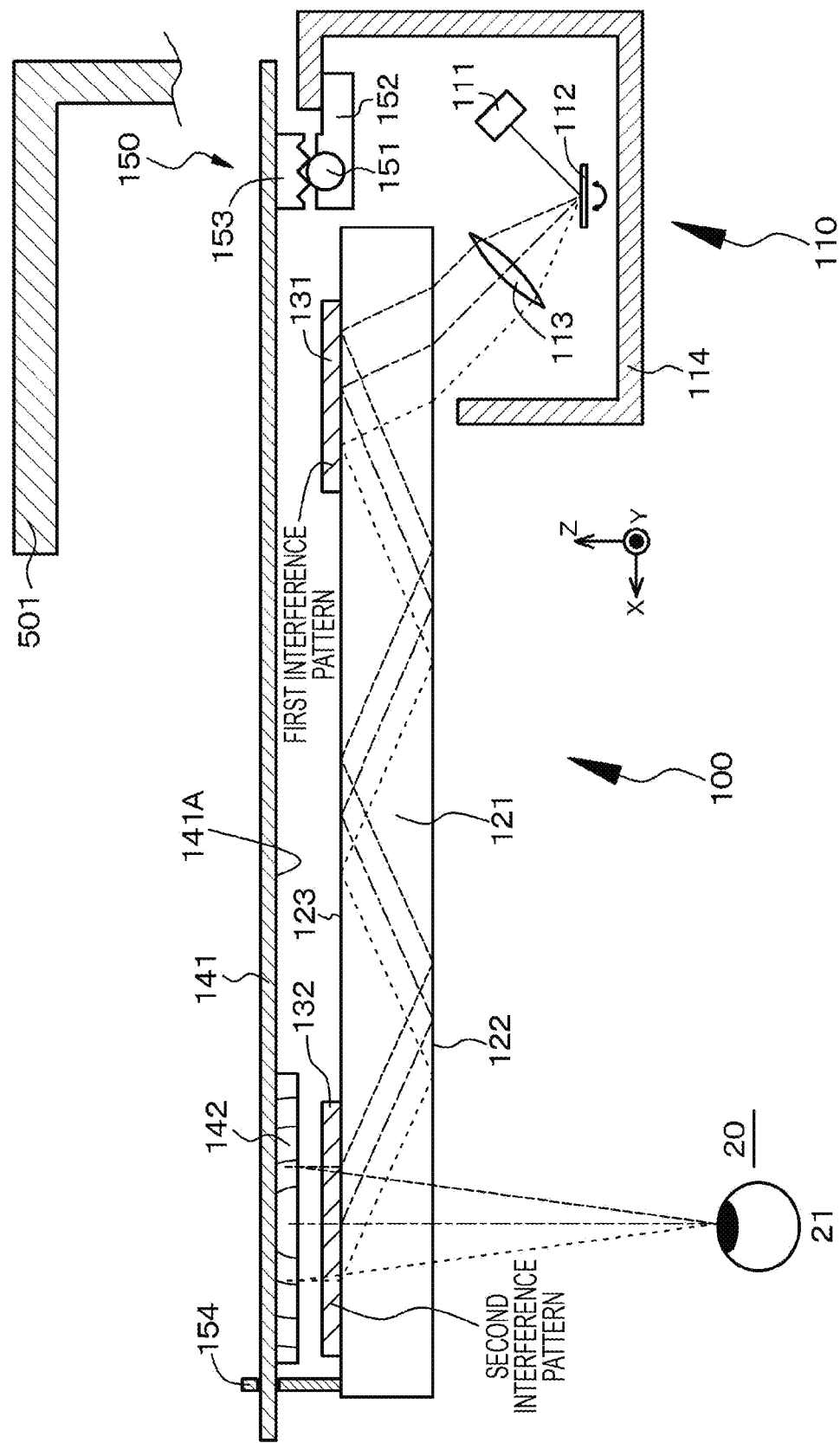
FIG. 15 is a conceptual diagram of an image display device in a display device of Example 7.
Figure 16:
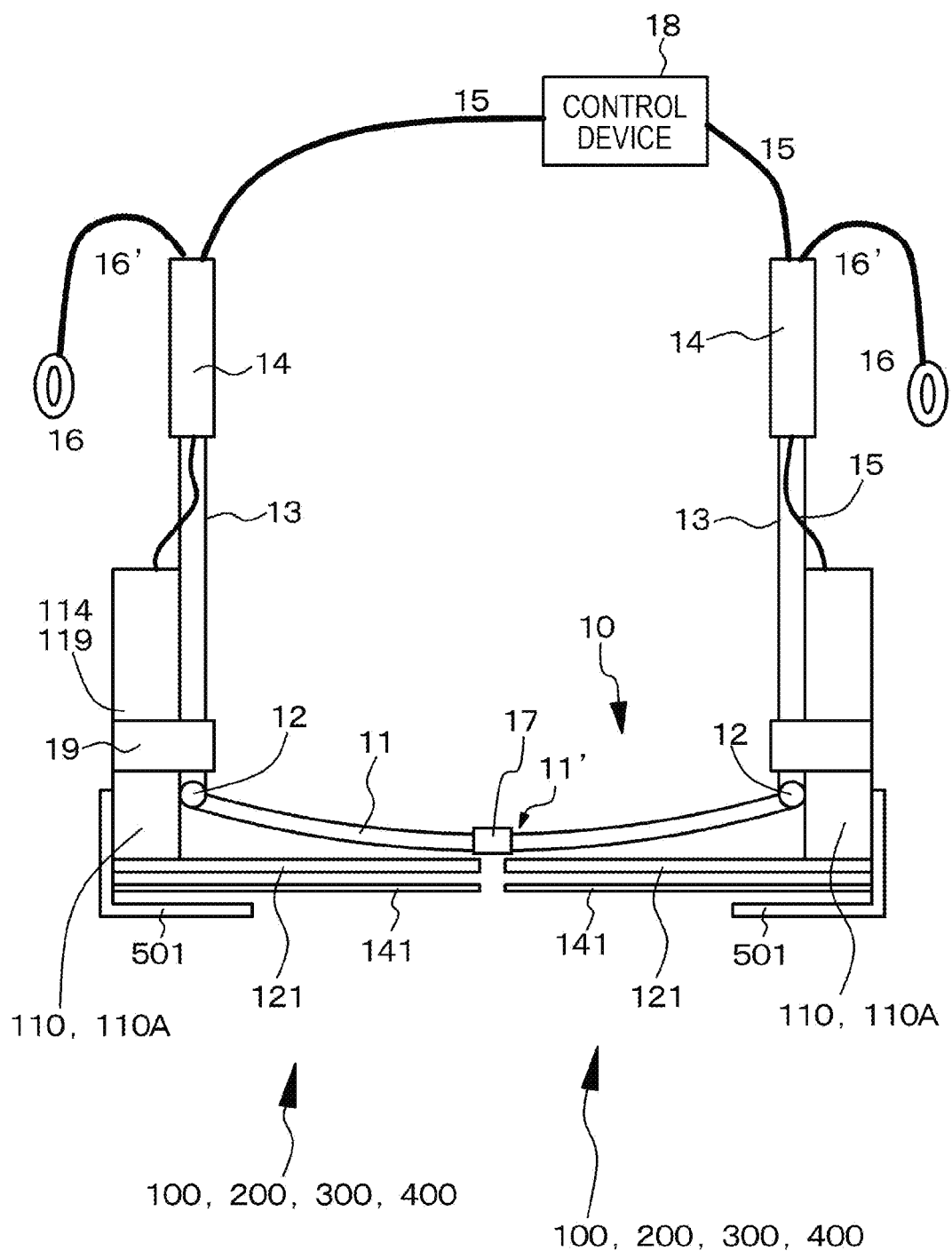
FIG. 16 is a schematic top view of the display device of Example 7.
Figure 17:
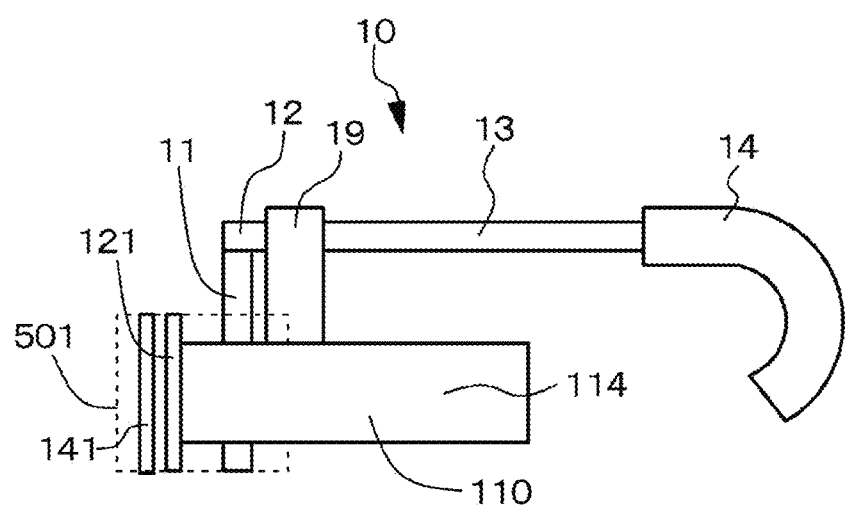
FIG. 17 is a schematic side view of the display device of Example 7.

Example 7 is a modification of Examples 1 to 6. As illustrated in a conceptual diagram of the image display device in FIG. 15, a schematic top view of the display device in FIG. 16, and a schematic side view thereof in FIG. 17, a light shielding member 501 is arranged or provided outside the second surface 123 of the light guide plate 121 in a manner covering the first deflection unit 131 or 133 in the display device of Example 7. Here, an orthogonal projection image of each of the first deflection units 131 and 133 onto the light guide plate 121 is included in an orthogonal projection image of the light shielding member 501 onto the light guide plate 121. Note that, in the following Examples, descriptions will be provided on the basis of the light guide plate 121, first deflection unit 131, and image forming device 110.

Specifically, for example, the light shielding member 501 that shields incidence of external light on the light guide plate 121 is arranged in a region of the light guide plate 121 on which the light emitted from the image forming device 110 is incident, more specifically, in a region where the first deflection unit 131 is provided. Here, the region of the light guide plate 121 on which the light emitted from the image forming device 110 is incident is included within the orthogonal projection image of the light shielding member 501 onto the light guide plate 121. The light shielding member 501 is arranged apart from the light guide plate 121 on a side opposite to a side of the light guide plate 121 where the image forming device 110 is arranged. The light shielding member 501 is manufactured of, for example, an opaque plastic material, and the light shielding member 501 integrally extends from the casing 114 of the image forming device 110, is attached to the casing 114 of the image forming device 110, extends integrally from the frame 10, is attached to the frame 10, or is attached to the light guide plate 121. Note that, in the illustrated example, the light shielding member 501 integrally extends from the casing 114 of the image forming device 110. Thus, since the light shielding member 501 that shields incidence of external light on the light guide plate 121 is arranged in the region of the light guide plate 121 where the light emitted from the image forming device 110 is incident, the external light is prevented from being incident on the region of the light guide plate 121 where the light emitted from the image forming device 110 is incident, specifically, the first deflection unit 131, and therefore, image display quality at the display device is prevented from being degraded by generation of undesirable stray light or the like.

Figure 18:
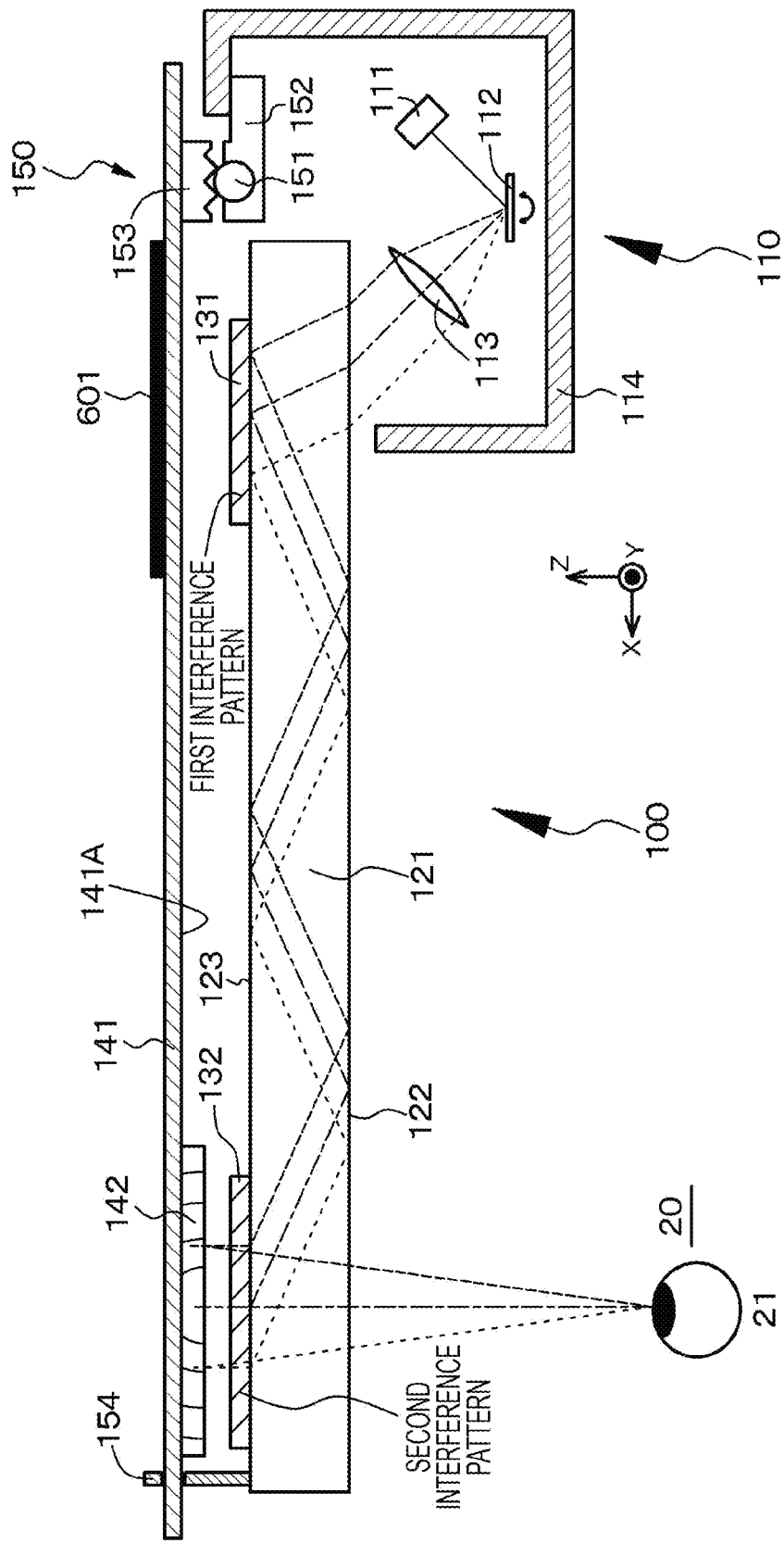
FIG. 18 is a conceptual diagram of a modified example of the image display device in the display device of Example 7.

Alternatively, as illustrated in FIG. 18, a light shielding member 601 is arranged in a part of the support substrate 141. Specifically, the light shielding member 601 can be formed by printing opaque ink on the support substrate 141.

Note that the light shielding member 501 and the light shielding member 601 can be combined.

Example 8

Figure 19:
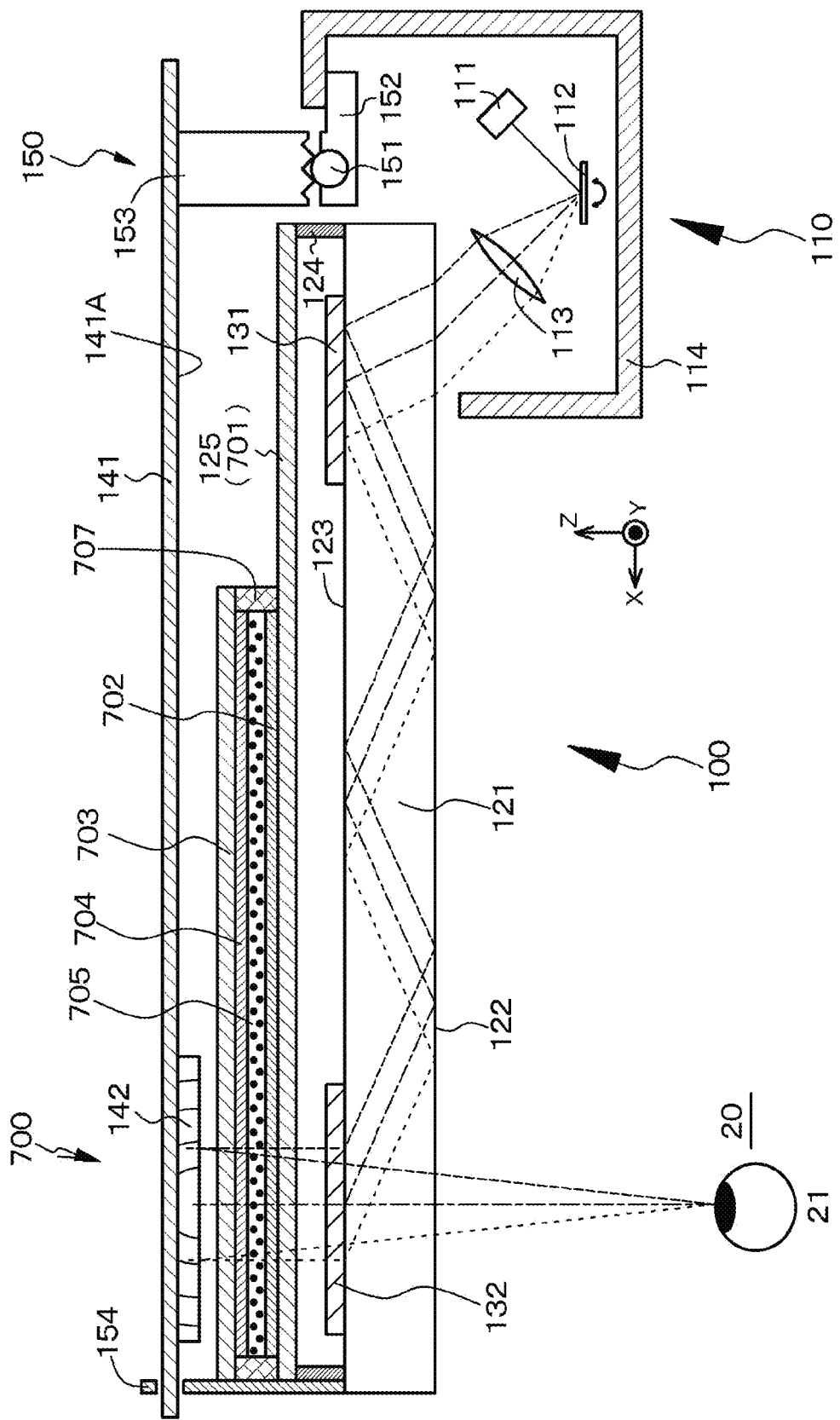
FIG. 19 is a conceptual diagram of an image display device in a display device of Example 8.
Figure 20:
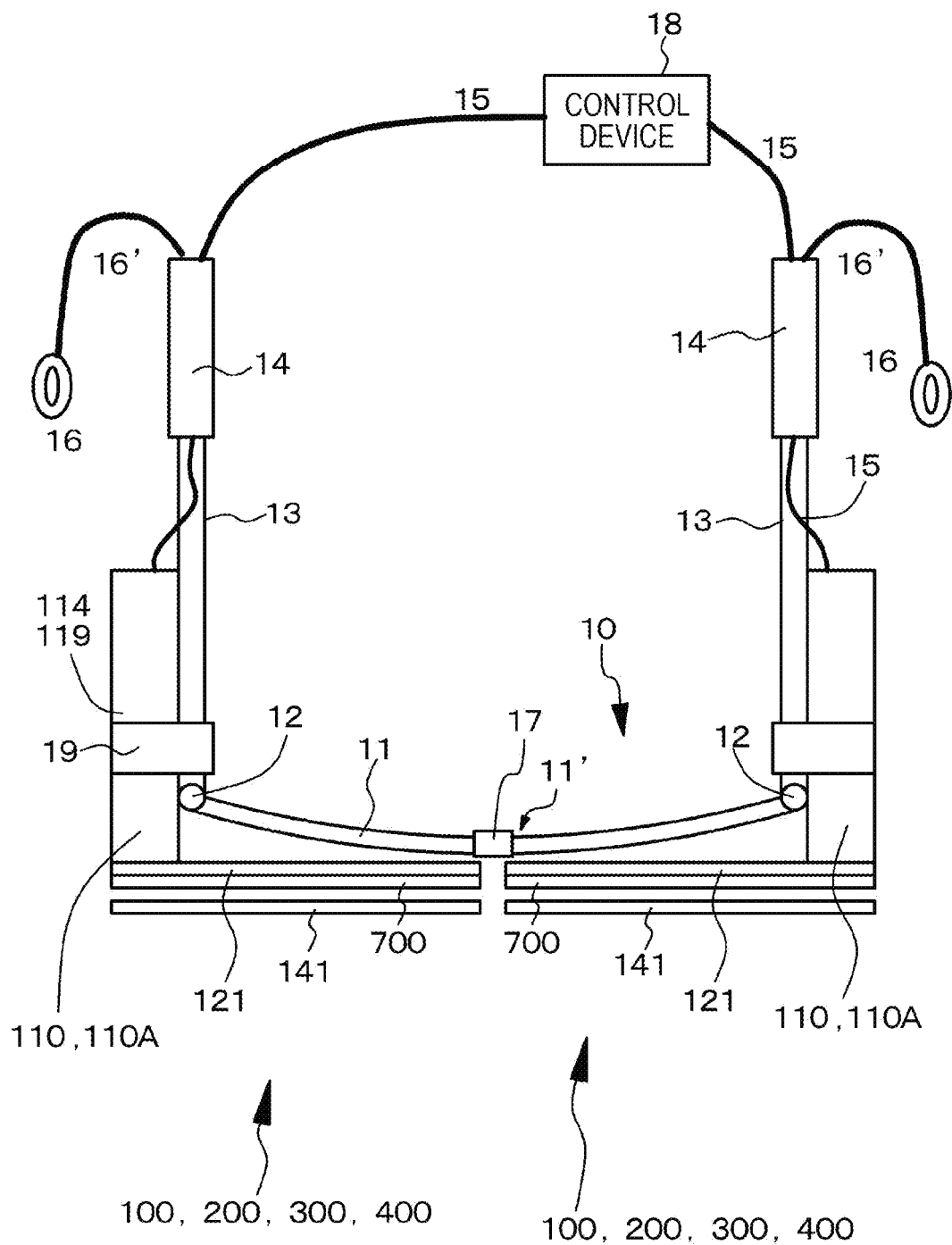
FIG. 20 is a schematic top view of the display device of Example 8.
Figure 21A:
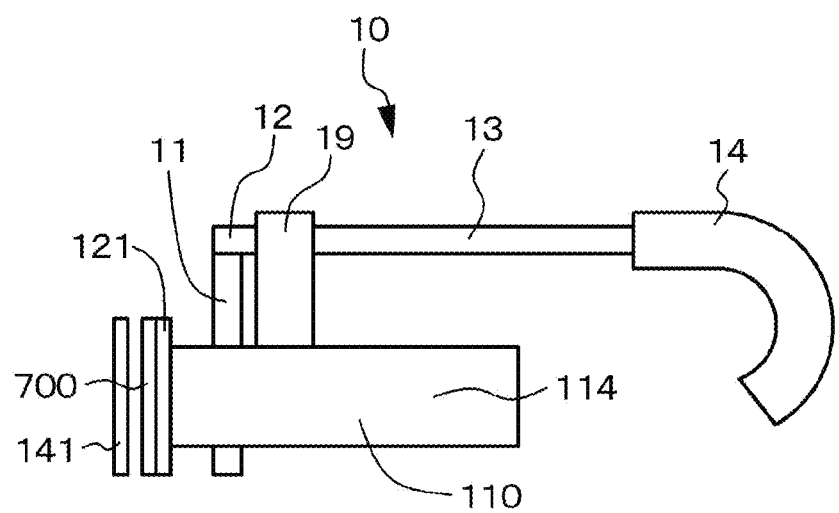
FIGS. 21A and 21B are respectively a schematic side view of the display device of Example 8 and a schematic front view of a portion including a light guide plate and a dimming device in the display device of Example 8.
Figure 21B:
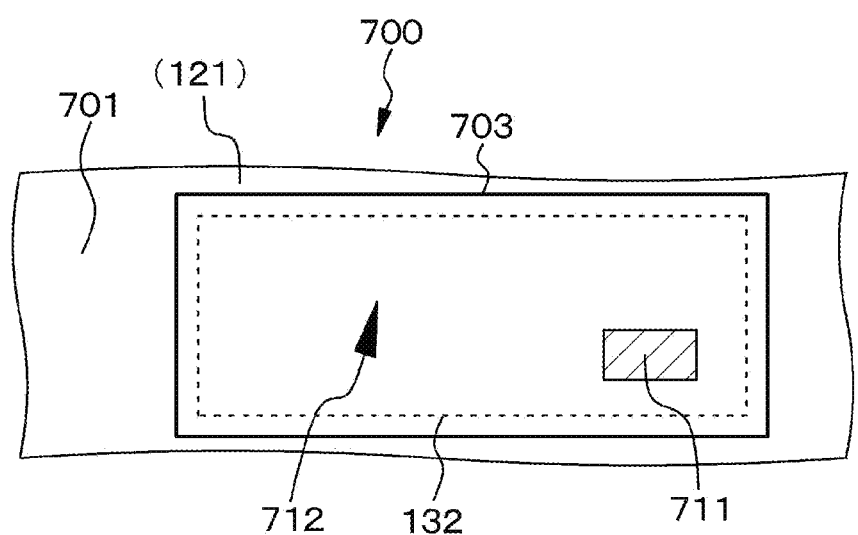
Figure 22A:
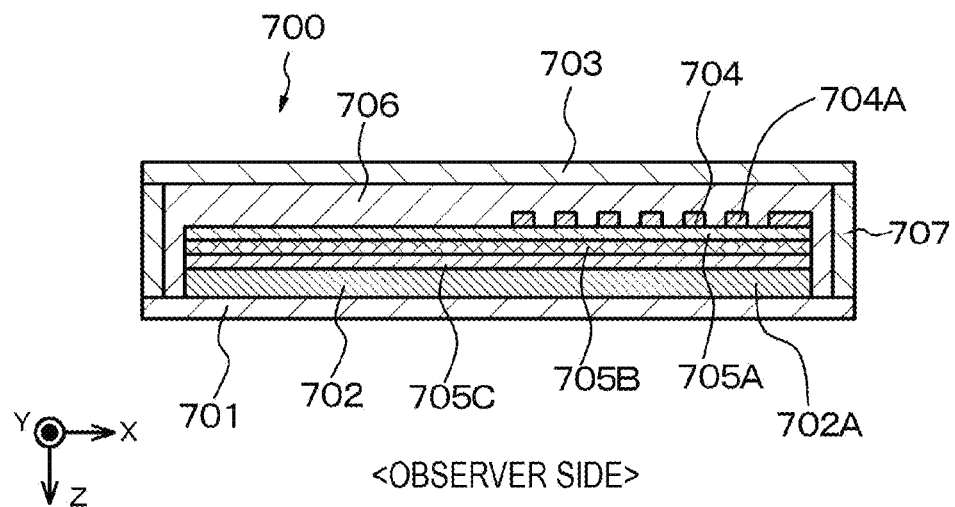
FIGS. 22A and 22B are respectively a schematic cross-sectional view of the dimming device in the display device of Example 8 and a schematic front view of the dimming device.
Figure 22B:
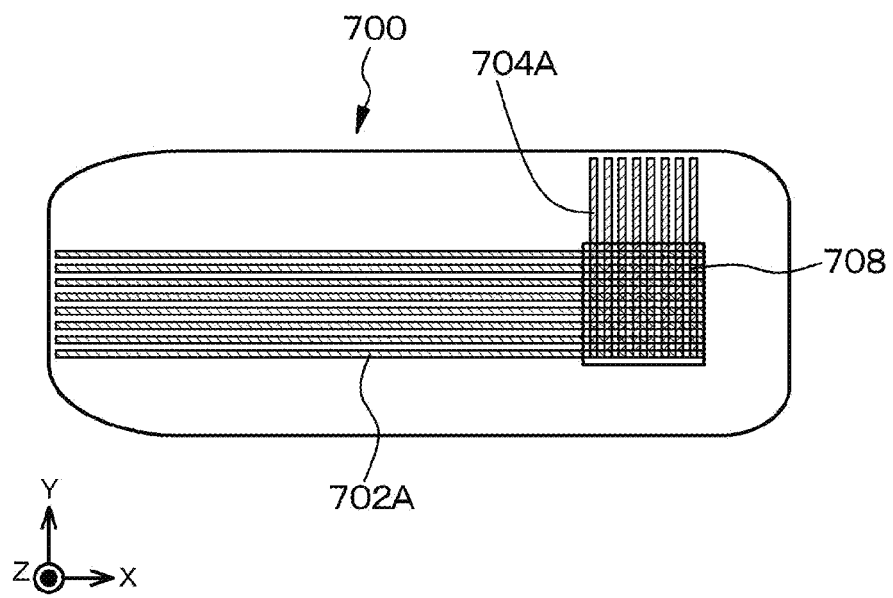

Example 8 is a modification of Examples 1 to 7. FIG. 19 illustrates a schematic top view of the image display device of Example 8, FIG. 20 illustrates a schematic top view of the display device of Example 8, and FIG. 21A is a schematic side view thereof. Additionally, FIG. 21B is a schematic front view of the light guide plate and the dimming device, FIG. 22A illustrates a schematic cross-sectional view of the dimming device, and FIG. 22B is a schematic plan view of the dimming device.

In Example 8, a dimming device 700 that is a kind of optical shutter to adjust a light amount of external light incident from the outside is arranged between the second surface side of the light guide plate 121 and the support substrate 141. Additionally, a virtual image forming region of the light guide plate 121 overlaps with the dimming device 700, when a virtual image is formed on a part of the virtual image forming region on the basis of light emitted from the image forming device 110, the dimming device 700 is controlled such that a light shielding rate in a virtual image projection region 711 of the dimming device 700 where a projection image of the virtual image onto the dimming device 700 is included becomes higher than a light shielding rate in the other region 712 of the dimming device 700. Note that, in the dimming device 700, a position of the virtual image projection region 711 is not fixed but is changed depending on a formed position of a virtual image, and the number of the virtual image projection regions 711 is also changed depending on the number of virtual images (or depending on a series of virtual images, the number of blocked virtual image groups, or the like). A size of the dimming device 700 may be the same as, or larger than, or smaller than that of the light guide plate 121. In short, the virtual image forming region (second deflection unit 132) is at least located inside an orthogonal projection image of the dimming device 700. The light guide plate 121, dimming device 700, and optical member 142 are sequentially arranged from the observer side, but the arrangement is not limited thereto. A connector (not illustrated) is attached to the dimming device 700, and the dimming device 700 is electrically connected to the control circuit (specifically, control device 18) to control the light shielding rate in the dimming device 700 via the connector and wiring.

During activation of the dimming device 700, when the light shielding rate in the virtual image projection region of the dimming device 700 where a projection image of the virtual image onto the dimming device 700 is included is set as "1", the light shielding rate in the other region 712 of the dimming device 700 is to be 0.95 or less, for example. Alternatively, the light shielding rate in the other region of the dimming device 700 is, for example, 30% or less. On the other hand, during actuation of the dimming device 700, the light shielding rate in the virtual image projection region 711 of the dimming device 700 is set to 35% to 99%, for example, 80%. Thus, the light shielding rate of the virtual image projection region 711 may be set constant, or may be changed depending on illuminance of an environment where the display device is placed, as described later.

In Example 8 or Examples 9 to 10 described later, as illustrated in a schematic cross-sectional view illustrated in FIG. 22A and a schematic plan view illustrated in FIG. 22B, the dimming device 700 includes:

a first substrate 701;

a second substrate 703 facing the first substrate 701;
a first transparent electrode 702 provided on a surface of the first substrate 701 facing the second substrate 703;
a second transparent electrode 704 provided on a surface of the second substrate 703 facing the first substrate 701; and
a light adjustment layer 705 interposed between the first transparent electrode 702 and the second transparent electrode 704. Additionally,
the first transparent electrode 702 includes a plurality of strip-shape first transparent electrode segments 702A extending in a first direction,
the second transparent electrode 704 includes a plurality of strip-shape second transparent electrode segments 704A extending in a second direction different from the first direction, and
a light shielding rate in a portion of the dimming device corresponding an overlapping region of first transparent electrode segments 702A and second transparent electrode segments 704A (minimum unit region 708 where the light shielding rate in the dimming device is changed) is controlled on the basis of control of voltage applied to each of the first transparent electrode segments 702A and the second transparent electrode segments 704A. In other words, the light shielding rate is controlled on the basis of a simple matrix method. The first direction and the second direction are perpendicular to each other, and specifically, the first direction extends in the lateral direction (X direction), and the second direction extends in the vertical direction (Y direction).

The second surface side of the light guide plate 121 is covered with a transparent protective member 125 with a gap provided therebetween. An outer edge portion of the light guide plate 121 and an outer edge portion of the transparent protective member 125 are sealed with a sealing member 124 or bonded. The transparent protective member 125 functions also as the first substrate 701 of the dimming device 700, and this structure can reduce the weight of the entire display device and there is no possibility that a user (observer) of the display device feels discomfort. Additionally, the second substrate 703 can be formed thinner than the transparent protective member 125. The similar can be applied to Examples 9 to 10. However, not limited thereto, the transparent protective member 125 and the first substrate 701 of the dimming device 700 can include different members.

The second substrate 703 includes a plastic material. Additionally, each of the first transparent electrode 702 and the second transparent electrode 704 includes a transparent electrode including an indium-tin compound oxide (ITO), and formed on the basis of combination of a PVD method like a sputtering method and a lift-off method. A protective layer 706 including a SiN layer, a $SiO_2$ layer, an $Al_2O_3$ layer, a $TiO_2$ layer, or a laminated film thereof is formed between the second transparent electrode 704 and the second substrate 703. Since the protective layer 706 is formed, the dimming device 700 can be provided with an ion blocking property to inhibit the ions from moving back and forth, a waterproof property, a moisture resistance property, and a scratch resistance property. Additionally, the transparent protective member (first substrate 701) and the second substrate 703 are sealed at the outer edge portions thereof with a sealing material 707 including an ultraviolet curable epoxy resin, an ultraviolet curable resin like an epoxy that is curable by ultraviolet rays and heat, or a thermosetting resin. The first transparent electrode 702 and the second transparent electrode 704 are connected to the control device 18 via a connector and wiring not illustrated.

The light shielding rate (light transmittance) of the dimming device 700 can be controlled by voltage applied to each of the first transparent electrode 702 and the second transparent electrode 704. Specifically, for example, when the voltage is applied to the second transparent electrode 704 in a state where the first transparent electrode 702 is grounded, the light shielding rate in the light adjustment layer 705 is changed. A potential difference between the first transparent electrode 702 and the second transparent electrode 704 may be controlled or the voltage applied to the first transparent electrode 702 and the voltage applied to the second transparent electrode 704 may be controlled independently from each other.

Note that when the number of pixels in a lateral direction of the virtual image forming region (second deflection unit 132) in the dimming device 700 is defined as $M_0$, the number of pixels in the vertical direction thereof is defined as $N_0$, and the number $M_1 \times N_1$ of the minimum unit regions 708 where the light shielding rate in the dimming device 700 is changed is defined as $M_1/M_0 = k$ and $N_1/N_0 = k'$, the following relations are satisfied, for example: $N_0 = M_1$ (i.e., k=1) and $N_0 = N_1$ (i.e., k'=1). However, not limited thereto, it is possible to have a mode in which $1.1 \leq k$, preferably $1.1 \leq k \leq 1.5$, more preferably $1.15 \leq k \leq 1.3$ and $1.1 \leq k'$, preferably $1.1 \leq k' \leq 1.5$, more preferably $1.15 \leq k' \leq 1.3$ are satisfied. A value of k and a value of k' may be the same or may be different, and in Examples, k=k'=1 is assumed.

In Example 8 or Examples 9 to 10 described later, the dimming device 700 includes an optical shutter in which substance color change caused by a redox reaction of an electrochromic material is applied. Specifically, the light adjustment layer contains an electrochromic material. More specifically, the light adjustment layer has a laminated structure where a $WO_3$ layer 705A, a $Ta_2O$ layer 705B, and an $Ir_xSn_{1-x}O$ layer 705C are laminated from the second transparent electrode side. The $NO_3$ layer 705A is subject to reduction color development (reduction coloring). Additionally, the $Ta_2O_5$ layer 705B constitutes a solid electrolyte, and the $Ir_xSn_{1-x}O$ layer 705C is subject to oxidation color development (oxidation coloring).

In the $Ir_xSn_{1-x}O$ layer, Ir reacts with $H_2O$ and exists as iridium hydroxide $Ir(OH)_n$. When negative potential is applied to the second transparent electrode 704 and positive potential is applied to the first transparent electrode 702, protons $H^+$ are moved from the $Ir_xSn_{1-x}O$ layer to the $Ta_2O_5$ layer and electrons are emitted to the first transparent electrode 702, and oxidation reaction progresses as next, and the $Ir_xn_{1-x}O$ layer is colored.

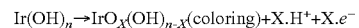

$Ir(OH)_n \rightarrow IrO_x(OH)_{n-x}(coloring) + X.H^+ + X.e^-$

On the other hand, protons $H^+$ in the $Ta_2O_5$ layer are moved into the $WO_3$ layer, and electrons are injected from the second transparent electrode 704 into the $WO_3$ layer, and reduction reaction progresses in the $NO_3$ layer as next, and the $NO_3$ layer is colored.

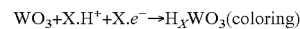

$WO_3 + X.H^+ + X.e^- \rightarrow H_xWO_3(coloring)$

On the contrary, when positive potential is applied to the second transparent electrode 704 and negative potential is applied to the first transparent electrode 702, reduction reaction progresses in an opposite direction from the above case in the $Ir_xSn_{1-x}O$ layer and decoloring occurs, and oxidation reaction progresses in the $NO_3$ layer and decoloring occurs. Note that $H_2O$ is contained in the $Ta_2O_5$ layer, and is ionized by applying the voltage to both of the first transparent electrode and the second transparent electrode, the protons in states of H+ and OH− are contained and contribute to coloring reaction and decoloring reaction.

Information and data associated with an image to be displayed in each of the image display devices 100, 200, 300, and 400, or a signal to be received by a reception device is recorded, stored, and saved in, for example, a so-called cloud computer or a server, and the display device includes a communication unit (receiver/transmitter) such as a mobile phone or a smartphone or incorporates a communication unit (reception device) in the control device (control circuit, control unit) 18, thereby achieving transference and exchange of the various information, data, and signals via the communication unit between the cloud computer or server and the display device, and also achieving reception of a signal based on the various information and data, in other words, a signal to display an image on each of the image display devices 100, 200, 300, and 400, and furthermore, enabling the reception device to receive a signal.

Specifically, when an observer inputs, to a mobile phone or a smartphone, a request for "information" to be acquired, the mobile phone or smartphone accesses the cloud computer or server and acquires the "information" from the cloud computer or server. Thus, the control device 18 receives a signal to display an image on each of the image display devices 100, 200, 300, and 400. In the control device 18, known image processing is performed on the basis of the signal, and the "information" is displayed as an image in the image forming device 110. The image of this "information" is displayed as a virtual image at a predetermined position of the light guide plate 121 controlled by the control device 18 on the basis of light emitted from the image forming device 110. In other words, a virtual image is formed at a part of the virtual image forming region (second deflection unit 132).

Additionally, in the case where the dimming device 700 is provided, the dimming device 700 is controlled such that the light shielding rate in the virtual image projection region 711 of the dimming device 700 where a projection image of the virtual image onto the dimming device 700 is included becomes higher than the light shielding rate in the other region 712 of the dimming device 700. Specifically, the control device 18 controls the voltage applied to each of the first transparent electrode 702 and the second transparent electrode 704. Here, a size and a position of the virtual image projection region 711 of the dimming device 700 are determined on the basis of the signal to display an image on the image forming device 110.

In some cases, a signal to display an image in each of the image display devices 100, 200, 300, and 400 may be stored in the display device (specifically, the control device 18).

Alternatively, an image captured by the camera 17 included in the display device is transmitted to the cloud computer or server via the communication unit, and various information and data corresponding to the image captured by the camera 17 is retrieved in the cloud computer or the server, and the retrieved various information and data are transmitted to the display device via the communication unit, and then the retrieved various information and data are displayed as an image on each of the image display devices 100,200,300, and 400.

Additionally, using both of this mode and input the "information", information indicating, for example, where an observer currently is and which direction the observer is facing can be weighted, and therefore, the "information" can be displayed on the image forming device 110 with higher accuracy.

It may be possible to adopt a mode in which the light shielding rate in the virtual image projection region 711 of the dimming device 700 is increased before a virtual image is formed on the light guide plate 121 on the basis of light emitted from the image forming device 110. An exemplary period from when the light shielding rate in the virtual image projection region 711 of the dimming device 700 is increased until the virtual image is formed can be 0.5 seconds to 30 seconds, but the value is not limited to this value. Thus, since an observer can preliminarily grasp at which position and when the virtual image is formed on the light guide plate, virtual image visibility of the observer can be improved. It is possible to have a mode in which the light shielding rate in the virtual image projection region 711 of the dimming device 700 is sequentially increased with time. In other words, a so-called fade-in state can be achieved.

In a case where no virtual image is formed, the light shielding rate in the entire dimming device 700 may be set to a value same as the light shielding rate in the other region of the dimming device 700. When formation of the virtual image is finished and the virtual image disappears, the light shielding rate in the virtual image projection region 711 of the dimming device 700 in which the projection image of the virtual image onto the dimming device 700 has been included may be immediately set to a value same as the light shielding rate in the other region of the dimming device 700, but may also be controlled so as to be a value same as the light shielding rate in the other region of the dimming device 700 with time (e.g., in 3 seconds). In other words, the so-called fade-out state can be achieved.

Figure 23A:
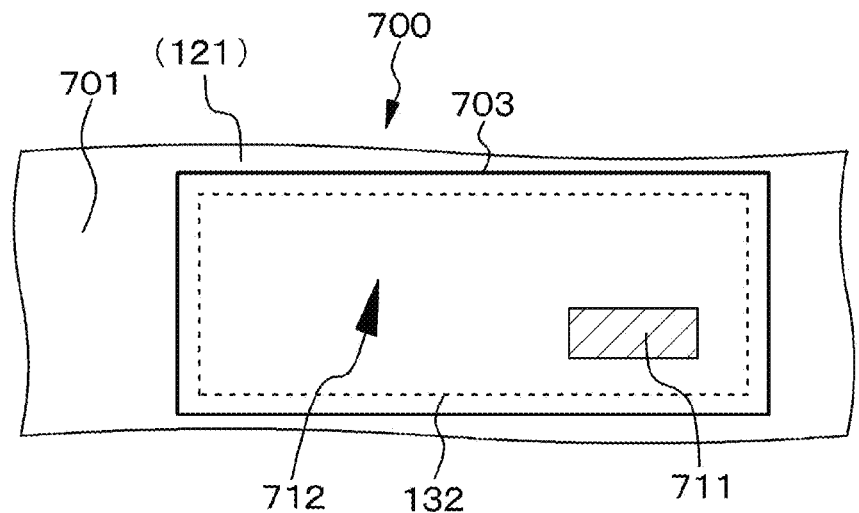
FIGS. 23A, 23B, and 23C are diagrams schematically illustrating a change and the like in a virtual image projection region of the dimming device.
Figure 23B:
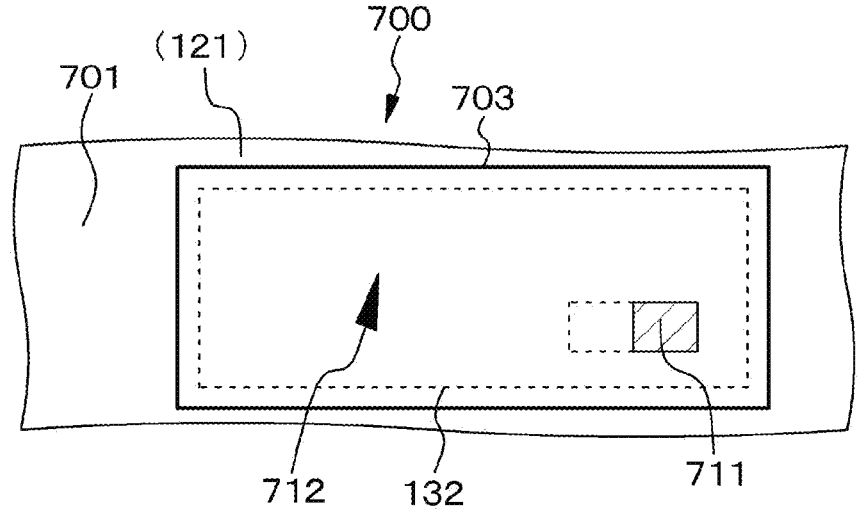
Figure 23C:
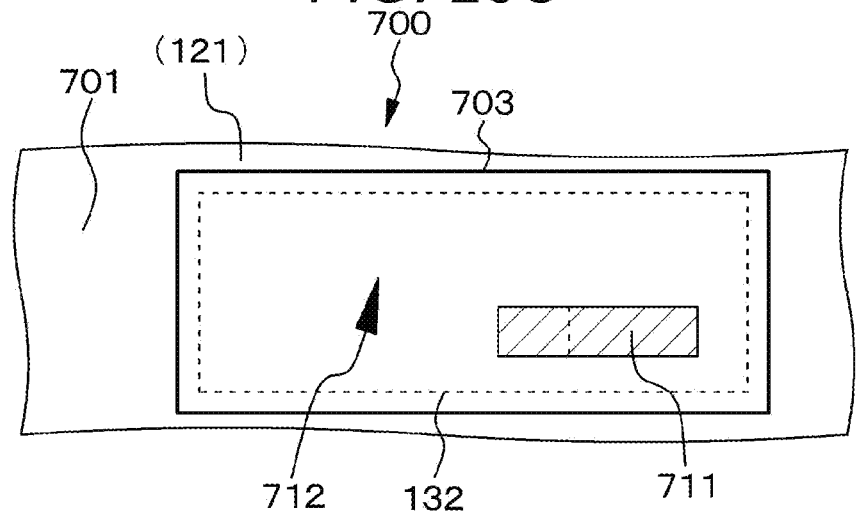

Assume a case where one virtual image is formed on the light guide plate 121 on the basis of light emitted from the image forming device 110 and then a next virtual image different from the one virtual image is formed. In this case, assuming that the area of the virtual image projection region 711 of the dimming device 700 corresponding to the one virtual image is defined as $S_1$, and the area of the virtual image projection region 711 of the dimming device 700 corresponding to the next virtual image is $S_2$, it is possible to have a mode in which:

in a case of $S_2/S_1<0.8$ or $1<S_2/S_1$, the virtual image projection region 711 of the dimming device 700 on which the next virtual image is formed is a region of the dimming device 700 where a projection image of the next virtual image onto the dimming device 700 is included (refer to FIGS. 23A, 23B and 23C); and in a case of $0.8 \le S_2/S_1 \le 1$, the virtual image projection region 711 of the dimming device 700 where the next virtual image is formed is a region of the dimming device 700 where the projection image of the one virtual image onto the dimming device 700 is included. In other words, in a case where the area of the virtual image projection region is reduced by 0% to 20% from formation of the one virtual image to formation of a next virtual image, it is possible to have a mode in which the virtual image projection region corresponding to the one virtual image is kept (in other words, the state illustrated in FIG. 23A is kept).

Figure 24:
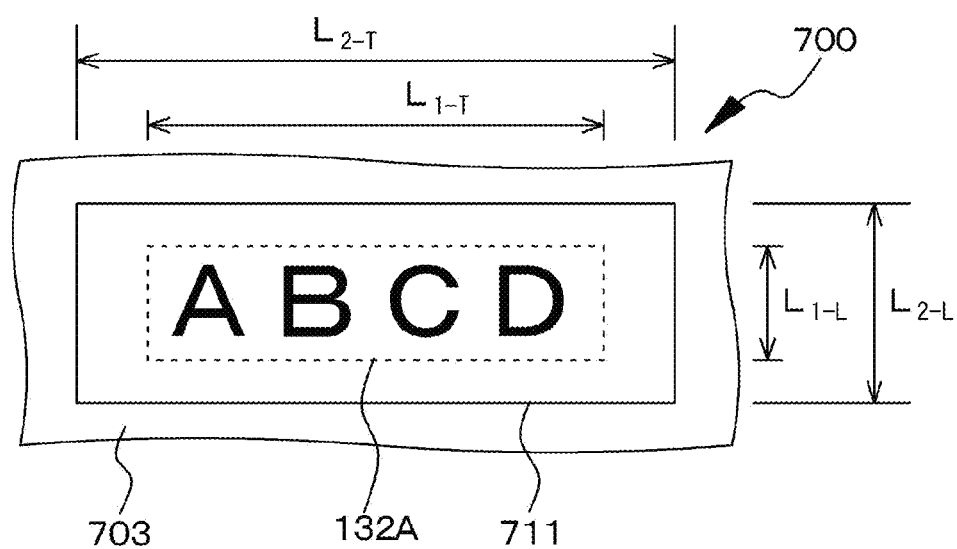
FIG. 24 is a diagram schematically illustrating: a virtual rectangle circumscribing a virtual image formed on the light guide plate; and a rectangular shape of the virtual image projection region of the dimming device.

Additionally, as illustrated in FIG. 24, assuming a virtual rectangle 132A circumscribing a virtual image formed on the light guide plate 121, it is possible to have a configuration in which the virtual image projection region 711 of the dimming device 700 is larger than the virtual rectangle 132A. Furthermore, in this case, when a length in a lateral direction and a length in a vertical length of the virtual rectangle 132A circumscribing the virtual image formed on the light guide plate 121 are defined as $L_{1-T}$ and $L_{1-L}$ respectively, and a shape of the virtual image projection region 711 of the dimming device 700 is defined as a rectangle having a lateral length and a vertical length of $L_{2-T}$ and $L_{2-L}$ respectively, it is preferable to satisfy $1.0 \leq L_{2-T}/L_{1-T} \leq 1.5$, and $1.0 \leq L_{2-L}/L_{1-L} \leq 1.5$.

Note that FIG. 24 illustrates a state in which "ABCD" is formed as a virtual image.

The dimming device 700 may be constantly in an active state or may be determined to be set in the active/non-active (ON/OFF) state in accordance with a command by an observer, or the dimming device may be constantly in the non-active state and may be made active in accordance with a signal to display an image on each of the image display devices 100, 200, 300, and 400. To determine the active/non-active state in accordance with the command (operation) of the observer, the display device may further include, for example, a microphone, and an operational state of the dimming device 700 may be controlled by voice input via the microphone. Specifically, switching between the active/non-active state of the dimming device 700 may be controlled in accordance with a command based on a real voice of the observer. Alternatively, information to be acquired may be input by voice input. Alternatively, the display device may further include an infrared incidence/emission device, and the operational state of the dimming device 700 may be controlled by the infrared incidence/emission device. Specifically, switching of the active/non-active state of the dimming device 700 may be controlled by detecting eye blink of the observer by using the infrared incidence/emission device.

As described above, in the display device of Example 8, when a virtual image is formed in a part of the virtual image forming region on the basis of the light emitted from the image forming device, the dimming device is controlled such that the light shielding rate in the virtual image projection region of the dimming device where a projection image of the virtual image onto the dimming device is included becomes higher than the light shielding rate in the other region of the dimming device, and therefore, high contrast can be provided to the virtual image observed by the observer, and furthermore, the observer using the display device can reliably and safely recognize an external environment because a region having a high light shielding rate is not the entire dimming device and only a narrow region such as the virtual image projection region of the dimming device where the projection image of the virtual image onto the dimming device is included becomes the region having the high light shielding rate.

It is possible to have a mode in which the frame includes: the front portion arranged in front of an observer; two temple portions pivotally attached to both ends of the front portion via hinges; and the nose pad, and the dimming device 700 is provided at the front portion. Furthermore, it is possible to have a mode in which the light guide plate 121 is attached to the dimming device 700. Note that the light guide plate 121 may be attached to the dimming device 700 with a gap provided therebetween. Furthermore, in these cases, it is possible to have, as describe above: the mode in which the front portion includes a rim, the mode in which the dimming device 700 is fitted in the rim, the mode in which at least one of the light guide plate 121 (first substrate 701) or the second substrate 703 is fitted in the rim; the mode in which the dimming device 700 and the light guide plate 121 are fitted in the rim; or the mode in which the light guide plate 121 is fitted in the rim.

The light adjustment layer 705 may include an optical shutter including a liquid crystal display device. In this case, specifically, the light adjustment layer 705 can include a liquid crystal material layer including, for example, a twisted nematic (TN) liquid crystal material or a super twisted nematic (STN) liquid crystal material. The first transparent electrode 702 and the second transparent electrode 704 are patterned, and the light shielding rate (light transmittance) of the region 712 in a part of the dimming device 700 is changed to a state different from the light shielding rate in the other region. Alternatively, any one of the first transparent electrode 702 and the second transparent electrode 704 is formed as a so-called solid electrode not patterned, the other electrode is patterned, and the other electrode is connected to a TFT. Then, the light shielding rate in the minimum unit region 708 where the light shielding rate in the dimming device 700 is changed is controlled by the TFT. In other words, the light shielding rate may be controlled on the basis of an active matrix method. Needless to mention that control of the light shielding rate based on the active matrix method can also be applied to the dimming device 700 described in Example 8 or Examples 9 to 10 described later.

Additionally, it is also possible to use an optical shutter that controls the light shielding rate (light transmittance) by the electrowetting phenomenon. Specifically, provided is a structure in which a first transparent electrode and a second transparent electrode are provided, and a space between the first transparent electrode and the second transparent electrode is filled with first liquid having an insulation property and second liquid having conductivity. Then, a shape of an interface formed by the first liquid and the second liquid is changed from a flat shape to a curved shape by applying voltage between the first transparent electrode and the second transparent electrode, thereby achieving control for the light shielding rate (light transmittance), for example. Alternatively, it is possible to use an optical shutter in which an electrocoating method (electrodeposition, electrolytic deposition) based on electrodeposition/dissociation phenomenon utilizing reversible redox reaction of a metal (e.g., silver particle). Specifically, the light shielding rate (light transmittance) of the dimming device is decreased by preliminarily dissolving $Ag^+$ and $I^-$ in an organic solvent and applying appropriate voltage to the electrode to reduce $Ag^+$ and precipitate Ag, whereas the light shielding rate (light transmittance) of the dimming device is increased by oxidizing Ag and dissolving the same as $Ag^+$.

In some cases, it is possible to have a configuration in which the light having passed through the dimming device is colored in a desired color by the dimming device, and in this case, a color to be colored by the dimming device can be variable. Specifically, for example, a dimming device coloring the light in red, a dimming device coloring the light in green, and a dimming device coloring the light in blue may be laminated.

The dimming device may be detachably arranged in a region from which the light of the light guide plate is emitted. In order to thus detachably arrange the dimming device, for example, screws manufactured of transparent plastic are used to attach the dimming device to the light guide plate, and the dimming device is connected to the control circuit (for example, included in the control device 18 to control the image forming device) to control light transmittance of the dimming device via a connector or wiring.

Example 9

Figure 25A:
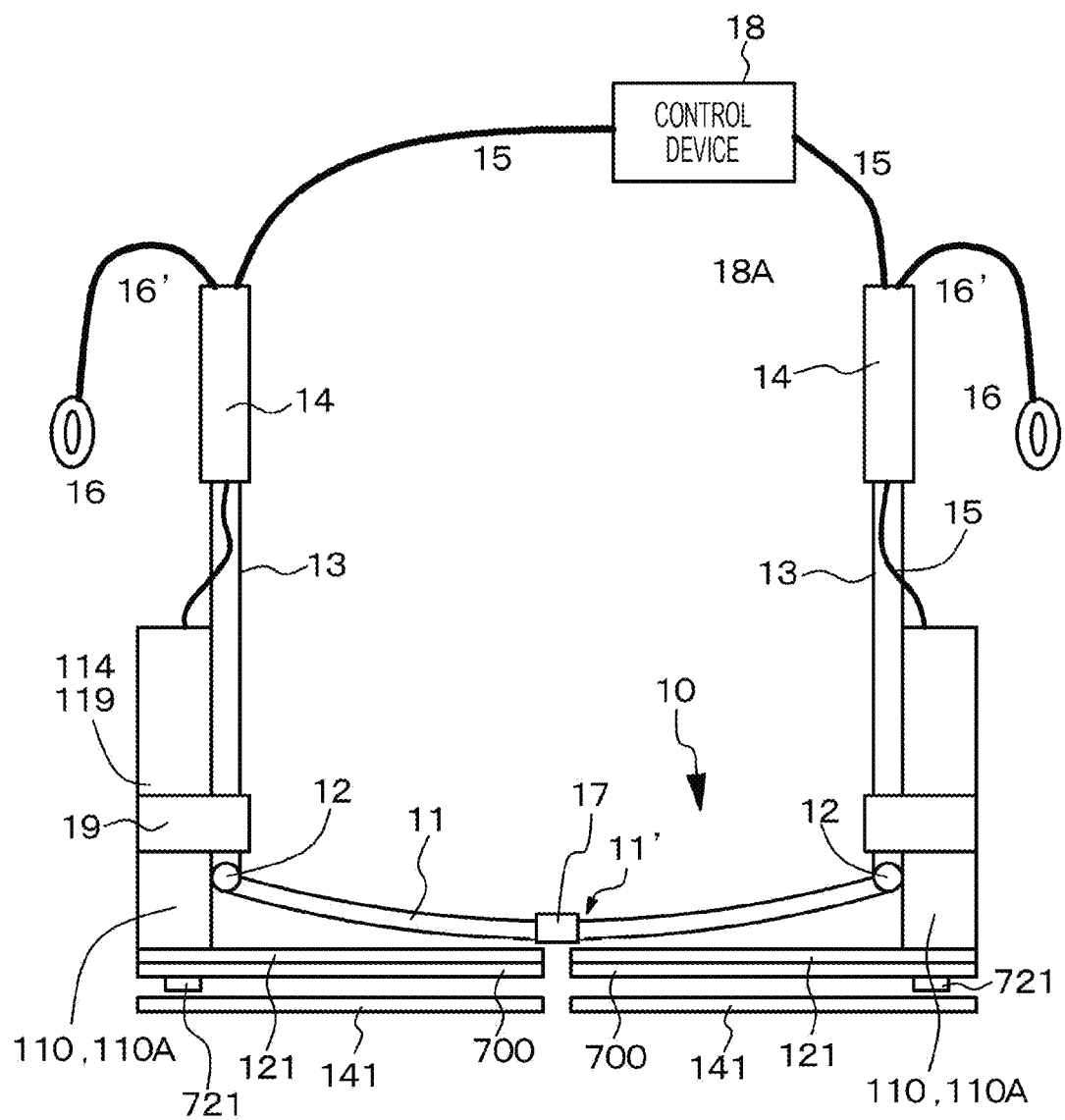
FIGS. 25A and 25B are respectively a schematic top view of a display device of Example 9 and a schematic top view of a circuit that controls an environment illuminance measurement sensor.
Figure 25B:
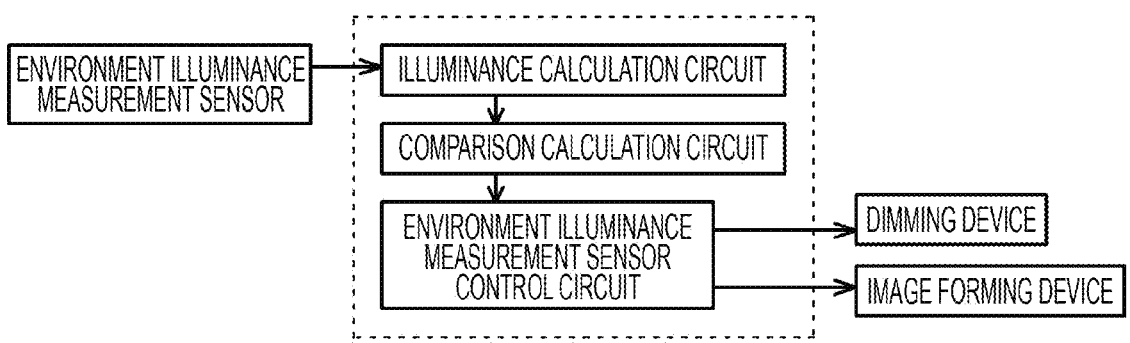

Example 9 is a modification of Example 8. FIG. 25A illustrates a schematic top view of the display device of Example 9. Additionally, FIG. 25B illustrates a schematic diagram of a circuit that controls an environment illuminance measurement sensor.

The display device of Example 9 further includes an environment illuminance measurement sensor 721 that measures illuminance of an environment where the display device is placed, and the light shielding rate in the dimming device 700 is controlled on the basis of a measurement result of the environment illuminance measurement sensor 721. Luminance of an image formed by the image forming device 110 is also controlled together with or independently from the light shielding rate on the basis of a measurement result of the environment illuminance measurement sensor 721. The environment illuminance measurement sensor 721 having a known configuration and a known structure may be arranged on, for example, an outer end portion of the light guide plate 121, an outer end portion of the dimming device 700, the casing 114 or 119, the frame 10, or the like. The environment illuminance measurement sensor 721 is connected to the control device 18 via a connector and wiring (not illustrated). The control device 18 includes a circuit that controls the environment illuminance measurement sensor 721. The circuit that controls the environment illuminance measurement sensor 721 includes: an illuminance calculation circuit that receives a measured value from the environment illuminance measurement sensor 721 to obtain the illuminance; a comparison calculation circuit that compares an illuminance value obtained by the illuminance calculation circuit with a standard value; and an environment illuminance measurement sensor control circuit that controls the dimming device 700 and/or the image forming device 110 on the basis of a value obtained by the comparison calculation circuit, and these circuits can include known circuits. The light shielding rate in the dimming device 700 is controlled in control of the dimming device 700, whereas luminance of an image formed by the image forming device 110 is controlled in control of the image forming device 110. Note that the control of the light shielding rate in the dimming device 700 and the control of the luminance of the image in the image forming device 110 may be respectively performed in a manner independent from each other or may be performed in a correlated manner.

For example, when a measurement result of the environment illuminance measurement sensor 721 is a predetermined value (first illuminance measurement value) or more, the light shielding rate in the dimming device 700 is set to a predetermined value (first light shielding rate) or more. On the other hand, when a measurement result of the environment illuminance measurement sensor 721 is a predetermined value (second illuminance measurement value) or less, the light shielding rate in the dimming device 700 is set to a predetermined value (second light shielding rate) or less. Here, 10 luxes can be exemplified as a first illuminance measurement value, any value from 99% to 70% can be exemplified as a first light shielding rate, 0.01 luxes can be exemplified as a second illuminance measurement value, and any value from 49% to 1% can be exemplified as a second light shielding rate.

Note that the environment illuminance measurement sensor 721 of Example 9 can be applied to the display devices described in Examples 1 to 7. Additionally, in the case where the display device includes the camera 17, the environment illuminance measurement sensor 721 can include a light receiving element for exposure measurement provided in the camera 17.

In the display device of Example 9 or Example 10 described next, the light shielding rate in the dimming device is controlled on the basis of a measurement result of the environment illuminance measurement sensor, and luminance of an image formed by the image forming device is controlled on the basis of a measurement result of the environment illuminance measurement sensor, and the light shielding rate in the dimming device is controlled on the basis of a measurement result of the transmitted light illuminance measurement sensor and luminance of an image formed by the image forming device is controlled on the basis of a measurement result of the transmitted light illuminance measurement sensor, and therefore, not only high contrast can be provided to a virtual image observed by an observer but also an observation state of a visual image can be optimized depending on the illuminance of the surrounding environment where the display device is placed.

Example 10

Figure 26A:
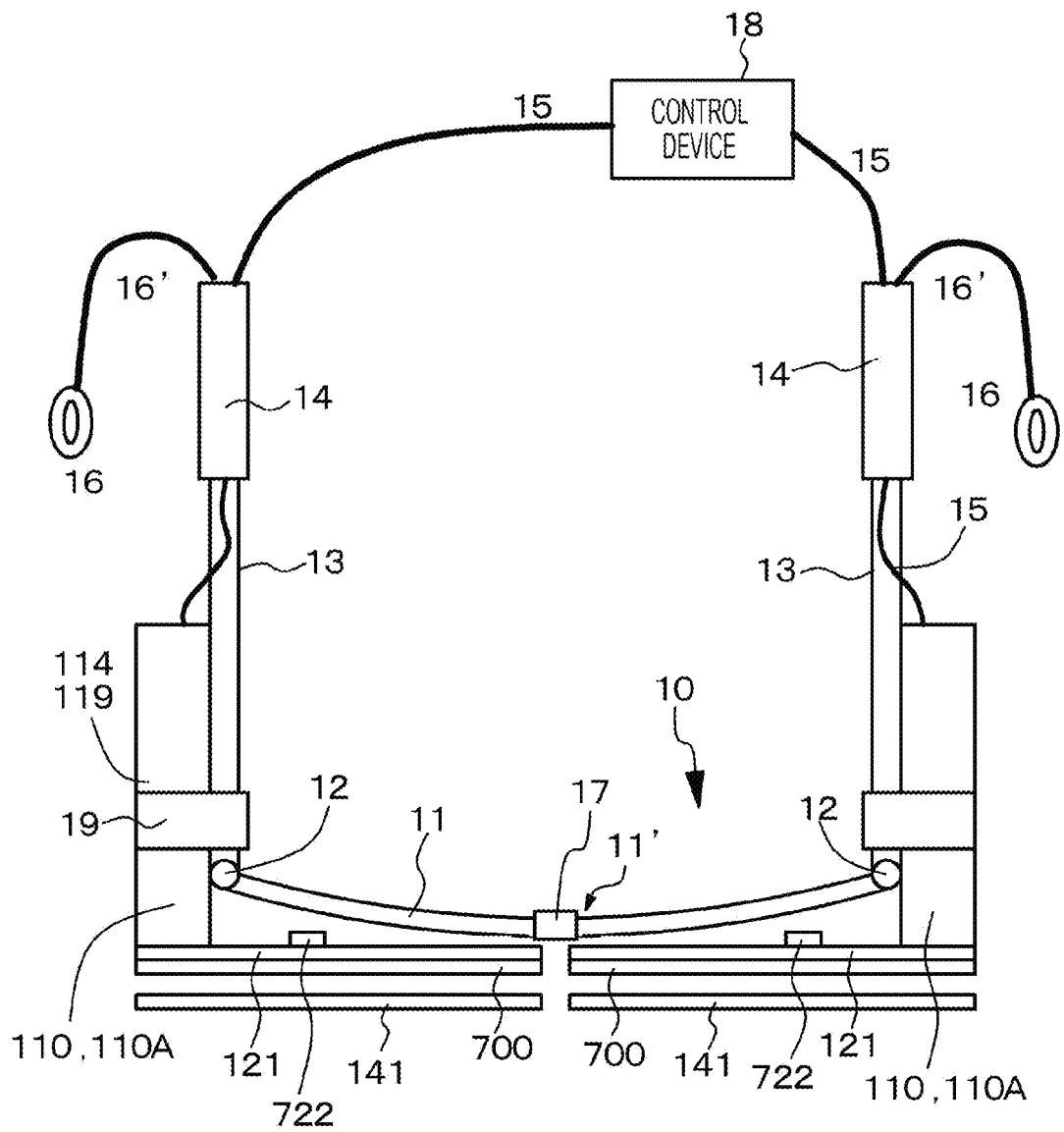
FIGS. 26A and 26B are respectively a schematic top view of a display device of Example 10 and a schematic top view of a circuit that controls a transmitted light illuminance measurement sensor.
Figure 26B:
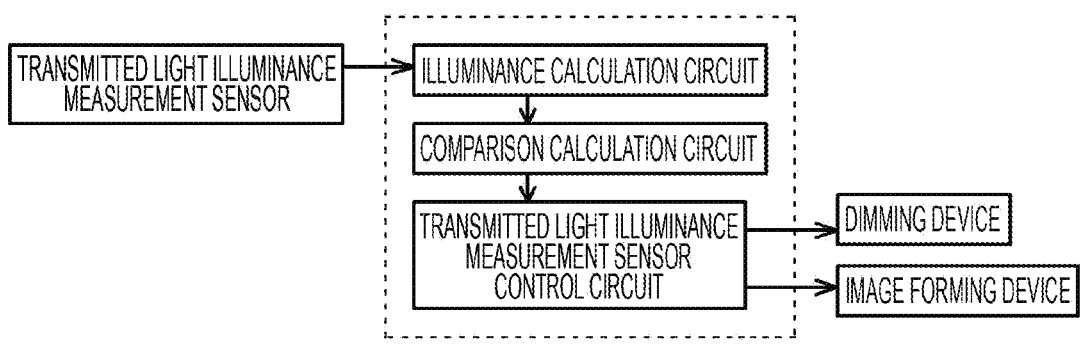

Example 10 is also a modification of Example 8. FIG. 26A is a schematic top view of the display device of Example 10. Additionally, FIG. 26B illustrates a schematic diagram of a circuit that controls the transmitted light illuminance measurement sensor.

The display device of Example 10 measures illuminance based on light that has been transmitted through the dimming device from the external environment, in other words, the display device further includes the transmitted light illuminance measurement sensor 722 that measures whether ambient light is incident after being adjusted to desired illuminance after transmitted through the dimming device, and the light shielding rate in the dimming device 700 is controlled on the basis of a measurement result of the transmitted light illuminance measurement sensor 722. Luminance of an image formed by the image forming device 110 is also controlled together with or independently from the light shielding rate on the basis of a measurement result of the transmitted light illuminance measurement sensor 722. The transmitted light illuminance measurement sensor 722 having a known configuration and a known structure is arranged closer to an observer side than the light guide plate 121 is. Specifically, the transmitted light illuminance measurement sensor 722 may be arranged on, for example, an inner surface of the casing 114 or on the observer side surface of the light guide plate 121. The transmitted light illuminance measurement sensor 722 is connected to the control device 18 via a connector and wiring (not illustrated). The control device 18 includes a circuit that controls the transmitted light illuminance measurement sensor 722. The circuit controlling the transmitted light illuminance measurement sensor 722 includes: an illuminance calculation circuit that receives a measured value from the transmitted light illuminance measurement sensor 722 to obtain the illuminance; a comparison calculation circuit that compares an illuminance value obtained by the illuminance calculation circuit with a standard value; and a transmitted light illuminance measurement sensor control circuit that controls the dimming device 700 and/or the image forming device 110 on the basis of a value obtained by the comparison calculation circuit, and these circuits can include known circuits. The light shielding rate in the dimming device 700 is controlled in control of the dimming device 700, whereas luminance of an image formed by the image forming device 110 is controlled in control of the image forming device 110. Note that the control of the light shielding rate in the dimming device 700 and the control of the luminance of the image in the image forming device 110 may be respectively performed in a manner independent from each other or may be performed in a correlated manner. Furthermore, in a case where the measurement result of the transmitted light illuminance measurement sensor 722 cannot be controlled to the desired illuminance in consideration of the illuminance of the environment illuminance measurement sensor 721, in other words, in a case where the measurement result of the transmitted light illuminance measurement sensor 722 is not the desired illuminance or in a case where more delicate illumination adjustment is further desired, the light shielding rate in the dimming device may be adjusted while monitoring a value of the transmitted light illuminance measurement sensor 722. At least two transmitted light illuminance measurement sensors may be arranged, and may perform: measurement of illuminance based on light having passed through a portion with a high light shielding rate; and measurement of illuminance based on light having passed through a portion with a low light shielding rate.

Note that the transmitted light illuminance measurement sensor 722 of Example 10 can be applied to the display devices described in Examples 1 to 7. Alternatively, the transmitted light illuminance measurement sensor 722 of Example 10 and the environment illuminance measurement sensor 721 of Example 9 may be combined, and in this case, various tests may be performed to control the light shielding rate in the dimming device 700 and the luminance of an image in the image forming device 110 in a manner independent from each other or in a correlated manner. A light shielding rate in a right eye dimming device and a light shielding rate in a left eye dimming device can be made uniform by adjusting voltage applied to each of the first transparent electrode and the second transparent electrode in each of the right eye dimming device and the left eye dimming device. A potential difference between the first transparent electrode and the second transparent electrode may be controlled or the voltage applied to each of the first transparent electrode and the voltage applied to the second transparent electrode may be controlled independently from each other. The light shielding rate in the right eye dimming device and the light shielding rate in the left eye dimming device can be controlled on the basis of a measurement result of the transmitted light illuminance measurement sensor 722, for example, or can be manually controlled and adjusted by an observer using a switch, a button, a dial, a slider, a knob, or the like while observing: brightness of the light having passed through the right eye dimming device and the light guide plate; and brightness of the light having passed through the left eye dimming device and the light guide plate.

While the description has been provided on the basis of the preferable Examples of the present disclosure, the present disclosure is not limited to such Examples. The configurations and structures of the display devices (head mounted type displays), image display devices, and image forming devices described in Examples are examples and can be suitably changed. Additionally, the configurations and structures of the optical member, movement device, image moving unit, and lens system are also examples and can be suitably changed. For example, a surface relief type hologram (refer to USP Publication No. 20040062505 A1) may also be arranged at the light guide plate. The first deflection unit and the like can include a transmissive diffraction grating member. Alternatively, the diffraction grating member may be a reflective blazed diffraction grating member. The display device of the present disclosure can also be used as a stereoscopic display device.

It has been described in Examples that the image forming device displays an image of a single color (e.g., green), but the image forming device can also display a color image, and in such a case, the light source includes light sources that respectively emit red, green, and blue light, for example. Specifically, for example, white light may be obtained by: mixing red light, green light, and blue light respectively emitted from a red light-emitting element, a green light-emitting element, and a blue light-emitting element by using a light pipe; and uniforming the luminance.

Figure 27:
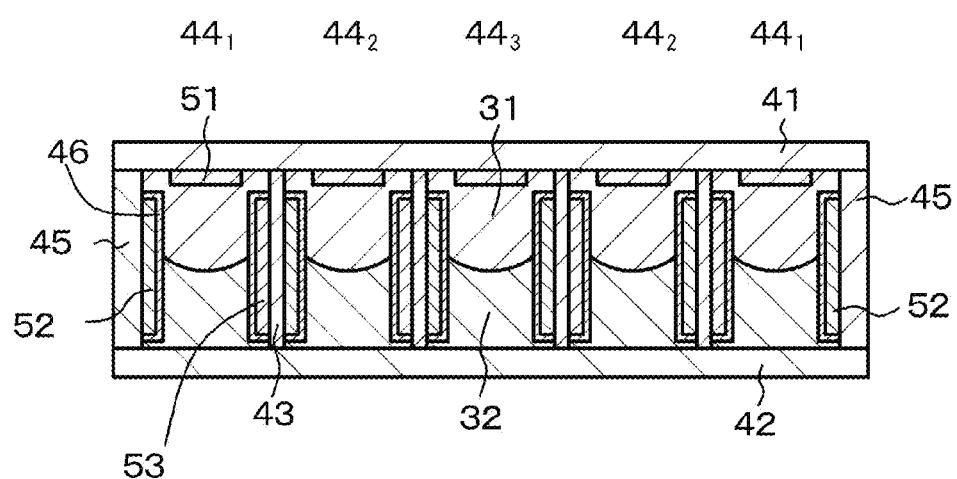
FIG. 27 is a schematic cross-sectional view of a liquid lens of a Fresnel lens type to vary a focal length of an optical member.
Figure 28:
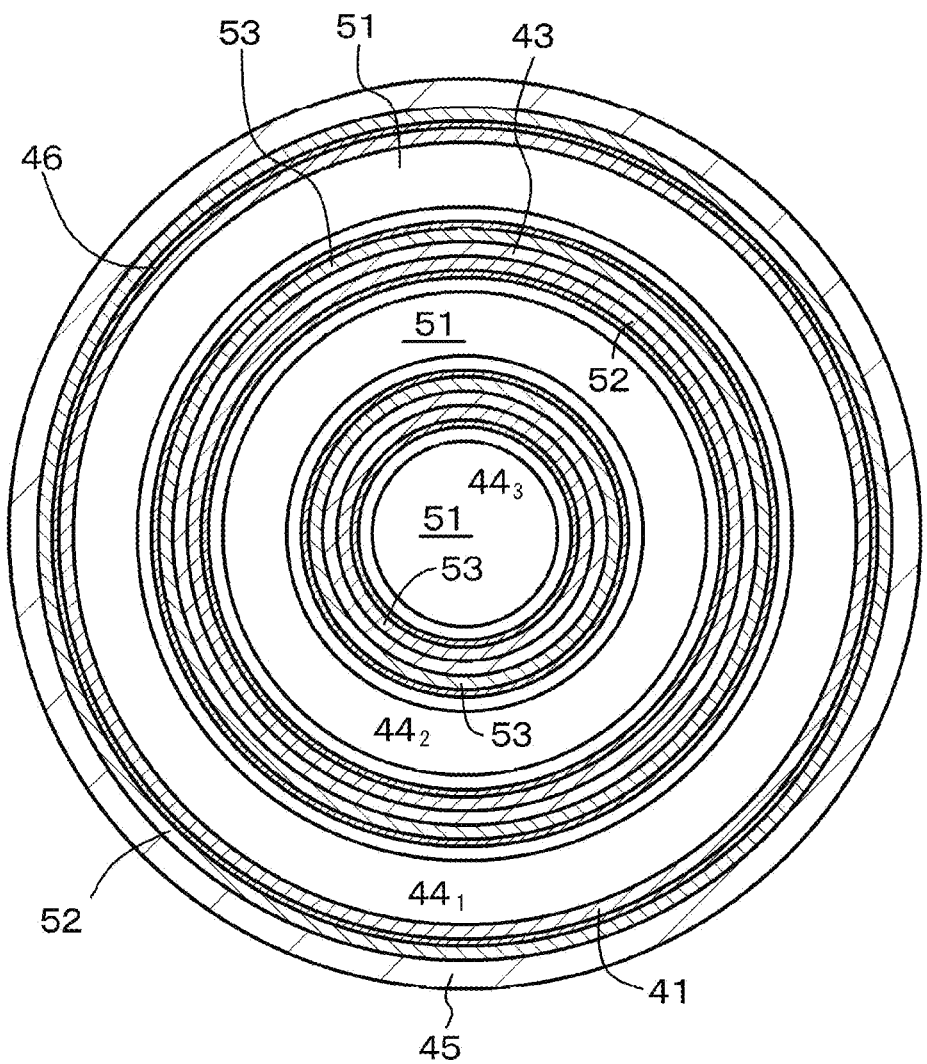
FIG. 28 is a schematic plan view of the liquid lens of the Fresnel lens type to vary the focal length of the optical member.
Figure 29:
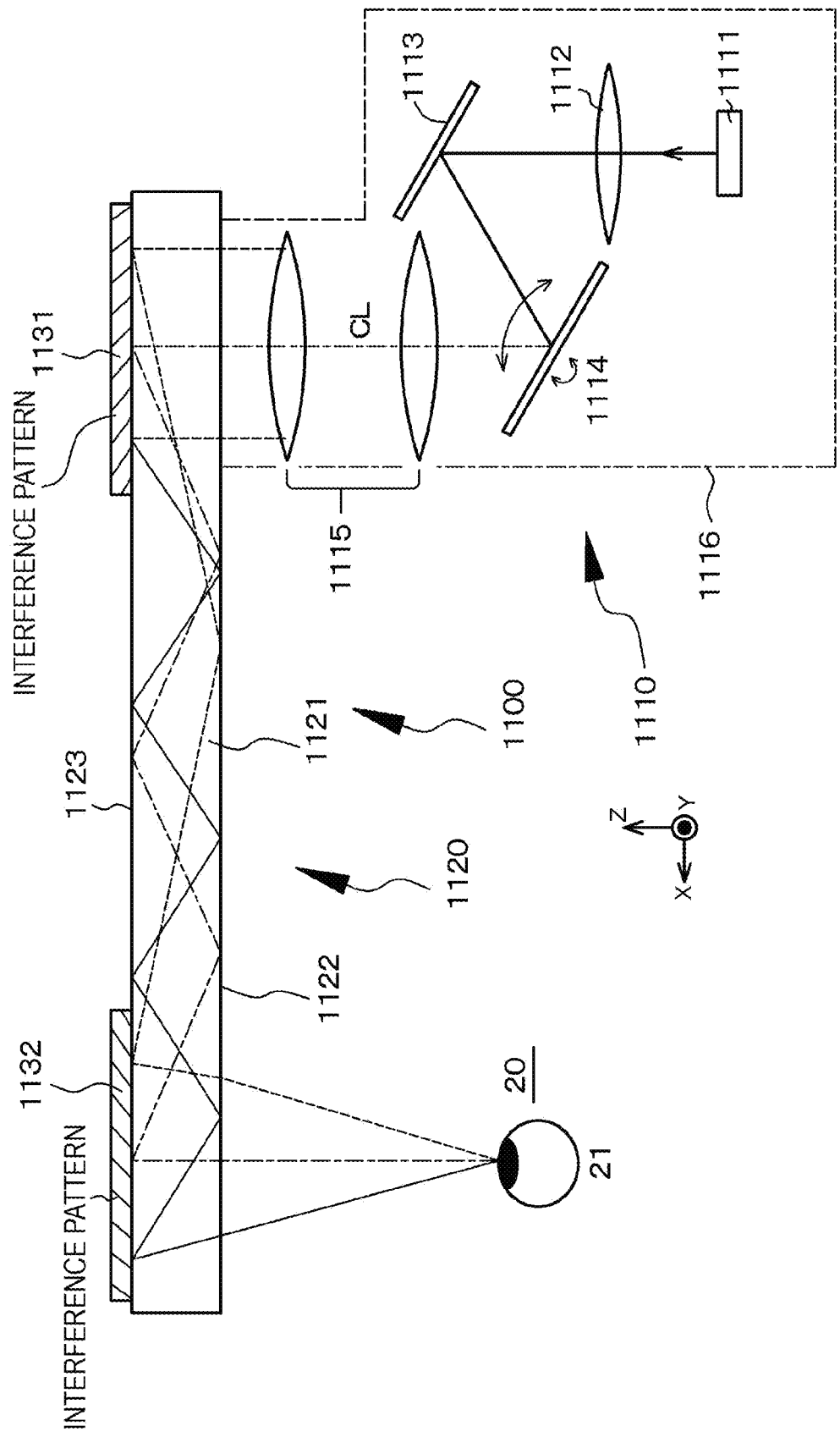
FIG. 29 is a conceptual diagram of a conventional image display device.

To make a focal length of the optical member variable, the optical member 142 may include a liquid lens. FIG. 27 illustrates a schematic cross-sectional view of such a liquid lens, and FIG. 28 illustrates a plan view thereof, in which the liquid lens includes a Fresnel lens, and a ring-shaped lens chamber is concentrically arranged. The optical member having a variable focal length is equivalent to moving the support substrate in the Z direction.

In other words, the liquid lens includes:

(A) a housing including:

a so-called endless outer wall member 45 without a terminal end portion;

a top plate 41 attached to a top surface of the outer wall member 45; and a bottom plate 42 attached to a bottom surface of the outer wall member 45; and (B) (N−1) partition members 43 each having no terminal portion and arranged concentrically with the outer wall member 45. Note that an outer shape of the housing is circular. Additionally, a center lens chamber surrounded by the (N−1) annular lens chambers and (N−1)$_{th}$ partition member 43 are provided. Here, N=3 in the illustrated example. Each of lens chambers 44 ($44_1, 44_2$, and $44_3$) is filled with first liquid 31 and second liquid 32 constituting each liquid lens.

The first liquid 31 and the second liquid 32 are insoluble and not mixed, and an interface between the first liquid 31 and the second liquid 32 constitutes a lens surface. Here, the first liquid 31 has conductivity, the second liquid 32 has an insulation property, a first electrode 51 contacts the first liquid 31, a second electrode 52 contacts the first liquid 31 and the second liquid 32 via an insulation film 46, and a third electrode 53 contacts the first liquid 31 and the second liquid 32 via the insulation film 46. Additionally, a top plate 41, a bottom plate 42, the partition wall member 43, and the first electrode 51 includes materials transparent to light incident on the liquid lens.

More specifically, the top plate 41, bottom plate 42, and partition wall member 43 are manufactured from glass or a resin such as an acrylic resin. Additionally, the first liquid 31 having conductivity includes an aqueous solution of lithium chloride, and has a density of 1.06 g/cm$^3$ and a refractive index of 1.34. On the other hand, the second liquid 32 having the insulation property includes silicone oil (TSF437 manufactured by Momentive Performance Materials Japan LLC.) and has a density of 1.02 g/cm$^3$ and a refractive index of 1.49. Furthermore, the first electrode 51 includes an ITO, and the second electrode 52 and the third electrode 53 each include of a metal electrode of gold, aluminum, copper, silver, or the like, for example. Furthermore, the insulation film 46 includes a metal oxide such as polyparaxylene, a tantalum oxide, or a titanium oxide. Note that a water repellent treatment layer (not illustrated) is provided on the insulation film 46. The water repellent treatment layer includes polyparaxylylene or a fluorinated polymer. Preferably, hydrophilic treatment is applied to a surface of the first electrode 51.

The first lens chamber (annular lens chamber) $44_1$ includes the outer wall member 45, a first partition wall member 43, the top plate 41, and the bottom plate 42. Additionally, a first electrode 51 is provided on the inner surface of a portion of the top plate 41 constituting the first lens chamber $44_1$, a second electrode 52 is provided on an inner surface of a portion of the outer wall member 45 constituting the first lens chamber $44_1$, and a third electrode 53 is provided on an inner surface of a portion of the first partition wall member 43 constituting the first lens chamber $44_1$.

A $(n+1)_{th}$ lens chamber (annular lens chamber) $44_{(n+1)}$ includes an $n_{th}$ partition wall member 43 and an $(n+1)_{th}$ partition wall member 43, the top plate 41, and the bottom plate 42 (here, n=1, 2, . . . N−2). Furthermore, a first electrode 51 is provided on an inner surface of a portion of the top plate 41 constituting an $(n+1)_{th}$ lens chamber $44_{(n+1)}$, a second electrode 52 is provided on an inner surface of a portion of the $n_{th}$ partition wall member 43 constituting the $(n+1)_{th}$ lens chamber $44_{(n-1)}$, and a third electrode 53 is provided on an inner surface of a portion of the $(n+1)_{th}$ partition wall member 43 constituting the $(n+1)_{th}$ lens chamber $44_{(n+1)}$.

A first electrode 51 is provided on an inner surface of a portion of the top plate 41 constituting a center lens chamber $44_3$ corresponding to an $N_{th}$ lens chamber $44_N$, and a third electrode 53 is provided on an inner surface of a portion of a $(N−1)_{t}$, partition wall member 43 constituting the center lens chamber $44_3$.

Note that, in the illustrated example, one first electrode 51 is provided per lens chamber, but one first electrode 51 may be provided on an inner surface of the top plate 41.

In this liquid lens, water repellent treatment is applied to the surface of each of the outer wall member 45 and the partition wall members 43 in each of which the interface positioned between the first liquid 31 and the second liquid 32 are located. Light is incident from the bottom plate 42, and light is emitted from the top plate 41. Additionally, each of the lens chambers $44_1$, $44_2$, and $44_3$, optical power of the liquid lens is changed by setting voltage applied to the second electrode 52 differently from voltage applied to the third electrode 53. Alternatively, a Fresnel lens is formed as the entire liquid lens by setting the voltage applied to the second electrode 52 differently from the voltage applied to the third electrode 53 in each of the lens chambers $44_1$, $44_2$, and $44_3$.

Furthermore, the present disclosure may also have following configurations.

[A01] <Image Display Device>
An image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
in which
light from the image forming device is deflected at the first deflection unit, propagated inside the light guide plate by total reflection, deflected at the second deflection unit, and incident on the optical member,
the optical member emits the incident light toward a pupil of an observer, and
further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

[A02] The image display device recited in [A01], in which when a direction orthogonal to the X direction and the Y direction is defined as a Z direction, the movement device further moves the support substrate in the Z direction.

[A03] The image display device recited in [A01] or [A02], in which the optical member emits the incident light to a pupil of an observer by moving the support substrate with respect to the light guide plate in the X direction or in the X direction and the Y direction by movement of the support substrate.

[A04] The image display device recited in any one of [A01] to [A03], in which the number of times of total reflection inside the light guide plate for the light to be propagated inside the light guide plate by total reflection is not changed regardless of movement of the support substrate.

[A05] The image display device recited in any one of [A01] to [A04], further including an image moving unit to control light that travels from the image forming device to the light guide plate.

[A06] The image display device recited in [A05], in which the image moving unit moves the image forming device with respect to the light guide plate in the X direction or in the X direction and the Y direction, or moves the image forming device inside an XY plane.

[A07] The image display device recited in [A05], in which the image moving unit changes an emission position of light emitted from the image forming device.

[A08] The image display device recited in any one of [A01] to [A07], in which each of the first deflection unit and the second deflection unit includes a hologram diffraction grating.

[A09] The image display device according to any one of [A01] to [A08], in which the optical member includes a hologram lens.

[A10] The image display device recited in any one of [A01] to [A09], in which the image forming device includes a laser light source and a MEMS mirror.

[A11] The image display device recited in any one of [A01] to [A10], in which
the light guide plate includes: a first surface on which light from the image forming device is incident; and a second surface facing the first surface,
the first deflection unit is arranged on the first surface or the second surface of the light guide plate,
the second deflection unit is arranged on the first surface or the second surface of the light guide plate, and
the optical member is arranged in a manner facing the first surface or the second surface of the light guide plate.

[A12] The image display device recited in any one of [A01] to [A11], in which the movement device moves the support substrate on the basis of a position of an image of the pupil of the observer.

[A13] The image display device recited in [A12] further including an imaging device that is located adjacent to the support substrate and captures an image of the pupil of the observer.

[A14] The image display device recited in any one of [A01] to [A13], in which the optical member has positive optical power.

[A15] The image display device recited in any one of [A01] to [A14], in which the movement device includes a rack-and-pinion, a piezoelectric element, a voice coil motor, or an ultrasonic motor.

[B01] <Display Device>
A display device including:
(A) a frame to be mounted on a head of an observer; and
(B) an image display device attached to the frame;
the image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
in which
light from the image forming device is deflected at the first deflection unit, propagated inside the light guide plate by total reflection, deflected at the second deflection unit, and incident on the optical member,
the optical member emits the incident light toward a pupil of an observer, and
further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

[B02] <Display Device>
A display device including:
(A) a frame to be mounted on a head of an observer; and
(B) an image display device attached to the frame,
in which the image display device includes the image display device recited in any one of [A01] to [A15].

[C01] <Adjustment Method for Display Device>
An adjustment method for a display device that includes
(A) a frame to be mounted on a head of an observer, and
(B) an image display device attached to the frame,
the image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
the display device further including a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction,
the adjustment method including:
deflecting light from the image forming device at the first deflection unit, propagating the light inside the light guide plate by total reflection, deflecting the light at the second deflection unit, making the light incident on the optical member, and causing light emitted from the optical member to be incident on a pupil of an observer by moving the support substrate with respect to the light guide plate in the X direction or in the X direction and Y direction by using the movement device.

[C02] <Adjusting Method for Display Device>
An adjustment method for a display device recited in [B02], including:
deflecting light from the image forming device at the first deflection unit, propagating the light inside the light guide plate by total reflection, deflecting the light at the second deflection unit, making the light incident on the optical member, and causing light emitted from the optical member to be incident on the pupil of the observer by moving the support substrate with respect to the light guide plate in the X direction or in the X direction and Y direction by using the movement device.

[C03] The adjustment method for a display device recited in [C01] or [C02], further including optimizing light intensity of an image emitted from the optical member and incident on the pupil of the observer by moving the support substrate with respect to the light guide plate in the X direction or in the X direction and the Y direction by the movement device.

[C04] The adjustment method for a display device recited in any one of [C01] to [C03], further including moving the support substrate by the movement device on the basis of a position of the image of the pupil of the observer.

REFERENCE SIGNS LIST

10 Frame
10' Nose pad
11 Front portion
11' Center portion of front portion
12 Hinge
13 Temple portion
14 Temple tip portion
15 Wiring (signal line, power supply line, and the like)
16 Headphone portion
16' Wiring for headphone portion
17 Camera
18 Control device (control circuit, control unit)
19 Attachment member
20 Observer
21 Pupil
100, 200, 300, 400 image display device
110, 110A Image forming device
111 Light source
112 Scanning unit
113 Lens system
114, 119 Casing
115 Spatial light modulation device (organic EL display device)
116 First lens
117 Second lens
118 Aperture
121 Light guide plate
122 First surface of light guide plate
123 Second surface of light guide plate
124 Sealing member
125 Transparent protective member
131, 133 First deflection unit
132 Second deflection unit
141 Support substrate (support plate)
142 Optical member
150 Movement device
151 Pinion gear portion 151A, 151B Knob
152 Support member
153 Rack gear portion
154 Guide portion
75 Top plate
76 Bottom plate
77 Partition wall member
78, 78.78, $78_3$ Lens chamber
79 Outer wall member
81 First electrode
82 Second Electrode
83 Third electrode
501, 601 Light shielding member
700 Dimming device
701 First substrate (also used as transparent protective member)
702 First transparent electrode
702A First transparent electrode segment
703 Second substrate
704 Second transparent electrode
704A Second transparent electrode segment
705 Light adjustment layer
705A $WO_3$ layer
705B $Ta_2O_5$ layer
705C $Ir_xSn_{1-x}O$ layer
706 Protective layer
707 Sealing material
708 Minimum unit region where light shielding rate in dimming device is changed
711 Virtual image projection region
712 The other region of dimming device
132A Virtual rectangle
721 Environment illuminance measurement sensor
722 Transmitted light illuminance measurement sensor

What is claimed is:

1. An image display device comprising:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
wherein
light from the image forming device is deflected at the first deflection unit, propagated inside the light guide plate by total reflection, deflected at the second deflection unit, and incident on the optical member,
the optical member emits the incident light toward a pupil of an observer, and
further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

2. The image display device according to claim 1, wherein when a direction orthogonal to the X direction and the Y direction is defined as a Z direction, the movement device further moves the support substrate in the Z direction.

3. The image display device according to claim 1, wherein the optical member emits the incident light to a pupil of an observer by moving the support substrate with respect to the light guide plate in the X direction or in the X direction and the Y direction by movement of the support substrate.

4. The image display device according to claim 1, wherein the number of times of total reflection inside the light guide plate for the light to be propagated inside the light guide plate by total reflection is not changed regardless of movement of the support substrate.

5. The image display device according to claim 1, further comprising an image moving unit to control light that travels from the image forming device to the light guide plate.

6. The image display device according to claim 5, wherein the image moving unit moves the image forming device relatively with respect to the light guide plate in the X direction or in the X direction and the Y direction, or moves the image forming device inside an XY plane.

7. The image display device according to claim 5, wherein the image moving unit changes an emission position of light emitted from the image forming device.

8. The image display device according to claim 1, wherein each of the first deflection unit and the second deflection unit includes a hologram diffraction grating.

9. The image display device according to claim 1, wherein the optical member includes a hologram lens.

10. The image display device according to claim 1, wherein the image forming device includes a laser light source and a MEMS mirror.

11. The image display device according to claim 1, wherein
the light guide plate includes: a first surface on which light from the image forming device is incident; and a second surface facing the first surface,
the first deflection unit is arranged on the first surface or the second surface of the light guide plate,
the second deflection unit is arranged on the first surface or the second surface of the light guide plate, and
the optical member is arranged in a manner facing the first surface or the second surface of the light guide plate.

12. The image display device according to claim 1, wherein the movement device moves the support substrate on the basis of a position of an image of the pupil of the observer.

13. The image display device according to claim 12, further comprising an imaging device that is located adjacent to the support substrate and captures an image of the pupil of the observer.

14. The image display device according to claim 1, wherein the optical member has positive optical power.

15. The image display device according to claim 1, wherein the movement device includes a rack-and-pinion, a piezoelectric element, a voice coil motor, or an ultrasonic motor.

16. A display device comprising:
(A) a frame to be mounted on a head of an observer; and
(B) an image display device attached to the frame,
the image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
wherein
light from the image forming device is deflected at the first deflection unit, propagated inside the light guide plate by total reflection, deflected at the second deflection unit, and incident on the optical member, the optical member emits the incident light toward a pupil of an observer, and further provided is a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction.

17. An adjustment method for a display device that includes:

(A) a frame to be mounted on a head of an observer; and
(B) an image display device attached to the frame,
the image display device including:
an image forming device;
a light guide plate;
a support substrate arranged apart from the light guide plate;
a first deflection unit attached to the light guide plate;
a second deflection unit attached to the light guide plate; and
an optical member attached to the support substrate in a manner facing the second deflection unit,
the display device further including a movement device that moves the support substrate with respect to the light guide plate in an X direction or in the X direction and a Y direction in order to change a relative positional relation between the second deflection unit and the optical member when an axial line direction of the light guide plate is defined as the X direction and a height direction of the light guide plate is defined as the Y direction, the adjustment method comprising:

deflecting light from the image forming device at the first deflection unit, propagating the light inside the light guide plate by total reflection, deflecting the light at the second deflection unit, making the light incident on the optical member, and causing light emitted from the optical member to be incident on a pupil of an observer by moving the support substrate with respect to the light guide plate in the X direction or in the X direction and Y direction by using the movement device.

18. The adjustment method for a display device according to claim 17, further comprising optimizing light intensity of an image emitted from the optical member and incident on the pupil of the observer by moving the support substrate with respect to the light guide plate in the X direction or in the X direction and the Y direction by the movement device.

19. The adjustment method for a display device according to claim 17, further comprising moving the support substrate by the movement device on the basis of a position of the image of the pupil of the observer.

\* \* \* \* \*